(12) United States Patent
Olcott

(10) Patent No.: US 9,171,207 B1
(45) Date of Patent: Oct. 27, 2015

(54) METHOD AND SYSTEM FOR RECOGNIZING MACHINE GENERATED CHARACTER GLYPHS IN GRAPHIC IMAGES

(71) Applicant: Peter L Olcott, Papillion, NE (US)

(72) Inventor: Peter L Olcott, Papillion, NE (US)

( * ) Notice: Subject to any disclaimer, the term of this patent is extended or adjusted under 35 U.S.C. 154(b) by 7 days.

(21) Appl. No.: 14/204,321

(22) Filed: Mar. 11, 2014

Related U.S. Application Data

(60) Provisional application No. 61/800,725, filed on Mar. 15, 2013.

(51) Int. Cl.
*G06K 9/00* (2006.01)
*G06K 9/46* (2006.01)

(52) U.S. Cl.
CPC ........ *G06K 9/00503* (2013.01); *G06K 9/00442* (2013.01); *G06K 9/4642* (2013.01); *G06K 2209/01* (2013.01)

(58) Field of Classification Search
CPC ... G06K 7/143; G06K 2209/01; G06K 9/344; G06K 9/00456; G06K 9/4642; G06K 9/4647; G06K 9/4652; G06K 9/38; G06K 9/00442; G06K 9/6292
USPC .......................................... 382/194, 176, 206
See application file for complete search history.

(56) References Cited

U.S. PATENT DOCUMENTS

| | | | |
|---|---|---|---|
| 5,488,719 A * | 1/1996 | Kaplan | G06K 9/6807 382/182 |
| 5,606,690 A * | 2/1997 | Hunter et al. | 715/255 |
| 5,644,656 A * | 7/1997 | Akra et al. | 382/215 |
| 5,862,251 A * | 1/1999 | Al-Karmi et al. | 382/186 |
| 5,978,801 A * | 11/1999 | Yuasa | |
| 5,995,963 A * | 11/1999 | Nanba et al. | |
| 6,370,269 B1 * | 4/2002 | Al-Karmi et al. | 382/197 |
| 7,046,848 B1 * | 5/2006 | Olcott | 382/176 |
| 7,444,021 B2 * | 10/2008 | Napper | 382/186 |
| 2003/0187633 A1 * | 10/2003 | Fairweather | 704/9 |
| 2009/0060335 A1 * | 3/2009 | Rodriguez Serrano | G06K 9/00194 382/177 |
| 2010/0150448 A1 * | 6/2010 | Lecerf | G06F 17/3061 382/190 |
| 2010/0266215 A1 * | 10/2010 | Hua et al. | 382/229 |

* cited by examiner

*Primary Examiner* — John Villecco

(57) ABSTRACT

A method and system for recognizing machine generated character glyphs in a graphic image that uses a deterministic finite automaton (DFA) to separately recognize the individual pixelcolumns of character glyphs and then combines these separate pixelcolumns together to form correctly recognized whole glyphs. This method and system can enable data to be automatically exchanged between applications where no alternative method of data interchange exists. The DFA minimizes its space requirements by storing the current input dimension of its state transition table as a sorted list of possible values that could be matched at the current state. This sorted list can then be binary searched for the current input pixel RGB value.

20 Claims, 57 Drawing Sheets

Example Nonoverlapping Glyph PixelColumn Data
Times New Roman(CBI--8)(000000_FFFFFF)

| Row | Glyph Column | Glyph Index | CodePoints | Overlap Code | PixelColumn Pixel RGB Values (00 is topmost Pixel) | | | | | | | | | |
|---|---|---|---|---|---|---|---|---|---|---|---|---|---|---|
| | | | | | 00 | 01 | 02 | 03 | 04 | 05 | 06 | 07 | 08 | 09 | 10 |
| 00 | 0 | 0 | | 0 | ffffff | ffffff | ffffff | ffffff | ffffff | ffffff | ffffff | ffffff | ffffd4 | ffffff | ffffff |
| 01 | 1 | 0 | | 0 | ffffff | ffffff | ffffff | ffd480 | ffd480 | ffffff | ffffff | ffffff | 802b00 | ffffff | ffffff |
| 02 | 2 | 0 | | 0 | ffffff | 802b00 | ffd480 | 2b0055 | ffaa55 | ffaa80 | d4aaaa | ffffff | 000055 | ffffff | ffffff |
| 03 | 3 | 0 | | 0 | ffffff | 55aaff | 2b0000 | 0055aa | 2b80d4 | 80d4ff | d4ffff | ffffff | aaffff | ffffff | ffffff |
| 04 | 4 | 0 | | 0 | ffffff | ffffaa | 55aaff | aaffff | ffffff | ffffff | ffffff | ffffff | ffffff | ffffff | ffffff |
| 05 | 0 | 0 | : | 0 | ffffff | 550000 | 00002b | 0055aa | ffffd4 | ffffff | ffffff | ffffff | ffffff | ffffff | ffffff |
| 06 | 1 | 0 | : | 0 | ffffff | 2b80d4 | 80d4d4 | ffaa55 | ffffd4 | ffffff | ffffff | ffffff | ffffff | ffffff | ffffff |
| 07 | 2 | 0 | : | 0 | ffffff | d4802b | 802b00 | ffffd4 | 80d4ff | ffffff | ffffff | ffffff | ffffff | ffffff | ffffff |
| 08 | 3 | 0 | : | 0 | ffffff | 000055 | 0055aa | 802b2b | 8080aa | ffffff | ffffff | ffffff | ffffff | ffffff | ffffff |
| 09 | 4 | 0 | : | 0 | ffffff | aaffff | 0055aa | 80d4ff | ffffff | ffffff | ffffff | ffffff | ffffff | ffffff | ffffff |
| 10 | 0 | 0 | ; | 0 | ffffff | ffffff | ffffff | ffffff | ffffff | ffffff | ffffff | ffffff | ffffff | ffffff | ffffff |
| 11 | 1 | 0 | # | 0 | ffffff | ffffff | ffd480 | ffd480 | d4802b | d4802b | ffd480 | ffd480 | ffaa55 | ffffff | ffffff |
| 12 | 2 | 0 | # | 0 | ffffff | 55555a | ffd480 | ffaa55 | 000000 | 802b55 | 000000 | 5580d4 | 55aaff | ffffff | ffffff |
| 13 | 3 | 0 | # | 0 | ffffff | 5555aa | 5580d4 | ffaa55 | 000000 | aaffd4 | 000000 | ffd480 | ffaa55 | ffffff | ffffff |
| 14 | 4 | 0 | # | 0 | ffffff | ffffaa | ffd480 | 55aaff | ffffff | 802b55 | 000000 | 2b55aa | 2b80d4 | ffffff | ffffff |
| 15 | 5 | 0 | # | 0 | ffffff | 5555aa | 5580d4 | 55aaff | ffffff | aaffff | 000055 | ffffff | ffffff | ffffff | ffffff |
| 16 | 0 | 0 | $ | 0 | ffffff | ffffff | d4802b | d4802b | aaffff | ffffff | aaffff | ffffff | ffffaa | ffd480 | ffffff |
| 17 | 1 | 0 | $ | 0 | ffffff | ffffff | d4802b | d4802b | ffff80 | ffffd4 | d4802b | d4802b | 550000 | aa5500 | ffffff |
| 18 | 2 | 0 | $ | 0 | aaaaaa | 000000 | d4d4aa | 555580 | 55580 | 000000 | 000000 | 0055aa | 000000 | ffd480 | 80aaff |
| 19 | 3 | 0 | $ | 0 | ffffff | 000000 | aad4aa | aaffff | ffffff | fffaa | d4802b | aa8080 | 000000 | 000000 | ffffff |
| 20 | 4 | 0 | $ | 0 | ffffff | 002b80 | 0055aa | d4802b | 550000 | ffaa80 | 55aaff | d4d480 | 2b80d4 | 2b80d4 | ffffff |
| 21 | 5 | 0 | $ | 0 | ffffff | 002b80 | 002b80 | 00002b | 000000 | 550000 | ffaa80 | 2b0000 | ffffff | ffffff | ffffff |
| 22 | 6 | 0 | $ | 0 | ffffff | d4ffff | d4ffff | aaffff | 80d4ff | 000055 | 550000 | ffffff | 2b80d4 | ffffff | ffffff |
| 23 | 0 | 0 | % | 0 | ffffff | ffffff | ffffff | d4802b | ffaa55 | aaffff | ffffff | ffffff | ffd480 | ffffff | ffffff |
| 24 | 1 | 0 | % | 0 | ffffff | d4ffff | ffaa55 | d4802b | 2b80d4 | ffffff | ffffff | ffffff | 2b002b | ffffff | ffffff |
| 25 | 2 | 0 | % | 0 | ffffff | 000000 | aa5500 | ffd480 | ffd480 | ffffff | ffffff | ffd480 | 80d4ff | ffffff | ffffff |
| 26 | 3 | 0 | % | 0 | ffffff | 00002b | ffffff | ffffff | 2b0025 | 802b2b | 802b2b | 802b2b | ffffff | ffffff | ffffff |
| 27 | 4 | 0 | % | 0 | ffffff | ffffff | ffffff | ffffff | 802b2b | 80d4ff | 802b2b | 80d4ff | ffffff | ffffff | ffffff |
| 28 | 5 | 0 | % | 0 | ffffff | 80d4ff | ffffd4 | d4802b | d4802b | d4802b | ffffd4 | ffffff | ffaa55 | ffffff | ffffff |
| 29 | 6 | 0 | % | 0 | ffffff | ffffff | ffaa55 | ffffd4 | 802b2b | ffaa55 | ffaa55 | 802b2b | 000000 | ffffff | ffffff |
| 30 | 7 | 0 | % | 0 | ffffff | 80d4ff | 000055 | 000055 | ffffff | 000000 | 000055 | 55aaff | 000000 | ffffff | ffffff |
| 31 | 8 | 0 | % | 0 | ffffff | ffffff | ffffff | 80d4ff | 802b2b | 000000 | aa5500 | aa5500 | 00002b | ffffff | ffffff |
| 32 | 9 | 0 | % | 0 | ffffff | ffffff | 802b00 | 80d4ff | ffffff | 000055 | aa5500 | 00002b | 80d4ff | ffffff | ffffff |
| 33 | | | | 0 | ffffff | 55aaff | ffffff | ffffff | ffffff | aaffff | 55aaff | 80d4ff | ffffff | ffffff | ffffff |

```
typedef unsigned char   uint8;
typedef unsigned short  uint16;
typedef unsigned int    uint32;

struct DFA_Node {
  union {
    struct {  // State Transition Node
      uint32 Pixel;       // Pixel RGB Value
      uint32 Next;        // Next DFA State
      uint16 Offset;      // Offset from Next DFA State
      uint8  ActionCode;  // _BSEARCH or _RECOGNIZE
    };
    struct {  // Identifier Node
      uint32 CodePoints[3];  // Three UTF-32 CodePoints
      uint8  GlyphIndex;     // Index into CodePoint[3]
      uint8  GlyphColumn;    // Glyph Pixel Column Number
      uint8  OverlapCode;    // zero to twenty-six
    };
  };
};
```

505

```
//
//   Structures related to SelectedNodesList
//

//
// One PixelColumn of DFA Identifier Nodes
// (see DFA_Node 600 above) and Image
// Coordinates of Matched PixelColumn
//
struct SelectedNodes {
  uint32 ImageRow;                   // Vertical Coordinate
  uint32 ImageColumn;                // Horizontal Coordinate
  std::vector<uint32> NodeList;      // DFA Node Index
};
```

510

```
class SelectedNodesList {    // List of DFA Node Indices
private:                     // that were recognized
  std::vector<SelectedNodes> SelectedList;
}
```

FIG. 9

```
int GetOverlapCode(uint32 CP1, uint32 CP2, uint32 CP3, uint32 GlyphIndex)
{
    if (PixelsBetween[CP1][CP2] + GlyphPixelWidth[CP1] <= 0) {
        if (PixelsBetween[CP1][CP2] + GlyphPixelWidth[CP1] < 0)
            return 7 + GlyphIndex;         // 'f  CP2 More Than Totally overlaps CP1
        else
            return 5 + GlyphIndex;         // 'f   CP2 Totally overlaps CP1
    }
    else if (PixelsBetween[CP1][CP2] + GlyphPixelWidth[CP2] <= 0)
        return 3 + GlyphIndex;             // f.   CP1 Totally overlaps CP2
    else
        return 1 + GlyphIndex;             // ff   CP1 Partially overlaps CP2
    if (PixelsBetween[CP2][CP3] + GlyphPixelWidth[CP2] <= 0) {
        if (PixelsBetween[CP2][CP3] + GlyphPixelWidth[CP2] < 0)
            return 18 + GlyphIndex;        // f'f  CP3 More Than Totally overlaps CP2
        else
            return 15 + GlyphIndex;        // f'f  CP3 Totally overlaps CP2
    }
    else if (PixelsBetween[CP1][CP2] + GlyphPixelWidth[CP2] <= 0)
        return 12 + GlyphIndex;            // f.f  CP1 Totally overlaps CP2
    else if (PixelsBetween[CP1][CP2] + GlyphPixelWidth[CP1] <= 0) {
        if (PixelsBetween[CP1][CP2] + GlyphPixelWidth[CP1] < 0)
            return 24 + GlyphIndex;        // 'ff  CP2 More Than Totally overlaps CP1
        else
            return 21 + GlyphIndex;        // 'ff  CP2 Totally overlaps CP1
    }
    else
        return 9 + GlyphIndex;             // fif  Partial overlap of {CP1, CP2, CP3}
}
```

FIG. 12

| | | | | |
|---|---|---|---|---|
| [000000] | Pixel(000000) | Next(000001) | offset(000001) | _BSEARCH |
| [000001] | Pixel(aaaaaa) | Next(058316) | offset(000000) | _BSEARCH |
| [000002] | Pixel(ffffff) | Next(000003) | offset(000067) | _BSEARCH |
| [000003] | Pixel(000000) | Next(052301) | offset(000040) | _BSEARCH |
| [000004] | Pixel(00002b) | Next(050302) | offset(000018) | _BSEARCH |
| [000005] | Pixel(000055) | Next(048804) | offset(000008) | _BSEARCH |
| [000006] | Pixel(002b2b) | Next(048744) | offset(000002) | _BSEARCH |
| [000007] | Pixel(002b80) | Next(048032) | offset(000007) | _BSEARCH |
| [000008] | Pixel(005555) | Next(047993) | offset(000002) | _BSEARCH |
| [000009] | Pixel(005580) | Next(047777) | offset(000005) | _BSEARCH |
| [000010] | Pixel(0055aa) | Next(045532) | offset(000004) | _BSEARCH |
| [000011] | Pixel(2b0000) | Next(045173) | offset(000006) | _BSEARCH |
| [000012] | Pixel(2b2b00) | Next(044980) | offset(000003) | _BSEARCH |
| [000013] | Pixel(2b2b2b) | Next(044768) | offset(000006) | _BSEARCH |
| [000014] | Pixel(2b2b55) | Next(044748) | offset(000000) | _BSEARCH |
| [000015] | Pixel(2b5555) | Next(044586) | offset(000007) | _BSEARCH |
| [000016] | Pixel(2b5580) | Next(044521) | offset(000000) | _BSEARCH |
| [000017] | Pixel(2b8080) | Next(044323) | offset(000008) | _BSEARCH |
| [000018] | Pixel(2b80aa) | Next(043971) | offset(000013) | _BSEARCH |
| [000019] | Pixel(2b80d4) | Next(040106) | offset(000020) | _BSEARCH |
| [000020] | Pixel(550000) | Next(039687) | offset(000007) | _BSEARCH |
| [000021] | Pixel(55002b) | Next(039533) | offset(000000) | _BSEARCH |
| [000022] | Pixel(552b00) | Next(039465) | offset(000002) | _BSEARCH |
| [000023] | Pixel(552b2b) | Next(039454) | offset(000000) | _BSEARCH |
| [000024] | Pixel(552b55) | Next(039402) | offset(000001) | _BSEARCH |
| [000025] | Pixel(552b80) | Next(038867) | offset(000001) | _BSEARCH |
| [000026] | Pixel(555500) | Next(038768) | offset(000002) | _BSEARCH |
| [000027] | Pixel(55552b) | Next(038714) | offset(000002) | _BSEARCH |
| [000028] | Pixel(555555) | Next(038535) | offset(000003) | _BSEARCH |
| [000029] | Pixel(555580) | Next(038496) | offset(000000) | _BSEARCH |
| [000030] | Pixel(5555aa) | Next(038331) | offset(000000) | _BSEARCH |
| [000031] | Pixel(558080) | Next(038159) | offset(000005) | _BSEARCH |
| [000032] | Pixel(5580aa) | Next(038107) | offset(000001) | _BSEARCH |
| [000033] | Pixel(5580d4) | Next(037560) | offset(000001) | _BSEARCH |
| [000034] | Pixel(55aaaa) | Next(037375) | offset(000004) | _BSEARCH |
| [000035] | Pixel(55aad4) | Next(037050) | offset(000008) | _BSEARCH |
| [000036] | Pixel(55aaff) | Next(033429) | offset(000012) | _BSEARCH |
| [000037] | Pixel(802b00) | Next(032863) | offset(000009) | _BSEARCH |
| [000038] | Pixel(805500) | Next(032787) | offset(000002) | _BSEARCH |
| [000039] | Pixel(805555) | Next(032772) | offset(000000) | _BSEARCH |
| [000040] | Pixel(805580) | Next(032742) | offset(000000) | _BSEARCH |
| [000041] | Pixel(80802b) | Next(032688) | offset(000002) | _BSEARCH |
| [000042] | Pixel(808055) | Next(032579) | offset(000001) | _BSEARCH |
| [000043] | Pixel(808080) | Next(032564) | offset(000000) | _BSEARCH |
| [000044] | Pixel(80aa80) | Next(032109) | offset(000005) | _BSEARCH |
| [000045] | Pixel(80aaaa) | Next(032098) | offset(000000) | _BSEARCH |
| [000046] | Pixel(80aad4) | Next(032046) | offset(000001) | _BSEARCH |
| [000047] | Pixel(80aaff) | Next(031542) | offset(000000) | _BSEARCH |
| [000048] | Pixel(80d4aa) | Next(031390) | offset(000004) | _BSEARCH |
| [000049] | Pixel(80d4d4) | Next(031065) | offset(000008) | _BSEARCH |
| [000050] | Pixel(80d4ff) | Next(027061) | offset(000011) | _BSEARCH |
| [000051] | Pixel(aa5500) | Next(026766) | offset(000008) | _BSEARCH |
| [000052] | Pixel(aa5555) | Next(026753) | offset(000000) | _BSEARCH |
| [000053] | Pixel(aa802b) | Next(026709) | offset(000002) | _BSEARCH |
| [000054] | Pixel(aaaa55) | Next(026591) | offset(000001) | _BSEARCH |
| [000055] | Pixel(aad480) | Next(026492) | offset(000002) | _BSEARCH |
| [000056] | Pixel(aaffaa) | Next(026336) | offset(000002) | _BSEARCH |
| [000057] | Pixel(aaffd4) | Next(026164) | offset(000004) | _BSEARCH |
| [000058] | Pixel(aaffff) | Next(024215) | offset(000009) | _BSEARCH |
| [000059] | Pixel(d4802b) | Next(023231) | offset(000008) | _BSEARCH |
| [000060] | Pixel(d4aa55) | Next(023157) | offset(000001) | _BSEARCH |
| [000061] | Pixel(d4d480) | Next(023071) | offset(000003) | _BSEARCH |
| [000062] | Pixel(d4ffaa) | Next(022971) | offset(000003) | _BSEARCH |
| [000063] | Pixel(d4ffd4) | Next(022770) | offset(000006) | _BSEARCH |
| [000064] | Pixel(d4ffff) | Next(020545) | offset(000009) | _BSEARCH |
| [000065] | Pixel(ffaa55) | Next(020454) | offset(000004) | _BSEARCH |
| [000066] | Pixel(ffaa80) | Next(020300) | offset(000000) | _BSEARCH |
| [000067] | Pixel(ffd480) | Next(019929) | offset(000006) | _BSEARCH |
| [000068] | Pixel(ffffaa) | Next(019455) | offset(000008) | _BSEARCH |
| [000069] | Pixel(ffffd4) | Next(018332) | offset(000012) | _BSEARCH |
| [000070] | Pixel(ffffff) | Next(000071) | offset(000014) | _BSEARCH |

FIG. 16

TABLE-01

| DFA State | Pixel | Next | Offset | ActionCode |
|-----------|--------|--------|--------|------------|
| [058316] | 000000 | 058317 | 000000 | _BSEARCH |
| [058317] | aad4aa | 058318 | 000000 | _BSEARCH |
| [058318] | aaffff | 058319 | 000000 | _BSEARCH |
| [058319] | 80d4ff | 058320 | 000000 | _BSEARCH |
| [058320] | 000055 | 058321 | 000000 | _BSEARCH |
| [058321] | 550000 | 058322 | 000000 | _BSEARCH |
| [058322] | 2b0000 | 058323 | 000000 | _BSEARCH |
| [058323] | 2b80d4 | 058324 | 000000 | _BSEARCH |
| [058324] | ffffff | 058325 | 000005 | _BSEARCH |
| [058325] | 802b00 | 058346 | 000001 | _RECOGNIZE |
| [058326] | aa5500 | 058344 | 000001 | _RECOGNIZE |
| [058327] | ffaa55 | 058342 | 000001 | _RECOGNIZE |
| [058328] | ffd480 | 058340 | 000001 | _RECOGNIZE |
| [058329] | ffffaa | 058332 | 000007 | _RECOGNIZE |
| [058330] | ffffff | 058331 | 000000 | _RECOGNIZE |

TABLE-02

| DFA State | CodePoints | GlyphIndex | GlyphColumn | OverlapCode |
|-----------|------------|------------|-------------|-------------|
| [058331] | $ | 0 | 04 | OverlapCode_00 |
| [058332] | $) | 0 | 04 | OverlapCode_01 |
| [058333] | $) | 1 | 00 | OverlapCode_02 |
| [058334] | $] | 0 | 04 | OverlapCode_01 |
| [058335] | $] | 1 | 00 | OverlapCode_02 |
| [058336] | $_ | 0 | 04 | OverlapCode_01 |
| [058337] | $_ | 1 | 00 | OverlapCode_02 |
| [058338] | $y | 0 | 04 | OverlapCode_01 |
| [058339] | $y | 1 | 00 | OverlapCode_02 |
| [058340] | $} | 0 | 04 | OverlapCode_01 |
| [058341] | $} | 1 | 00 | OverlapCode_02 |
| [058342] | $p | 0 | 04 | OverlapCode_01 |
| [058343] | $p | 1 | 00 | OverlapCode_02 |
| [058344] | $f | 0 | 04 | OverlapCode_01 |
| [058345] | $f | 1 | 00 | OverlapCode_02 |
| [058346] | $j | 0 | 04 | OverlapCode_01 |
| [058347] | $j | 1 | 01 | OverlapCode_02 |

FIG. 17

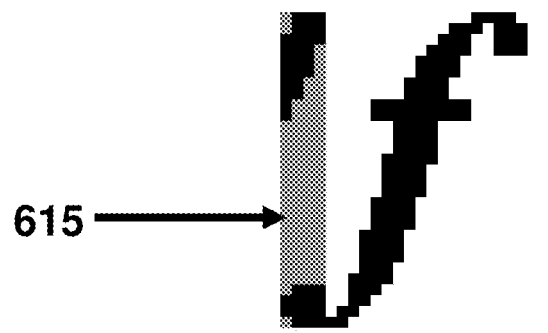
615 →
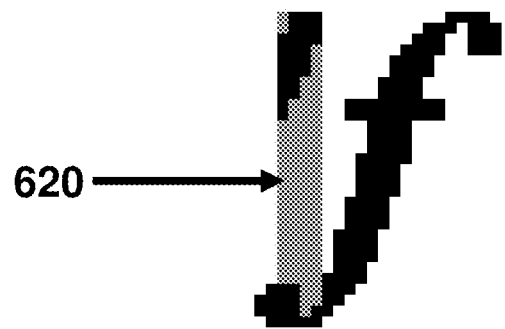
620 →
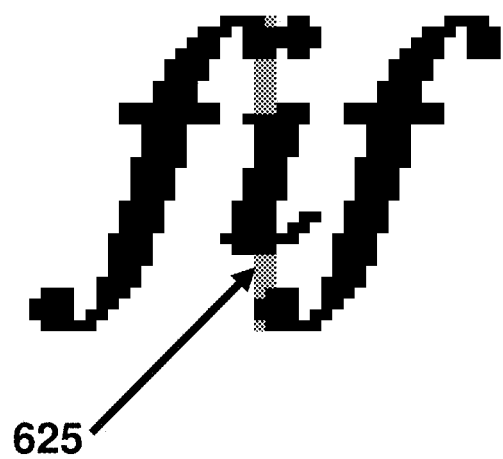
625 →
FIG. 22

| FIGURE | FIGURE ITEM | GlyphIndex 0 OverlapCode | GlyphIndex 1 OverlapCode | GlyphIndex 2 OverlapCode |
|---|---|---|---|---|
| 21 | 600 | 0 | - | - |
| 21 | 605 | 1 | 2 | - |
| 21 | 610 | 3 | 4 | - |
| 22 | 615 | 5 | 6 | - |
| 22 | 620 | 7 | 8 | - |
| 22 | 625 | 9 | 10 | 11 |
| 23 | 630 | 12 | 13 | 14 |
| 23 | 635 | 15 | 16 | 17 |
| 23 | 640 | 18 | 19 | 20 |
| 24 | 645 | 21 | 22 | 23 |
| 25 | 650 | 24 | 25 | 26 |

FIG. 26

```
[000002]   ffffff   Next(000003)   offset(000067)   _BSEARCH
[000068]   ffffaa   Next(019455)   offset(000008)   _BSEARCH
[019461]   ffaa55   Next(019651)   offset(000001)   _BSEARCH
[019651]   ffaa55   Next(019661)   offset(000000)   _BSEARCH
[019661]   ffaa80   Next(019662)   offset(000000)   _BSEARCH
[019662]   ffffff   Next(019663)   offset(000000)   _BSEARCH
[019663]   ffffff   Next(019664)   offset(000000)   _BSEARCH
[019664]   ffffff   Next(019665)   offset(000000)   _BSEARCH
[019665]   ffffff   Next(019666)   offset(000000)   _BSEARCH
[019666]   ffffff   Next(019667)   offset(000005)   _BSEARCH
[019668]   aa5500   Next(019687)   offset(000001)   _RECOGNIZE
[019687]   'f   GlyphIndex(0)   GlyphColumn(00)   OverlapCode_05
[019688]   'f   GlyphIndex(1)   GlyphColumn(00)   OverlapCode_06

[000002]   ffffff   Next(000003)   offset(000067)   _BSEARCH
[000020]   550000   Next(039687)   offset(000007)   _BSEARCH
[039687]   00002b   Next(039952)   offset(000000)   _BSEARCH
[039952]   0055aa   Next(039953)   offset(000001)   _BSEARCH
[039954]   80d4ff   Next(039955)   offset(000000)   _BSEARCH
[039955]   ffffff   Next(039956)   offset(000001)   _BSEARCH
[039957]   ffffff   Next(039958)   offset(000002)   _BSEARCH
[039960]   ffffff   Next(039961)   offset(000005)   _BSEARCH
[039965]   ffffd4   Next(040003)   offset(000002)   _BSEARCH
[040004]   ffffaa   Next(040021)   offset(000000)   _BSEARCH
[040021]   000000   Next(040022)   offset(000001)   _RECOGNIZE
[040022]   'f   GlyphIndex(0)   GlyphColumn(01)   OverlapCode_05
[040023]   'f   GlyphIndex(1)   GlyphColumn(01)   OverlapCode_06

[000002]   ffffff   Next(000003)   offset(000067)   _BSEARCH
[000019]   2b80d4   Next(040106)   offset(000020)   _BSEARCH
[040118]   80d4ff   Next(041827)   offset(000004)   _BSEARCH
[041831]   ffffff   Next(041832)   offset(000005)   _BSEARCH
[041832]   d4802b   Next(042243)   offset(000002)   _BSEARCH
[042243]   ffffaa   Next(042274)   offset(000001)   _BSEARCH
[042274]   ffaa55   Next(042286)   offset(000000)   _BSEARCH
[042286]   d4802b   Next(042287)   offset(000000)   _BSEARCH
[042287]   802b00   Next(042288)   offset(000000)   _BSEARCH
[042288]   55002b   Next(042289)   offset(000001)   _BSEARCH
[042289]   2b80aa   Next(042293)   offset(000002)   _RECOGNIZE
[042293]   'fj   GlyphIndex(0)   GlyphColumn(02)   OverlapCode_21
[042294]   'fj   GlyphIndex(1)   GlyphColumn(02)   OverlapCode_22
[042295]   'fj   GlyphIndex(2)   GlyphColumn(00)   OverlapCode_23
```

FIG. 29

```
[000002]  ffffff  Next(000003)      offset(000067)  _BSEARCH
[000070]  ffffff  Next(000071)      offset(000014)  _BSEARCH
[000082]  ffd480  Next(015525)      offset(000003)  _BSEARCH
[015526]  aa5500  Next(015545)      offset(000002)  _BSEARCH
[015545]  000000  Next(015698)      offset(000000)  _BSEARCH
[015698]  550000  Next(015699)      offset(000000)  _BSEARCH
[015699]  00002b  Next(015700)      offset(000000)  _BSEARCH
[015700]  002b80  Next(015701)      offset(000000)  _BSEARCH
[015701]  2b80d4  Next(015702)      offset(000000)  _BSEARCH
[015702]  80d4ff  Next(015703)      offset(000005)  _BSEARCH
[015703]  802b00  Next(015724)      offset(000001)  _RECOGNIZE
[015724]  fj      GlyphIndex(0)     GlyphColumn(03) OverlapCode_01
[015725]  fj      GlyphIndex(1)     GlyphColumn(01) OverlapCode_02

[000002]  ffffff  Next(000003)      offset(000067)  _BSEARCH
[000059]  d4802b  Next(023231)      offset(000008)  _BSEARCH
[023233]  2b002b  Next(023874)      offset(000001)  _BSEARCH
[023874]  002b80  Next(023884)      offset(000000)  _BSEARCH
[023884]  000000  Next(023885)      offset(000001)  _BSEARCH
[023886]  55aaff  Next(023887)      offset(000001)  _BSEARCH
[023888]  80d4ff  Next(023889)      offset(000002)  _BSEARCH
[023891]  d4ffff  Next(023892)      offset(000005)  _BSEARCH
[023897]  ffffff  Next(023898)      offset(000004)  _BSEARCH
[023900]  ffffaa  Next(023915)      offset(000003)  _BSEARCH
[023915]  000000  Next(023925)      offset(000001)  _RECOGNIZE
[023925]  fj      GlyphIndex(0)     GlyphColumn(04) OverlapCode_01
[023926]  fj      GlyphIndex(1)     GlyphColumn(02) OverlapCode_02

[000002]  ffffff  Next(000003)      offset(000067)  _BSEARCH
[000003]  000000  Next(052301)      offset(000040)  _BSEARCH
[052316]  55552b  Next(056640)      offset(000002)  _BSEARCH
[056642]  d4ffff  Next(056643)      offset(000005)  _BSEARCH
[056644]  555555  Next(057037)      offset(000002)  _BSEARCH
[057038]  ffffd4  Next(057060)      offset(000000)  _BSEARCH
[057060]  ffffaa  Next(057061)      offset(000000)  _BSEARCH
[057061]  ffaa55  Next(057062)      offset(000000)  _BSEARCH
[057062]  aa5500  Next(057063)      offset(000000)  _BSEARCH
[057063]  550000  Next(057064)      offset(000001)  _BSEARCH
[057065]  2b80d4  Next(057066)      offset(000001)  _RECOGNIZE
[057066]  fj      GlyphIndex(0)     GlyphColumn(05) OverlapCode_01
[057067]  fj      GlyphIndex(1)     GlyphColumn(03) OverlapCode_02
```

FIG. 30

```
[000002]   ffffff   Next(000003)    offset(000067)   _BSEARCH
[000015]   2b5555   Next(044586)    offset(000007)   _BSEARCH
[044587]   2b80d4   Next(044699)    offset(000000)   _BSEARCH
[044699]   ffffff   Next(044700)    offset(000000)   _BSEARCH
[044700]   000000   Next(044701)    offset(000000)   _BSEARCH
[044701]   802b00   Next(044702)    offset(000000)   _BSEARCH
[044702]   55002b   Next(044703)    offset(000000)   _BSEARCH
[044703]   002b80   Next(044704)    offset(000000)   _BSEARCH
[044704]   0055aa   Next(044705)    offset(000000)   _BSEARCH
[044705]   55aaff   Next(044706)    offset(000005)   _BSEARCH
[044711]   ffffff   Next(044712)    offset(000001)   _RECOGNIZE
[044712]   fj       GlyphIndex(0)   GlyphColumn(06)  OverlapCode_01
[044713]   fj       GlyphIndex(1)   GlyphColumn(04)  OverlapCode_02

[000002]   ffffff   Next(000003)    offset(000067)   _BSEARCH
[000011]   2b0000   Next(045173)    offset(000006)   _BSEARCH
[045179]   ffffff   Next(045180)    offset(000000)   _BSEARCH
[045180]   ffffff   Next(045181)    offset(000001)   _BSEARCH
[045182]   0055aa   Next(045183)    offset(000000)   _BSEARCH
[045183]   55aaff   Next(045184)    offset(000001)   _BSEARCH
[045185]   80d4ff   Next(045186)    offset(000002)   _BSEARCH
[045188]   d4ffff   Next(045189)    offset(000005)   _BSEARCH
[045194]   ffffff   Next(045195)    offset(000004)   _BSEARCH
[045199]   ffffff   Next(045200)    offset(000001)   _BSEARCH
[045201]   ffffff   Next(045202)    offset(000000)   _RECOGNIZE
[045202]   j        GlyphIndex(0)   GlyphColumn(05)  OverlapCode_00

[000002]   ffffff   Next(000003)    offset(000067)   _BSEARCH
[000036]   55aaff   Next(033429)    offset(000012)   _BSEARCH
[033441]   ffffff   Next(033442)    offset(000005)   _BSEARCH
[033447]   ffffff   Next(033448)    offset(000011)   _BSEARCH
[033459]   ffffff   Next(033460)    offset(000007)   _BSEARCH
[033467]   ffffff   Next(033468)    offset(000008)   _BSEARCH
[033476]   ffffff   Next(033477)    offset(000006)   _BSEARCH
[033483]   ffffff   Next(033484)    offset(000014)   _BSEARCH
[033498]   ffffff   Next(033499)    offset(000000)   _BSEARCH
[033499]   ffffff   Next(033500)    offset(000007)   _BSEARCH
[033507]   ffffff   Next(033508)    offset(000003)   _RECOGNIZE
[033508]   v        GlyphIndex(0)   GlyphColumn(07)  OverlapCode_00
[033509]   x        GlyphIndex(0)   GlyphColumn(09)  OverlapCode_00
[033510]   j        GlyphIndex(0)   GlyphColumn(06)  OverlapCode_00
[033511]   {        GlyphIndex(0)   GlyphColumn(05)  OverlapCode_00
```

FIG. 31

```
//
// One PixelColumn's Matched _RECOGNIZE Node
// pointing to one DFA_Node _IDENTIFIER Nodes
//
struct MatchedItem {
  uint32 ScreenRow;
  uint32 ScreenCol;
  uint32 NodeNumber;
};

//
// Matches PixelColumn (if any) at Image[ROW][COL]
//
inline bool DFA_Type::MatchPixelColumn(Array2D<uint32>& Image,
                                       uint32 ROW,
                                       uint32 COL,
                                       MatchItem& Matched)
{
  int STATE = 0;

TOP:
  switch(DFA[STATE].ActionCode)
  {
      case _BSEARCH:
        if (ROW >= Image.height())
           return false;

STATE = BinarySearch(Image[ROW][COL],
                             DFA[STATE].Next, DFA[STATE].Offset);
        if (!STATE)
           return false;

ROW++;
        goto TOP;

case _RECOGNIZE:
        Matched.ImageRow    = ROW - 1;
        Matched.ImageCol    = COL;
        Matched.NodeNumber  = STATE;
        return true;

default:
         return false;
  }
  return false;
}
```

FIG. 36

```
DFA
State      Pixel     Next      Offset    ActionCode
--------   ------    ------    ------    ----------
[000001]   aaaaaa    058316    000000    _BSEARCH
[058316]   000000    058317    000000    _BSEARCH
[058317]   aad4aa    058318    000000    _BSEARCH
[058318]   aaffff    058319    000000    _BSEARCH
[058319]   80d4ff    058320    000000    _BSEARCH
[058320]   000055    058321    000000    _BSEARCH
[058321]   550000    058322    000000    _BSEARCH
[058322]   2b0000    058323    000000    _BSEARCH
[058323]   2b80d4    058324    000000    _BSEARCH
[058324]   ffffff    058325    000005    _BSEARCH
[058330]   ffffff    058331    000000    _RECOGNIZE DFA
State      CodePoint   GlyphIndex   GlyphColumn   OverlapCode
---------  ---------   ----------   -----------   -----------
[058331]       $           0             04       OverlapCode_00
```

FIG. 38

```
[000002]  ffffff   Next(000003)   offset(000067)   _BSEARCH
[000070]  ffffff   Next(000071)   offset(000014)   _BSEARCH
[000085]  ffffff   Next(000086)   offset(000016)   _BSEARCH
[000102]  ffffff   Next(000103)   offset(000049)   _BSEARCH
[000152]  ffffff   Next(000153)   offset(000022)   _BSEARCH
[000175]  ffffff   Next(000176)   offset(000010)   _BSEARCH
[000180]  d4802b   Next(001005)   offset(000000)   _BSEARCH
[001005]  aa5500   Next(001006)   offset(000001)   _BSEARCH
[001007]  ffffaa   Next(001008)   offset(000000)   _BSEARCH
[001008]  ffffff   Next(001009)   offset(000000)   _BSEARCH
[001009]  ffffff   Next(001010)   offset(000000)   _RECOGNIZE
[001010]  $    GlyphIndex(0)  GlyphColumn(00)  OverlapCode_00

[000002]  ffffff   Next(000003)   offset(000067)   _BSEARCH
[000069]  ffffd4   Next(018332)   offset(000012)   _BSEARCH
[018338]  d4802b   Next(019333)   offset(000002)   _BSEARCH
[019335]  d4802b   Next(019336)   offset(000000)   _BSEARCH
[019336]  ffffaa   Next(019337)   offset(000000)   _BSEARCH
[019337]  ffffff   Next(019338)   offset(000000)   _BSEARCH
[019338]  55aaff   Next(019339)   offset(000000)   _BSEARCH
[019339]  0055aa   Next(019340)   offset(000000)   _BSEARCH
[019340]  550000   Next(019341)   offset(000000)   _BSEARCH
[019341]  ffd480   Next(019342)   offset(000000)   _BSEARCH
[019342]  ffffff   Next(019343)   offset(000000)   _RECOGNIZE
[019343]  $    GlyphIndex(0)  GlyphColumn(01)  OverlapCode_00

[000002]  ffffff   Next(000003)   offset(000067)   _BSEARCH
[000037]  802b00   Next(032863)   offset(000009)   _BSEARCH
[032864]  002b80   Next(033360)   offset(000002)   _BSEARCH
[033360]  00002b   Next(033379)   offset(000000)   _BSEARCH
[033379]  550000   Next(033380)   offset(000000)   _BSEARCH
[033380]  ffffaa   Next(033381)   offset(000000)   _BSEARCH
[033381]  ffaa80   Next(033382)   offset(000000)   _BSEARCH
[033382]  aa8080   Next(033383)   offset(000000)   _BSEARCH
[033383]  000000   Next(033384)   offset(000000)   _BSEARCH
[033384]  80aaff   Next(033385)   offset(000000)   _BSEARCH
[033385]  ffffff   Next(033386)   offset(000000)   _RECOGNIZE
[033386]  $    GlyphIndex(0)  GlyphColumn(02)  OverlapCode_00
```

FIG. 39

```
[000002]  ffffff  Next(000003)  offset(000067)  _BSEARCH
[000003]  000000  Next(052301)  offset(000040)  _BSEARCH
[052333]  d4d4aa  Next(054221)  offset(000000)  _BSEARCH
[054221]  555580  Next(054222)  offset(000000)  _BSEARCH
[054222]  00002b  Next(054223)  offset(000000)  _BSEARCH
[054223]  550000  Next(054224)  offset(000000)  _BSEARCH
[054224]  80d4aa  Next(054225)  offset(000000)  _BSEARCH
[054225]  d4d480  Next(054226)  offset(000000)  _BSEARCH
[054226]  000000  Next(054227)  offset(000000)  _BSEARCH
[054227]  ffffff  Next(054228)  offset(000001)  _BSEARCH
[054229]  ffffff  Next(054230)  offset(000000)  _RECOGNIZE
[054230]  $       GlyphIndex (0)  GlyphColumn(03)  OverlapCode_00

[000001]  aaaaaa  Next(058316)  offset(000000)  _BSEARCH
[058316]  000000  Next(058317)  offset(000000)  _BSEARCH
[058317]  aad4aa  Next(058318)  offset(000000)  _BSEARCH
[058318]  aaffff  Next(058319)  offset(000000)  _BSEARCH
[058319]  80d4ff  Next(058320)  offset(000000)  _BSEARCH
[058320]  000055  Next(058321)  offset(000000)  _BSEARCH
[058321]  550000  Next(058322)  offset(000000)  _BSEARCH
[058322]  2b0000  Next(058323)  offset(000000)  _BSEARCH
[058323]  2b80d4  Next(058324)  offset(000000)  _BSEARCH
[058324]  ffffff  Next(058325)  offset(000005)  _BSEARCH
[058330]  ffffff  Next(058331)  offset(000000)  _RECOGNIZE
[058331]  $       GlyphIndex (0)  GlyphColumn(04)  OverlapCode_00

[000002]  ffffff  Next(000003)  offset(000067)  _BSEARCH
[000007]  002b80  Next(048032)  offset(000007)  _BSEARCH
[048036]  5555aa  Next(048348)  offset(000000)  _BSEARCH
[048348]  ffffff  Next(048349)  offset(000001)  _BSEARCH
[048350]  ffffff  Next(048351)  offset(000000)  _BSEARCH
[048351]  aaffff  Next(048352)  offset(000001)  _BSEARCH
[048353]  55aaff  Next(048354)  offset(000002)  _BSEARCH
[048356]  55aaff  Next(048357)  offset(000005)  _BSEARCH
[048362]  ffffff  Next(048363)  offset(000004)  _BSEARCH
[048367]  ffffff  Next(048368)  offset(000001)  _BSEARCH
[048369]  ffffff  Next(048370)  offset(000000)  _RECOGNIZE
[048370]  $       GlyphIndex(0)   GlyphColumn(05)  OverlapCode_00
```

FIG. 40

```
[000002]  ffffff   Next(000003)   offset(000067)  _BSEARCH
[000064]  d4ffff   Next(020545)   offset(000009)  _BSEARCH
[020554]  ffffff   Next(020555)   offset(000005)  _BSEARCH
[020560]  ffffff   Next(020561)   offset(000011)  _BSEARCH
[020572]  ffffff   Next(020573)   offset(000006)  _BSEARCH
[020579]  ffffff   Next(020580)   offset(000008)  _BSEARCH
[020588]  ffffff   Next(020589)   offset(000006)  _BSEARCH
[020595]  ffffff   Next(020596)   offset(000007)  _BSEARCH
[020603]  ffffff   Next(020604)   offset(000000)  _BSEARCH
[020604]  ffffff   Next(020605)   offset(000007)  _BSEARCH
[020612]  ffffff   Next(020613)   offset(000002)  _RECOGNIZE
[020613]  $     GlyphIndex(0)   GlyphColumn(06)  overlapCode_00
[020614]  (     GlyphIndex(0)   GlyphColumn(05)  overlapCode_00
[020615]  5     GlyphIndex(0)   GlyphColumn(06)  overlapCode_00
```

FIG. 41

```
[000001]  aaaaaa   Next(058316)   offset(000000)   _BSEARCH
[058316]  000000   Next(058317)   offset(000000)   _BSEARCH
[058317]  aad4aa   Next(058318)   offset(000000)   _BSEARCH
[058318]  aaffff   Next(058319)   offset(000000)   _BSEARCH
[058319]  80d4ff   Next(058320)   offset(000000)   _BSEARCH
[058320]  000055   Next(058321)   offset(000000)   _BSEARCH
[058321]  550000   Next(058322)   offset(000000)   _BSEARCH
[058322]  2b0000   Next(058323)   offset(000000)   _BSEARCH
[058323]  2b80d4   Next(058324)   offset(000000)   _BSEARCH
[058324]  ffffff   Next(058325)   offset(000005)   _BSEARCH
[058329]  ffffaa   Next(058332)   offset(000007)   _RECOGNIZE
[058332]  $)       GlyphIndex(0)  GlyphColumn(04)  OverlapCode_01
[058333]  $)       GlyphIndex(1)  GlyphColumn(00)  OverlapCode_02
[058334]  $]       GlyphIndex(0)  GlyphColumn(04)  OverlapCode_01
[058335]  $]       GlyphIndex(1)  GlyphColumn(00)  OverlapCode_02
[058336]  $_       GlyphIndex(0)  GlyphColumn(04)  OverlapCode_01
[058337]  $_       GlyphIndex(1)  GlyphColumn(00)  OverlapCode_02
[058338]  $y       GlyphIndex(0)  GlyphColumn(04)  OverlapCode_01
[058339]  $y       GlyphIndex(1)  GlyphColumn(00)  OverlapCode_02
```

FIG. 43

```
735
        typedef unsigned int    uint32;

struct MatchedGlyph {
           uint32 CodePoint;   // UTF-32 Unicode Codepoint value
           uint32 top;         // Pixel Coordinate within Graphic Image
           uint32 left;        // Pixel Coordinate within Graphic Image
           uint32 bottom;      // Pixel Coordinate within Graphic Image
           uint32 right;       // Pixel Coordinate within Graphic Image
740     } class MatchedGlyphList {
        private:
           std::vector<MatchedGlyph> GlyphList;
        }
```

```
736
        struct Identifier_Node {
           uint32 CodePoints[3];  // Three UTF-32 Unicode CodePoints
           uint8 GlyphIndex;      // Index into above CodePoints[]
           uint8 GlyphColumn;     // Zero to GlyphPixelWidth - 1
           uint8 OverlapCode;     // 0 - 26
737     } class Identifier_NodeList {
           std::vector<Identifier_Node> Overlaps;
738     } class PixelColumn {
        private:
           Identifier_NodeList OverlapList;
           std::vector<uint32> Pixels;
739     } class PixelColumnList {
           std::vector<PixelColumn> List;
        }
```

FIG. 44

DFA Recognition Trace 01

| ImageRow | ImageColumn | DFA Node | CodePoint | GlyphIndex | GlyphColumn | OverlapCode |
|---|---|---|---|---|---|---|
| 10 | 6 | [ 1010] | $ | 0 | 00 | 00 |
| 10 | 7 | [ 19343] | $ | 0 | 01 | 00 |
| 10 | 8 | [ 33386] | $ | 0 | 02 | 00 |
| 10 | 9 | [ 54230] | $ | 0 | 03 | 00 |
| 10 | 10 | [ 58332] | $) | 0 | 04 | 01 |
| 10 | 10 | [ 58333] | $) | 1 | 00 | 02 |
| 10 | 10 | [ 58334] | $] | 0 | 04 | 01 |
| 10 | 10 | [ 58335] | $] | 1 | 00 | 02 |
| 10 | 10 | [ 58336] | $_ | 0 | 04 | 01 |
| 10 | 10 | [ 58337] | $_ | 1 | 00 | 02 |
| 10 | 10 | [ 58338] | $y | 0 | 04 | 01 |
| 10 | 10 | [ 58339] | $y | 1 | 00 | 02 |
| 10 | 11 | [ 48371] | $] | 0 | 05 | 01 |
| 10 | 11 | [ 48372] | $] | 1 | 01 | 02 |
| 10 | 11 | [ 48373] | $_ | 0 | 05 | 01 |
| 10 | 11 | [ 48374] | $_ | 1 | 01 | 02 |
| 10 | 11 | [ 48375] | $y | 0 | 05 | 01 |
| 10 | 11 | [ 48376] | $y | 1 | 01 | 02 |
| 10 | 12 | [ 20674] | $] | 0 | 06 | 01 |
| 10 | 12 | [ 20675] | $] | 1 | 02 | 02 |
| 10 | 12 | [ 20676] | 5] | 0 | 06 | 01 |
| 10 | 12 | [ 20677] | 5] | 1 | 02 | 02 |
| 10 | 13 | [ 19506] | ] | 0 | 03 | 00 |
| 10 | 14 | [ 39717] | ] | 0 | 04 | 00 |
| 10 | 15 | [ 57504] | ] | 0 | 05 | 00 |
| 10 | 16 | [ 35721] | ] | 0 | 06 | 00 |

| PixelsBetween[CH1][CH2] | | |
|---|---|---|
| CP1 | CP2 | Value |
| $ | ) | -3 |
| $ | ] | -3 |
| $ | _ | -3 |
| $ | y | -3 |
| 5 | ] | -3 |

| GlyphPixelWidth | |
|---|---|
| $ | 7 |
| ) | 6 |
| ] | 7 |
| _ | 8 |
| Y | 7 |

FIG. 48

```
01  //
02  // Erase ALL PixelColumn Nodes that do not form whole Glyphs
03  // These Nodes are erased from SelectedList.NodeList
04  //
05  void SelectedNodesList::SelectWholeGlyphs(std::vector<DFA_Node> DFA,
06                                            int& GlyphPixelwidth[])
07  {
08      ResetValidated(false);  // Mark all DFA Identifier Nodes as Invalid
09      for (uint32 PixelColumnIndex = 0;
10           PixelColumnIndex < SelectedList.size(); PixelColumnIndex++)
11      {
12          for (uint32 NodeIndex = 0;
13               NodeIndex < SelectedList[PixelColumnIndex].NodesList.size(); NodeIndex++)
14          {
15              uint32 NodeNumber = SelectedList[PixelColumnIndex].NodesList[NodeIndex];
16              if (DFA[ NodeNumber ].GlyphColumn == 0)
17              {
18                  uint32 GlyphIndex = DFA[ NodeNumber ].GlyphIndex;
19                  uint32 CodePoint = DFA[ NodeNumber ].CodePoints[GlyphIndex];
20                  uint32 LeftImageColumn = SelectedList[PixelColumnIndex].ImageColumn;
21                  if ( MatchNextPixelColumns(DFA, GlyphPixelwidth, CodePoint,
22                                             LeftImageColumn, PixelColumnIndex + 1) )
23                      MarkValidNodes(DFA, GlyphPixelwidth, CodePoint, NodeIndex, PixelColumnIndex);
24              }
25          }
26      }
27      EraseInvalidNodes();  // All Nodes that have not been marked as valid
28  }
```

DFA Recognition Trace 02

| ImageRow | ImageColumn | DFA Node | CodePoint | GlyphIndex | GlyphColumn | OverlapCode |
|---|---|---|---|---|---|---|
| 10 | 6 | [ 1010] | $ | 0 | 00 | 00 |
| 10 | 7 | [ 19343] | $ | 0 | 01 | 00 |
| 10 | 8 | [ 33386] | $ | 0 | 02 | 00 |
| 10 | 9 | [ 54230] | $ | 0 | 03 | 00 |
| 10 | 10 | [ 58332] | $) | 0 | 04 | 01 |
| 10 | 10 | [ 58334] | $] | 0 | 04 | 01 |
| 10 | 10 | [ 58335] | $] | 1 | 00 | 02 |
| 10 | 10 | [ 58336] | $_ | 0 | 04 | 01 |
| 10 | 10 | [ 58338] | $y | 0 | 04 | 01 |
| 10 | 11 | [ 48371] | $] | 0 | 05 | 01 |
| 10 | 11 | [ 48372] | $] | 1 | 01 | 02 |
| 10 | 11 | [ 48373] | $_ | 0 | 05 | 01 |
| 10 | 11 | [ 48375] | $y | 0 | 05 | 01 |
| 10 | 12 | [ 20674] | $] | 0 | 06 | 01 |
| 10 | 12 | [ 20675] | $] | 1 | 02 | 02 |
| 10 | 12 | [ 20677] | 5] | 1 | 02 | 02 |
| 10 | 13 | [ 19506] | ] | 0 | 03 | 00 |
| 10 | 14 | [ 39717] | ] | 0 | 04 | 00 |
| 10 | 15 | [ 57504] | ] | 0 | 05 | 00 |
| 10 | 16 | [ 35721] | ] | 0 | 06 | 00 |

FIG. 50

DFA Recognition Trace 03

| ImageRow | ImageColumn | DFA Node | CodePoint | GlyphIndex | GlyphColumn | OverlapCode |
|---|---|---|---|---|---|---|
| 10 | 6 | [ 1010] | $ | 0 | 00 | 00 |
| 10 | 7 | [ 19343] | $ | 0 | 01 | 00 |
| 10 | 8 | [ 33386] | $ | 0 | 02 | 00 |
| 10 | 9 | [ 54230] | $ | 0 | 03 | 00 |
| 10 | 10 | [ 58334] | $] | 0 | 04 | 01 |
| 10 | 10 | [ 58335] | $] | 1 | 00 | 02 |
| 10 | 11 | [ 48371] | $] | 0 | 05 | 01 |
| 10 | 11 | [ 48372] | $] | 1 | 01 | 02 |
| 10 | 12 | [ 20674] | $] | 0 | 06 | 01 |
| 10 | 12 | [ 20675] | $] | 1 | 02 | 02 |
| 10 | 13 | [ 19506] | ] | 0 | 03 | 00 |
| 10 | 14 | [ 39717] | ] | 0 | 04 | 00 |
| 10 | 15 | [ 57504] | ] | 0 | 05 | 00 |
| 10 | 16 | [ 35721] | ] | 0 | 06 | 00 |

FIG. 51

IMAGE 111

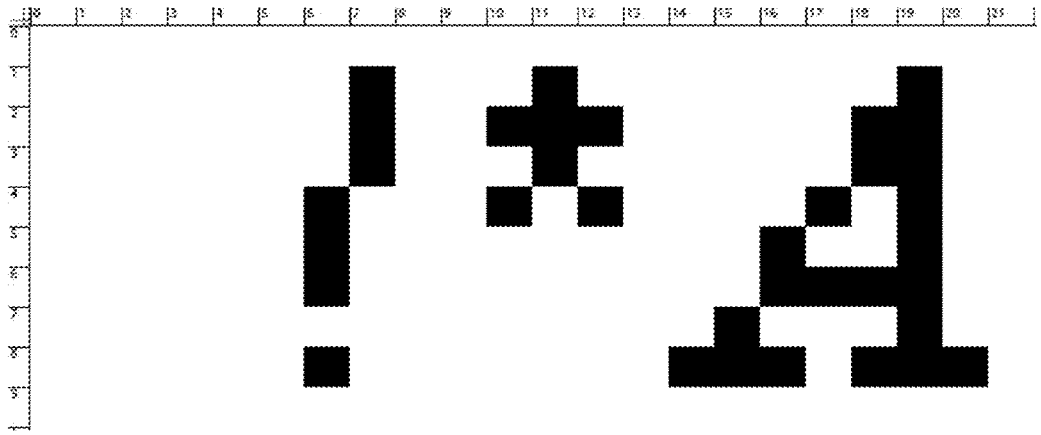

TABLE 222

```
CodePoint(!)  Top( 0)  Left( 6)  Bottom(10)  Right( 7)  { TON }
CodePoint(')  Top( 0)  Left( 7)  Bottom(10)  Right( 7)  { TOBP }
CodePoint(*)  Top( 0)  Left(10)  Bottom(10)  Right(12)  { TON }
CodePoint(')  Top( 0)  Left(11)  Bottom(10)  Right(11)  { TOBP }
CodePoint(.)  Top( 0)  Left(14)  Bottom(10)  Right(14)  { TOBN }
CodePoint(A)  Top( 0)  Left(14)  Bottom(10)  Right(20)  { TON, TOP }
CodePoint(.)  Top( 0)  Left(20)  Bottom(10)  Right(20)  { TOBP }

TON  = This Glyph Totally Overlaps Next  Glyph
TOP  = This Glyph Totally Overlaps Prior Glyph
TOBP = This Glyph is Totally Overlapped By Prior Glyph
TOBN = This Glyph is Totally Overlapped By Next  Glyph
```

FIG. 52

SelectedNodesList table

| ImageRow | ImageColumn | DFA Node | CodePoint | GlyphIndex | GlyphColumn | OverlapCode |
|---|---|---|---|---|---|---|
| 10 | 6  | [ 1017] | ! | 0 | 00 | 00 |
| 10 | 7  | [ 6496] | ! | 0 | 01 | 00 |
| 10 | 7  | [ 6499] | ' | 0 | 00 | 00 |
| 10 | 10 | [ 1610] | * | 0 | 00 | 00 |
| 10 | 11 | [ 6499] | ' | 0 | 00 | 00 |
| 10 | 11 | [ 6500] | * | 0 | 01 | 00 |
| 10 | 12 | [ 1611] | * | 0 | 02 | 00 |
| 10 | 14 | [   55] | . | 0 | 00 | 00 |
| 10 | 14 | [   63] | A | 0 | 00 | 00 |
| 10 | 15 | [  159] | A | 0 | 01 | 00 |
| 10 | 16 | [  381] | A | 0 | 02 | 00 |
| 10 | 17 | [  818] | A | 0 | 03 | 00 |
| 10 | 18 | [ 1880] | A | 0 | 04 | 00 |
| 10 | 19 | [ 6844] | A | 0 | 05 | 00 |
| 10 | 20 | [   55] | . | 0 | 00 | 00 |
| 10 | 20 | [   64] | A | 0 | 06 | 00 |

FIG. 53

MatchedGlyphList table 333

```
CodePoint(_)  Top( 0)  Left( 5)  Bottom(10)  Right( 9)
CodePoint(_)  Top( 0)  Left( 6)  Bottom(10)  Right(10)
CodePoint(|)  Top( 0)  Left(10)  Bottom(10)  Right(13)
CodePoint(_)  Top( 0)  Left(15)  Bottom(10)  Right(19)
```

METHOD AND SYSTEM FOR RECOGNIZING MACHINE GENERATED CHARACTER GLYPHS IN GRAPHIC IMAGES

CROSS-REFERENCE TO RELATED APPLICATIONS

The present application claims priority under 35 U.S.C. .sctn. 119(e) from U.S. Provisional Application Ser. No. 61/800,725, entitled "METHOD AND SYSTEM FOR RECOGNIZING MACHINE GENERATED CHARACTER GLYPHS IN GRAPHIC IMAGES" and filed on Mar. 15, 2013, by Peter L. Olcott, the full disclosure of which is hereby incorporated by reference. The present application relates to U.S. Pat. No. 7,046,848 the full disclosure of which is hereby incorporated by reference and Provisional Application Ser. No. 60/314,184, entitled "Method for translating machine generated graphical representations of characters into their original collating sequence values" and filed on Aug. 22, 2001, by Peter L. Olcott, the full disclosure of which is hereby incorporated by reference.

FIELD OF THE INVENTION

The present invention relates to methods and systems for recognizing character glyphs contained in graphic images.

BACKGROUND OF THE INVENTION

Intelligent recognition of bitmapped binary images of text for the purpose of estimating their corresponding character values is often referred to as optical character recognition ("OCR"). Most OCR systems in use today utilize stochastic processes to recognize the text in the graphic images. Because stochastic processes are fundamentally based on chance or probability, these systems are not always as reliable as may be desired. Moreover, the processing time of such stochastic processes can be quite high in some instances and thus not particularly practical.

One attempt to overcome some of the above-noted deficiencies is described in U.S. Pat. No. 5,321,773. The image recognition technique disclosed in the '773 patent is a grammar-based image modeling and recognition system that automatically produces an image decoder based on a finite state network. Although the system described in the '773 patent is substantially faster than the traditional stochastic processes, it is based on stochastic methods (like the traditional approaches) and thus inherently involves chance or probability. Another noteworthy disadvantage of the recognition system in the '773 patent is that it requires extremely detailed font metrics information for the characters to be recognized, including character sidebearings and baseline depths which typically cannot readily obtained. Yet another disadvantage of the image recognition system disclosed in the '773 is that it cannot recognize text when pairs of characters (which may be denoted by black pixels on a white background) have black pixels that overlap.

Since the first patent issued two other related technologies directly dealing with machine generated character glyphs were discovered:

The first is a commercial product named Kleptomania from a company named Structu Rise. According to the Pavel Senatorov CEO, at Structu Rise from its inception their product Kleptomania is not based on Deterministic Finite Automaton (DFA) technology, and its steps are not based on the consecutive parts of a character.

After testing Kleptomania it was clear that the version of Kleptomania downloaded 2007 Apr. 30 had substantially lower accuracy than that of the working prototype of the preferred embodiment of this invention. It was also apparent that the technology of Kleptomania was unable to process character glyphs that had been subject to ClearType® font edge smoothing with any accuracy at all. From this primary research it was determined that Kleptomania is fundamentally different technology with substantially different capabilities.

The second is a paper entitled: Fast Optical Character Recognition through Glyph Hashing for Document Conversion, by Kumar Chellapilla, Patrice Simard, and Radoslav Nickolov all from Microsoft Research. Eighth International Conference on Document Analysis and Recognition (ICDAR '05) pp. 829-834

This technology is also quite different than the technology of the present invention. The only similarity is that the method of this paper also directly deals with machine generated character glyphs. This method is entirely incapable of recognizing character glyphs from graphic images, and is not based on DFA technology.

Every other system that has been encountered for recognizing character glyphs was fundamentally based on a stochastic process, and incapable of recognizing character glyphs at typical 96 dots per inch (DPI), computer display screen resolutions. Market leader OmniPage® 15 was tested and utterly failed to recognize any characters on the test sample submitted to their presales technical support.

In view of the above-noted deficiencies, it would be desirable to provide an image recognition system that is capable of recognizing machine generated text in graphic images with (at least in most cases) complete accuracy. It would further be desirable to provide an image recognition system that is substantially faster than traditional OCR technology, but is also able to recognize text having characters with overlapping black (i.e., foreground) pixels. It would also be desirable to provide an image recognition system that is capable of recognizing machine generated text in graphic images using font metrics information that is readily obtainable.

SUMMARY OF THE INVENTION

According to the first aspect of an embodiment of the present invention, a method for constructing a deterministic finite automaton (DFA) for recognizing machine generated character glyphs in a graphic image includes collecting individual pixelcolumns of character glyphs to be recognized in the graphic image. When these individual glyph pixelcolumns are collected every permutation of overlapping glyph pixelcolumn to be recognized is included in the collected set of pixelcolumns. The method further includes sorting the collected glyph pixelcolumns, merging the identical prefixes of these glyph pixelcolumns together, generating a DFA recognizer from the merged identical prefixes, such that the number of DFA elements generated is substantially less than the number of DFA states multiplied by the number of possible pixel RGB values, and storing the DFA.

These last two steps may be referred to separately or understood as a single combined step. In the preferred embodiment the DFA is generated directly into memory, thus the generation step and the storing step are combined into a single step.

The phrase "number of possible pixel RGB values" may be considered relative to either a typical computer display screen, or the input graphic image. In the case where an input image is monochrome (two colors) and the FontInstance to be recognized is also monochrome (two colors), the DFA may not have substantially fewer elements than the number of possible image colors multiplied by the number of DFA states. In this case the "number of possible pixel RGB values" is to explicitly refer to the typical computer display screen.

According to a another aspect of an embodiment of the present invention, a method for recognizing machine generated character glyphs from graphic image includes combining together the recognized individual glyph pixelcolumns into correctly matched whole glyphs by eliminating any recognized glyph pixelcolumns that do not correctly form whole glyphs.

According to another aspect of an embodiment of the present invention, a method for recognizing machine generated character glyphs from graphic image includes validating the recognized whole glyphs against each other to eliminate any erroneously matched glyphs.

According to a another aspect of an embodiment of the present invention, a method for recognizing machine generated character glyphs from graphic image for the purpose of exchanging data between application programs.

These and other benefits and features of embodiments of the invention will be apparent upon consideration of the following detailed description of preferred embodiments thereof, presented in connection with the following drawings in which like reference numerals are used to identify like elements throughout.

BRIEF DESCRIPTION OF THE DRAWINGS

FIG. 3 is a table of non-overlapped pixelcolumn data showing a sample of the input to process 40 of FIG. 2 before this data has been sorted.

FIG. 4 is a table of overlap pairs of pixelcolumn data showing a sample of the input to process 40 of FIG. 2 before this data has been sorted.

FIG. 5 is a table of overlap triads of pixelcolumn data showing a sample of the input to process 40 of FIG. 2 before this data has been sorted.

FIG. 6 is a table of pixelcolumn data showing a sample of the first 34 rows of data used as input to process 40 of FIG. 2 after this data has been sorted.

FIG. 9 provides exemplary C++ data structures DFA_Node, SelectedNodes, and SelectedNodesList.

FIG. 12 provides an exemplary C++ function for determining an OverlapCode.

FIG. 16 shows the first 71 states of a constructed DFA. State 540 is the DFA start state.

FIG. 17 shows the last 32 states of the DFA provided in FIG. 16. TABLE-01 shows the State Transition nodes, and TABLE-02 shows the Identifier nodes.

FIG. 21 through FIG. 25 show examples of all of the types of overlapping glyph pixelcolumns that are currently known.

FIG. 26 provides a table that corresponds to FIG. 21 through FIG. 25 indicating how OverlapCode values are associated with the relative glyph positions {0,1,2} for the various types of overlaps.

FIG. 29, FIG. 30, and FIG. 31 provide a DFA execution trace of the triple overlap shown in FIG. 27.

FIG. 36 Provides an exemplary C++ essentially equivalent to the logic flow diagram provided in FIG. 35.

FIG. 38 Provides an DFA execution trace recognizing the fourth glyph pixelcolumn of FIG. 37.

FIG. 39 through FIG. 41 provide a DFA execution trace recognizing all of the glyph pixelcolumns of the DollarSign glyph shown in FIG. 37.

FIG. 43 Shows a DFA execution trace if pixelcolumn 725 of FIG. 42.

FIG. 44 Provides an exemplary C++ data structure MatchedGlyphList used to provide the final output of the recognition process 700 of FIG. 34. FIG. 44 also shows exemplary C++ class PixelColumnList used for collecting glyph pixelcolumn data in process 100 of FIG. 2.

FIG. 48 shows a concise DFA trace recognizing all of the glyph pixelcolumns shown if FIG. 42. and two tables used to explain subprocess 860 of process 850.

FIG. 49 provides an exemplary C++ function that implements subprocess 860 of process 850.

FIG. 50 shows the remaining glyph pixelcolumns after the validation step subprocess 860 of process 850 has occurred.

FIG. 51 shows the pixelcolumns of FIG. 50 after pixelcolumns lacking corresponding OverlapCodes have been removed.

FIG. 52 and FIG. 53 show examples of erroneous horizontal substring glyphs.

DETAILED DESCRIPTION OF THE PREFERRED EMBODIMENTS

Figures 1A, 1B, 1C:
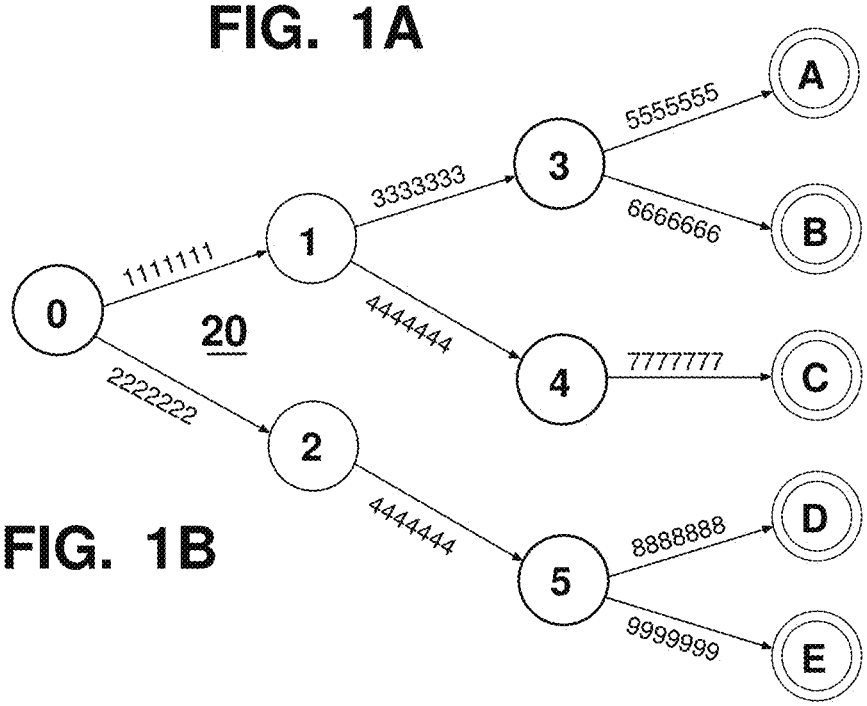
FIG. 1A, FIG. 1B, and FIG. 1C provide a simplified example showing how glyph pixelcolumn data can be translated into a DFA recognizer.

As persons skilled in the art will appreciate, many different DFA recognizers and variations could be constructed based on the principals and basic methods described below. The currently preferred embodiment derives a DFA capable of recognizing all character glyphs in a graphic image with 100% accuracy. This application describes a single preferred embodiment.

All of the specific examples provided in this disclosure are for illustrative purposes only and are not intended to be limiting. Persons skilled in the art would recognize numerous alternatives these specific examples.

The basic concept of this invention is the recognition of pixel patterns corresponding to machine generated character glyphs using a deterministic finite automaton (DFA).

The primary benefit of using a DFA to recognize machine generated character glyphs is that recognition can achieve 100% accuracy. 100% accuracy is generally not possible using conventional stochastic optical character recognition (OCR). The reason for this difference is that a DFA determines its results as contrasted with a stochastic process that estimates its results. The DFA recognizer is also about two orders of magnitude faster than conventional stochastic OCR technology.

The DFA state transition function is defined by a state transition table. The vertical dimension of this table specifies a current state and the horizontal dimension specifies a current input pixel RGB value. The intersection of the current state and the current input specifies the next state in the state transition sequence.

The current input pixel RGB value is an integer, and will be referred to as the color of the pixel. The DFA determines its next state entirely on the basis of its current input and its current state.

The implementation of the state transition table can be understood conceptually as a jagged two-dimensional array: The vertical dimension of the state transition table includes every contiguous value from zero to the number of DFA states minus one. The horizontal dimension of the state transition table (the jagged dimension) only includes the subset of pixel RGB values that could be matched at the specific point in the DFA state transition sequence determined by the current state.

In U.S. Pat. No. 7,046,848 this conceptual jagged two-dimensional array was referred to as a "Sparse Matrix" defined as the common meaning of the term "Sparse" combined with the common computer science meaning of the term "Matrix", a two dimensional array of elements. In other words the state transition table is defined such that the number of table elements is substantially less than the number of DFA states multiplied by the number of possible pixel RGB values.

This conceptual two-dimensional state transition table is implemented as a single-dimensional array of DFA elements. Each DFA element specifies a list of other DFA elements. This list of other DFA elements implements the horizontal (jagged) dimension of the conceptual two-dimensional state transition table.

The vertical dimension of the conceptual two-dimensional state transition table is accessed using the current state as the single-dimensional array subscript.

The horizontal dimension of the conceptual two-dimensional state transition table is accessed using the current input to search the list of DFA elements specified by the current state. This list has been sorted by pixel RGB values so that binary search can be used as the search method.

When a match occurs, it occurs at a specific DFA element. This specific DFA element then specifies another list of other DFA elements. This next list is searched by obtaining the pixel immediately below the previous current input pixel within the input graphic image. This process continues until either a DFA final state is reached, or the binary search fails to match.

The above paragraphs describe those aspects of the current invention that are the same as the technology described in U.S. Pat. No. 7,046,848.

The difference between the DFA of this technology and the DFA of U.S. Pat. No. 7,046,848 is that the DFA of this technology only matches individual glyph pixelcolumns instead of whole glyphs. Another step has been added to this original process to combine together these individual glyph pixelcolumns into correctly matched whole glyphs.

Because this DFA only matches individual pixelcolumns, instead of whole glyphs, only the data from non-overlapped glyphs and actual overlapping pixelcolumns need be included in the DFA recognizer.

The technology shown in U.S. Pat. No. 7,046,848 stored every permutation of DoubleOverlapping and TripleOverlapping whole glyphs in its DFA recognizer. By only storing the data from non-overlapped glyph pixelcolumns and actual overlapping pixelcolumns instead of storing whole overlapping glyphs we reduce memory requirements by about two orders of magnitude. This reduction in memory requirements provides two functional benefits:

a) Complex glyphs (glyphs with more than one bitmap per CodePoint) can be recognized.

b) Much larger character sets can be recognized. Preliminary testing indicates that this improved technology is capable of recognizing character sets as large as CJK Unified Ideographs.

Individual glyphs are recognized by piecing together the recognized overlapping and non-overlapping pixelcolumns.
Simplified Example of Creating a DFA Recognizer The following simplified example will make the above explanations more concrete. This example shows the creation of a DFA with only eleven states, and each glyph pixelcolumn is only three pixels tall. The pixel RGB values have been specified as sequences of the same decimal digit. Real glyph pixelcolumn data is generally far more complex. This example has been simplified as an aid to understanding.

The basic principles shown in this simplified example are the same as those used in the working system prototype.

Another example using real glyph pixelcolumn data will be provided in the section entitled: CREATING THE DFA RECOGNIZER.

This simplified example will construct a DFA capable of recognizing a single glyph pixelcolumn beginning at a specific pixel within a graphic image. To determine all of the glyph pixelcolumns within a graphic image the resulting DFA must be executed (beginning at its start state) using each pixel of the input graphic image.

Referring now to FIGS. 1A, 1B, and 1C, a simplified example of the process for constructing a DFA for hypothetical glyph pixelcolumns (A) through (E) will be described. The state transition function of this DFA is entirely defined by a current state and a current input.

Each row of table 10 shown in FIG. 1A describes exactly one glyph pixelcolumn. Each column of this table describes one row of the set of all glyph pixelcolumns. The column of the table shown as FIG. 1A that is labeled Pixel Row(0) shows the topmost pixel RGB values of the set of all glyph pixelcolumns. This set of topmost pixel rows form the basis for constructing the DFA start state.

The pixel RGB values for these glyph pixelcolumns are shown as integers between 1111111 and 9999999, thus forming the image bitmap for each of these three pixel tall glyph pixelcolumns. The labels {A, B, C, D, E} signify glyph pixelcolumn identifiers, specifying exactly which glyph pixelcolumn has been recognized.

Figure 2:
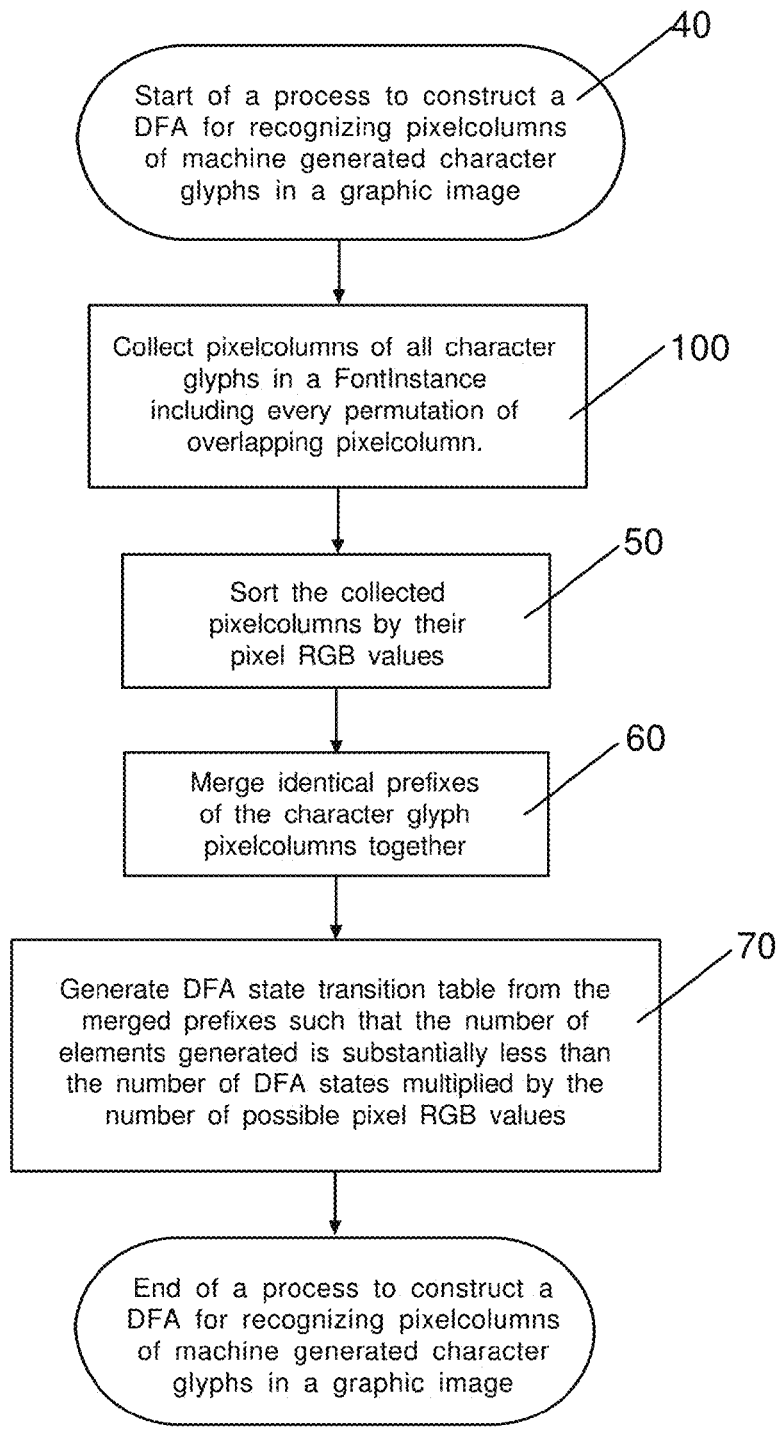
FIG. 2 shows a logic flow diagram of an exemplary process for constructing a DFA for recognizing individual pixelcolumns of machine generated character glyphs in a graphic image.

The data shown in the table of FIG. 1A has already been sorted, thus would be the output of step 50 of process 40 on FIG. 2.

The bitmaps for these glyph pixelcolumns can be transformed into a DFA recognizer by techniques that are well known to persons skilled in the art. For the illustrated example, the DFA recognizer can be constructed by merging the identical prefixes of these glyph pixelcolumns together, and then linking each prior table column (pixel row) to the subsequent table column (pixel row) for which it forms the prefix. Performing this transformation process results in a state transition (or directed) graph 20 such as the one, shown in FIG. 1B. This merging together of identical prefixes implements step 60 of process 40 of FIG. 2.

Graph 20 shown in FIG. 1B uses the notational conventions that are typical for a deterministic finite automaton state transition diagram. As is conventional, the circular vertices (labeled 0,1,2,3,5 and A,B,C,D,E) in this graph denote states, and the set of directed edges (labeled by the individual pixel RGB values 1111111 through 9999999) denote the DFA state transitions. The initial or start state is labeled 0, and the final states (labeled A,B,C,D,E) are indicated by double circles.

The state transitions proceed from the top most pixel of the glyph pixelcolumn, downward to the bottom most pixel of the glyph pixelcolumn. Every time that a state transition occurs, the next lower pixel of the input image becomes the current input pixel.

As persons skilled in the art will understand, the DFA recognizer of graph 20 begins at the DFA start state with its input pixel RGB value and transitions to its next state based on a comparison of that input value to the labels, {1111111, and 2222222} If the DFA halts at a final state, then the DFA is said to have accepted (or recognized) the specified glyph pixelcolumn.

As persons skilled in the art will understand, there are two separate pointers that are used for tracing through a DFA state transition sequence: one for indicating the current state of the DFA and one for indicating the current input value.

Although a state transition graph such as graph 20 provides a convenient form of a DFA recognizer for a human being to follow, it is not easily implemented by a computer program. By contrast, FIG. 10 shows another (functionally equivalent) form of a DFA recognizer that is easily implemented by a computer program.

Figure 10:
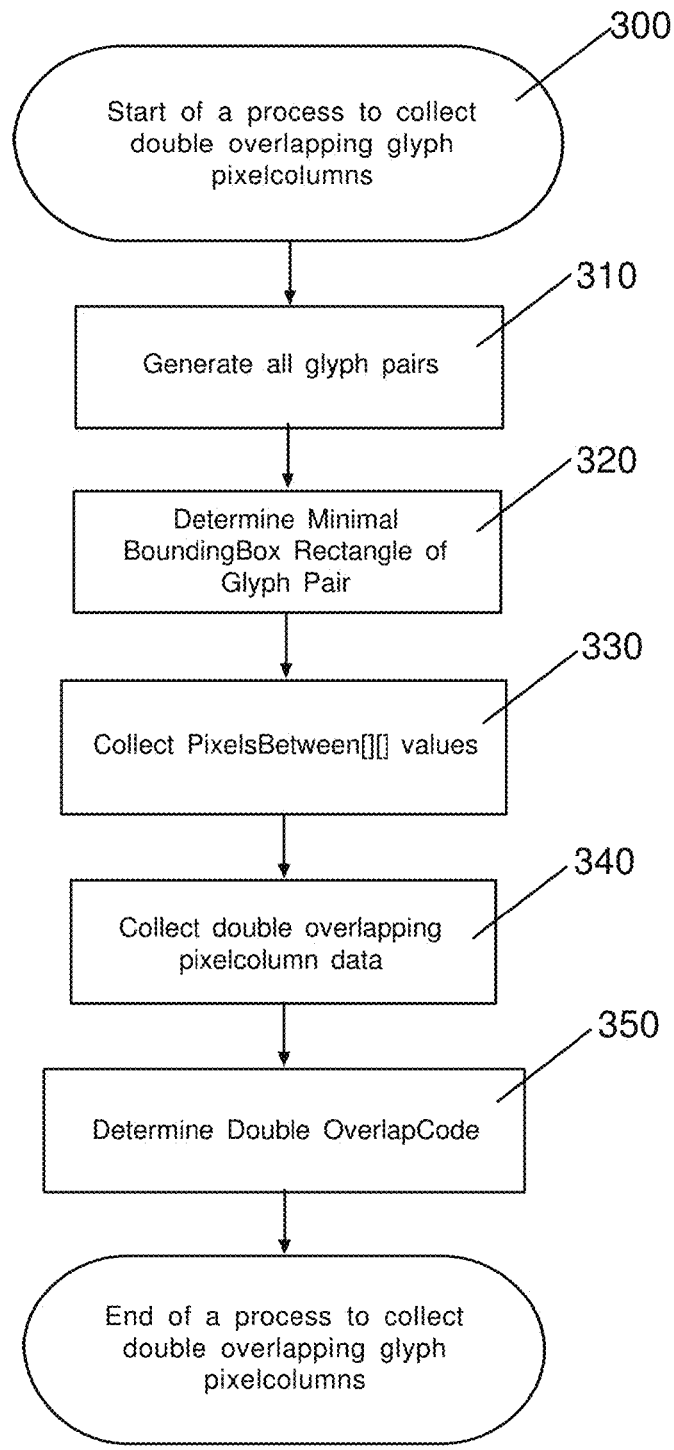
FIG. 10 shows a logic flow diagram of an exemplary process for collecting double-overlapping glyph pixelcolumns.

Using the conventional terminology within the field of deterministic finite automatons, the state transition diagram 20 of FIG. 1B must be transformed into the state transition table 30 of FIG. 10. The transformation from graph 20 into table 30 implements step 70 of process 40 shown in FIG. 2.

As can be seen, every state in table 30 has all of its possible input values appearing in sorted order. Because each state in table 30 has its transition based on the success or failure of the last input data, a binary search can easily be conducted in table 30 to search for the node's transition values. Successful binary search results in transition to the next state.

Creating the DFA Recognizer

FIG. 2 shows an exemplary process 40 for constructing a DFA for recognizing the individual pixelcolumns of machine generated character glyphs in a graphic image. Process 40 includes a subprocess 100 for collecting character glyph pixelcolumns of a font instance. Process 40 also includes subprocess 50 for sorting the collected pixelcolumns subprocess 60 for merging the identical prefixes of character glyph pixelcolumns subprocess 70 for generating and storing a DFA state transition table from the merged prefixes such that the number of elements generated is substantially less than the number of DFA states multiplied by the number of possible pixel RGB values.

Collecting all Glyph Pixelcolumns Including Every Permutation Overlapping Pixelcolumns The table in FIG. 3 shows the first 34 of 28,762 Pixelcolumns after all the Pixelcolumns have been collected, yet before they have been sorted. These are all of the non-overlapped Pixelcolumns of the following glyphs within the indicated table rows:

| FIRST ROW | LAST ROW | Glyph CodePoint |
|---|---|---|
| 00 | 04 | ! |
| 05 | 10 | " |
| 11 | 16 | # |
| 17 | 23 | $ |
| 24 | 33 | % |

Figure 4:
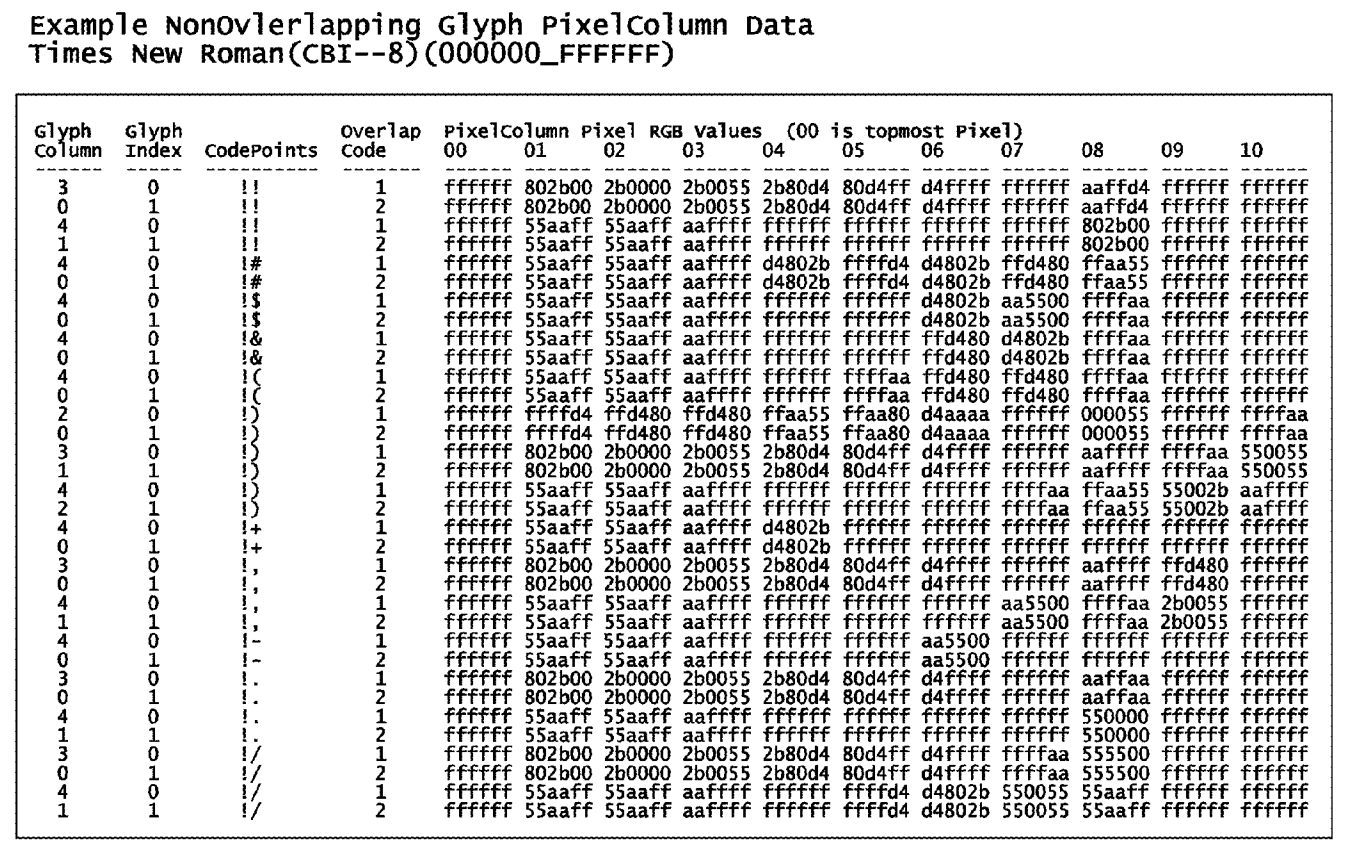

FIG. 4 shows 34 DoubleOverlapping glyph pixelcolumns. OverlapCode(1) and OverlapCode(2) form a corresponding pair of DoubleOverlapping glyph pixelcolumns.

Figure 5:
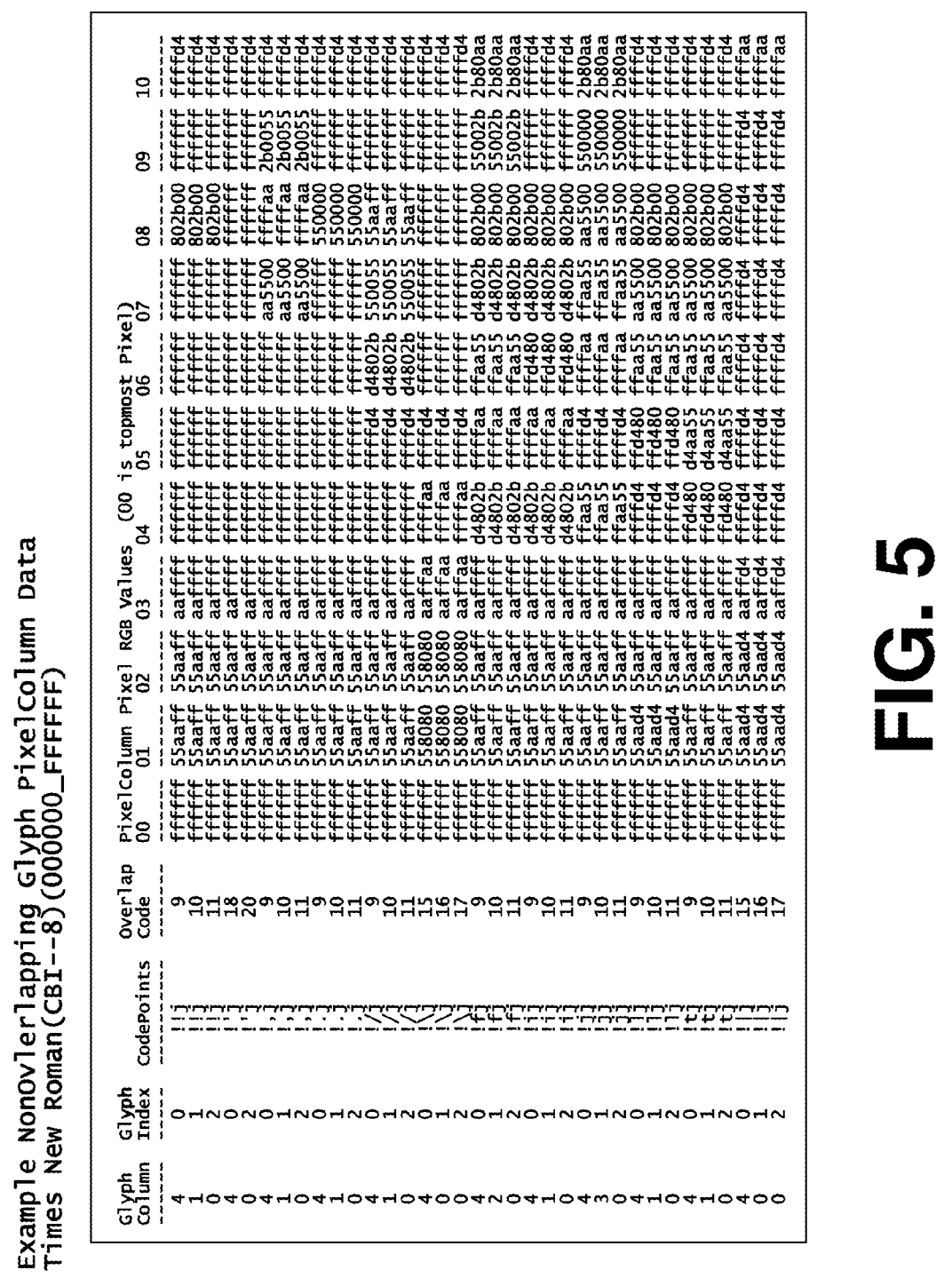

FIG. 5 shows 35 TripleOverlapping glyph pixelcolumns. Most of these show corresponding triads of TripleOverlapping OverlapCodes, such as OverlapCode(9, 10, 11). OverlapCode(18) and OverlapCode(20) do not show OverlapCode(19) because the middle glyph does not overlap both the first glyph and the last glyph.

Figure 6:
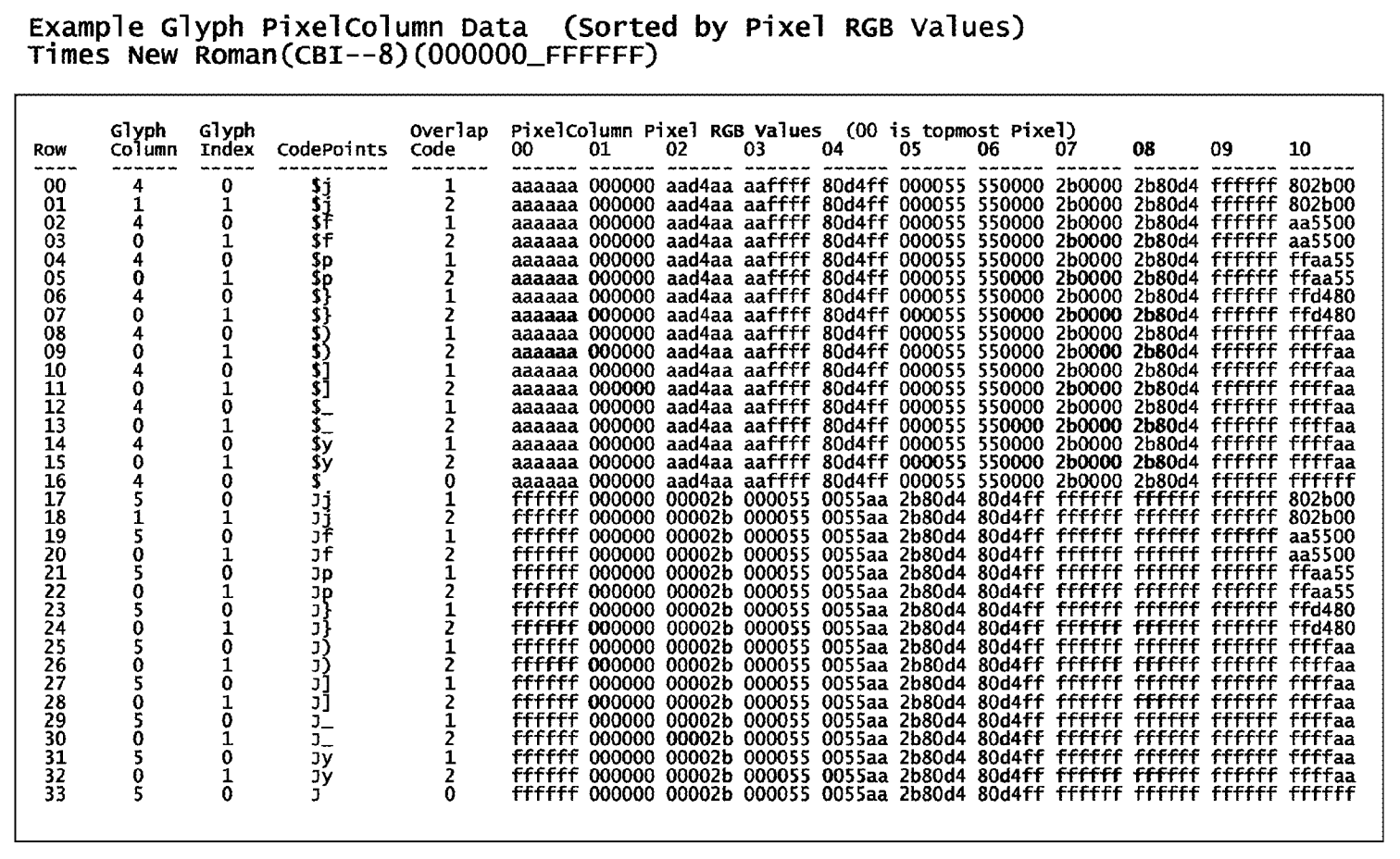

The table shown in FIG. 6 shows the first 34, of 28,762 Pixelcolumns after these Pixelcolumns have been sorted by their RGB pixel values.

Each row of this table represents the identifying information and numerical RGB values of the individual pixels of a single vertical column of pixels within a character glyph. The rows in this table and the pixels within each row are labeled starting with zero as is the convention in the C++ programming language. The PixelColumn pixel RGB values labeled with 00 indicates the topmost pixel RGB value of the pixelcolumn. Correspondingly the PixelColumn pixel RGB values labeled with 10 indicates the bottom pixel of the glyph pixelcolumn.

GlyphColumn indicates the relative column number within the glyph (starting with 0) that this Pixelcolumn represents.

GlyphIndex is a subscript into the CodePoints column indicating which character (CodePoint value) is represented by this Pixelcolumn.

CodePoints can have one to three different values. If there is only a single value, then this Pixelcolumn is not overlapped by the Pixelcolumn of another glyph. (See the CodePoints column of FIG. 3).

If there are two values, then this indicates that a first and second glyph of a glyph pair overlap each other forming a DoubleOverlapping Pixelcolumn. (See the CodePoints column of FIG. 4).

If there are three values, then this indicates that a first glyph overlaps a third glyph with a second glyph in-between forming a TripleOverlapping Pixelcolumn. (See the CodePoints column of FIG. 5).

The Pixels of these tables are labeled 00 to 10 indicating the topmost pixel to the bottommost pixel of a Pixelcolumn with eleven pixels.

Figure 7:
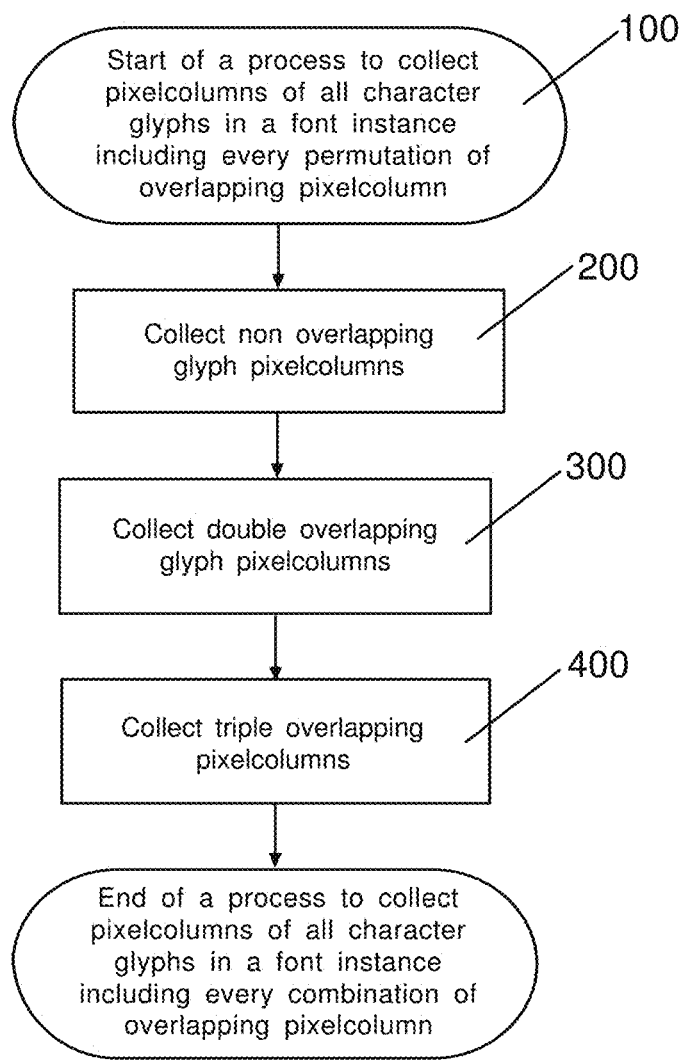
FIG. 7 shows a logic flow diagram of an exemplary process for collecting all pixelcolumns in a FontInstance including every permutation of overlapping pixelcolumn.

FIG. 7 shows an exemplary process 100 for collecting pixelcolumns of all character glyphs in the font instance including every permutation of overlapping glyph pixelcolumn. Process 100 includes subprocess 200 for collecting non overlapping glyph pixelcolumns, subprocess 300 for collecting double overlapping glyph pixelcolumns, and subprocess 400 for collecting triple overlapping glyph pixelcolumns.

Figure 55:
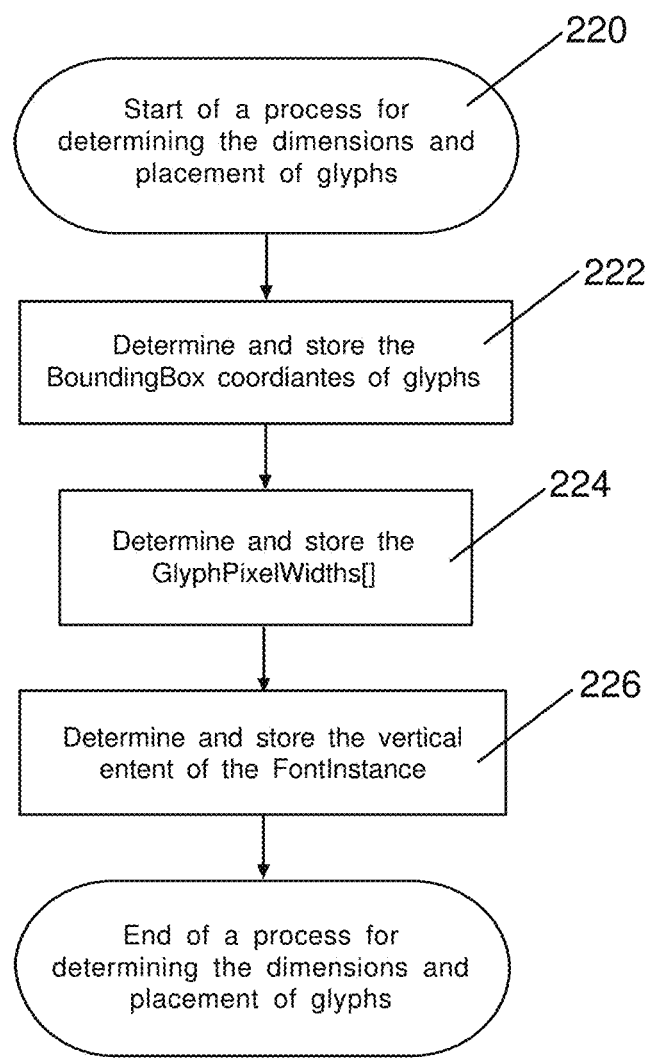
FIG. 55 shows logic flow diagram of an exemplary process 220 to determine the dimensions and placement of glyphs.

FIG. 55 shows an exemplary process 200 for collecting non overlapping glyph pixelcolumns. Process 200 includes subprocess 210 for generating all individual non-overlapping glyphs, subprocess 220 for determining the dimensions and placement of glyphs, and subprocess 230 for collecting the non-overlapped glyph pixelcolumn data.

Generating all Individual Non-Overlapping Glyphs

Figure 8:
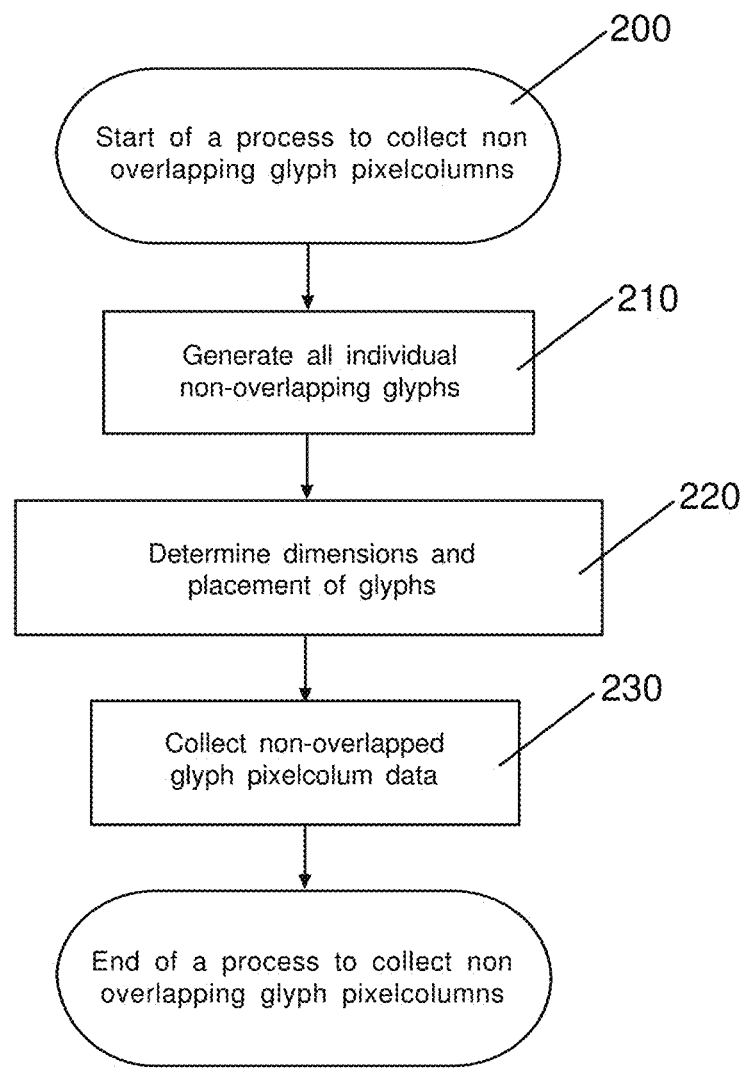
FIG. 8 shows a logic flow diagram of an exemplary process for collecting non-overlapping glyph pixelcolumns.

Process 210 of FIG. 8. The preferred method is to generate every character glyph in the font instance one-at-a-time to an off-screen memory bitmap. In the Microsoft Windows® operating system this is accomplished using the TextOut( ) function.

Determine Dimensions and Placement of Glyphs

FIG. 55 shows exemplary process 220 for determining the dimensions and placement of glyphs. Process 220 include subprocess 222 for determining and storing the BoundingBox coordinates of the glyphs, subprocess 224 for determining and storing the GlyphPixelWidths, and subprocess 226 for determining and storing the vertical extent of the FontInstance.

Process 222 determines the minimal bounding box coordinates of each glyph by locating the smallest rectangle that contains all of its foreground pixels. The foreground pixels are all pixels that are a different color than the single solid background color. Each of these minimal bounding box rectangles are stored as an element of an array of glyph bounding boxes.

The minimal bounding box coordinates of the glyph are provided as {top, left, bottom, right} coordinates within the off-screen bitmap. These coordinates are generally provided relative to the top left corner of the off-screen bitmap.

Process 224 determines and stores the value of the pixel width of each character glyph using the following exemplary C++ expression:

GlyphPixelWidth[$N$]=(BoundingBox[$N$].right−BoundingBox[$N$].left)+1;

Process 226 determines the vertical extent of the font instance by locating the minimum and maximum vertical coordinates of all the glyphs within the array of glyph minimal bounding box rectangles. These vertical extent values are stored in Maximum_Y and Minimum_Y. These values are needed along with the minimal bounding box left and right coordinates to determine the exact locations within the off-screen bitmap where glyph pixelcolumn pixels must be collected.

Another aspect of process 226 determines the value for the FontPixelHeight by the following exemplary C++ expression:

FontPixelHeight=Maximum_$Y$−Minimum_$Y$+1;

Collecting the Non-Overlapped Glyph Pixelcolumn Data

Process 230 of FIG. 8 collects the non-overlapped glyph pixelcolumn data. Now that we have determined the vertical extent of the font instance we must generate the set of all glyphs in the font instance again. We use the Minimum_Y and Maximum_Y, vertical extent values determined in the preceding step to provide the vertical locations within the off-screen bitmap required to collect glyph pixelcolumn pixels.

We collect all of the pixels in the vertical extent to make every glyph pixelcolumn have the same number of pixels. This often includes background colored pixels within the stored as glyph pixelcolumn pixels. Making all of the pixelcolumns the same height makes constructing and using the DFA simpler.

Constructing the DFA is simpler because the DFA need not handle cases where one pixelcolumn ends before another pixelcolumn in the same DFA state transition sequence. Using the DFA is simpler because it has fewer false positive matches where little pieces of larger glyphs are mistaken for whole smaller glyphs.

By using the vertical extent of the font instance along with the horizontal extent of each individual glyph, we know the precise placement of the set of pixels that must be collected. All of the pixels are collected within the horizontal range of BoundingBox[N].left to BoundingBox[N].right and the vertical range of Minimum_Y to Maximum_Y.

Each of these collected glyph pixelcolumns is associated with its identifying data as shown as Identifier_Node 736 of FIG. 44. This same structure is shown embedded within DFA_Node 500 of FIG. 9.

Collect PixelColumn pixel RGB values using the glyph's horizontal BoundingBox left and right coordinates, and the vertical extent of the FontInstance for the glyph's top and bottom, vertical coordinates.

Iterate through the vertical extent of the FontInstance from top to bottom collecting all of the PixelColumn pixel RGB values for a PixelColumn before proceeding to the next glyph PixelColumn to the right. During this iteration Initialize this glyph's Identifier_Node as follows:

a) CodePoints[0]=The UTF-32 code point value of the glyph.
b) GlyphIndex=0;
c) GlyphColumn=The current relative glyph PixelColumn number.
d) OverlapCode=0;

Collecting Double Overlapping Glyph Pixelcolumns

FIG. 10 shows an exemplary process 300 for collecting double overlapping glyph pixelcolumns of font instance. Process 300 includes subprocess 310 for generating all glyph pairs, subprocess 320 for determining the minimal bounding box rectangle of glyph pairs, subprocess 330 for collecting PixelsBetween[ ] [ ] values, subprocess 340 for collecting double overlapping glyph pixelcolumn data, and subprocess 350 for determining the double OverlapCode.

Generate all Glyph Pairs

Process 310 of FIG. 10. As in the preceding section we generate glyphs to an off-screen memory bitmap. The difference is that in this case we generate every permutation of pairs of glyphs. As in the preceding section we generate and process these glyphs one-at-a-time.

Determine BoundingBox Rectangle of Glyph Pair

Process 320 of FIG. 10. This works in the same way as previously explained. We simply derive the {top, left, bottom, right} pixel coordinates of the smallest rectangle within the off-screen memory bitmap that includes of all of the pixels that are a different color than the single solid background color.

Collect PixelsBetween[ ] [ ] Values

Process 330 of FIG. 10. We determine the actual number of pixels between every pair of character glyphs by subtracting the widths of the individual glyphs from the BoundingBox width of the combined glyph pair:

PixelsBetween[*CP1*][*CP2*]=GlyphPairWidth−(GlyphPixelWidth[*CP1*]+GlyphPixelWidth[*CP2*]);

These values are stored in a two-dimensional array indexed by CodePoint values, as shown in the above expression.

Collect Double Overlapping Pixelcolumn Data

Figure 11:
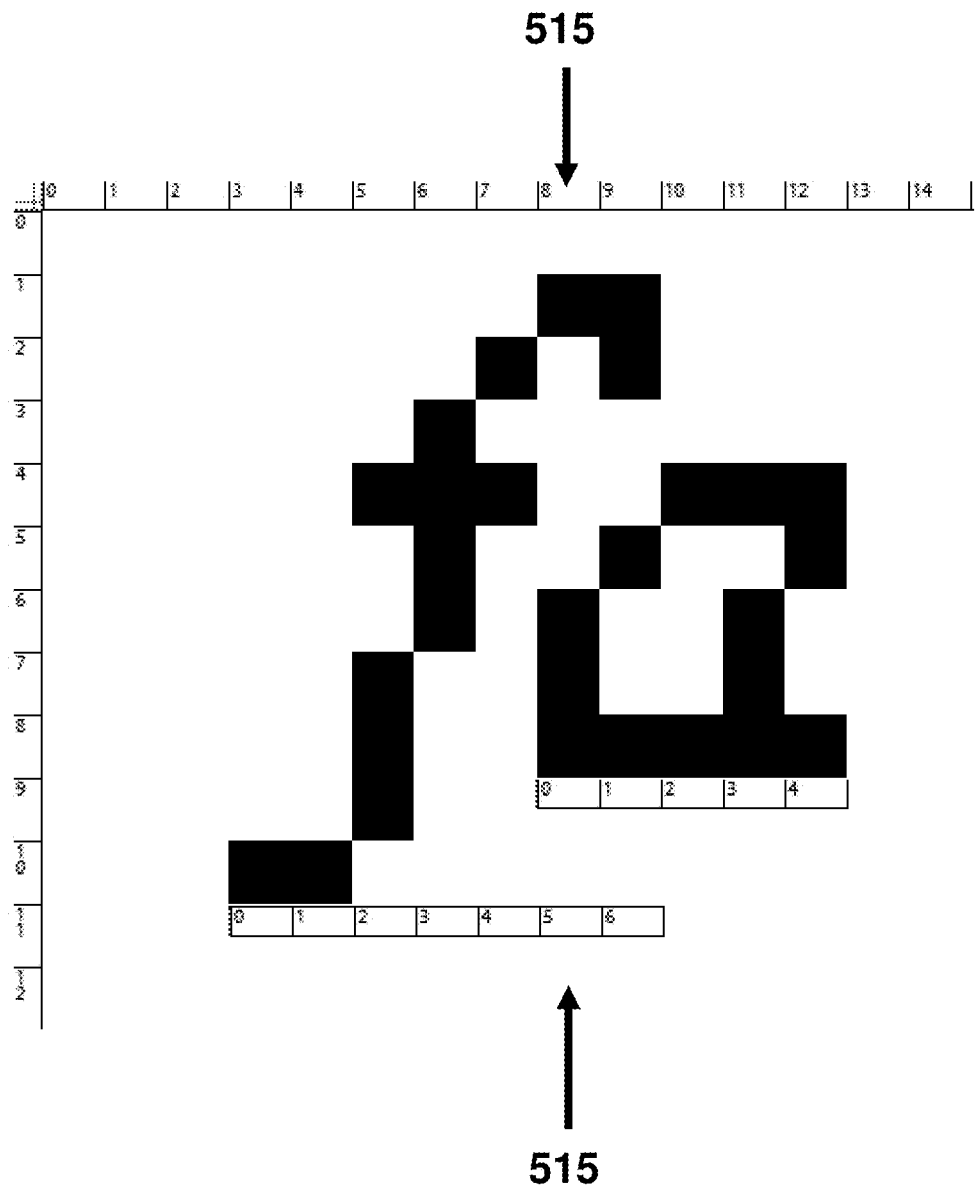
FIG. 11 shows how the relative pixelcolumns numbers of individual glyphs relate to the pixelcolumn numbers of an input graphic image, and points out a double overlapping (overlap pair) pixelcolumn 515.

Process 340 of FIG. 10. FIG. 11 shows how the horizontal coordinates of the off-screen memory bitmap and the GlyphColumn values for the two character glyphs relate to each other. These coordinates are shown in units of pixels along the top and left edges of FIG. 11, and immediately below each character glyph.

The off-screen memory bitmap's horizontal coordinates are shown as numerical values {0-14} and its vertical coordinates are shown as numerical values {0-12}. The first glyph's GlyphColumn values are shown immediately below this glyph as numerical value {0-6}. The second glyph's GlyphColumn values are shown immediately below the second glyph as values {0-4}.

The BoundingBox of the glyph pair is different than its minimal BoundingBox because it includes some background colored pixels in its vertical dimension: GlyphPair.top(0), GlyphPair.left(3), GlyphPair.bottom(11), GlyphPair.right (12).

Pixelcolumn 515 of FIG. 11 shows how the GlyphPair BoundingBox column(8) relates to the first glyph's GlyphColumn(5) and the second glyph's GlyphColumn(0).

A double overlapping pixelcolumn is defined as all of the overlapping pixelcolumns of a pair of overlapping glyphs. Whenever the PixelsBetween[ ] [ ] value of any pair of glyphs is a negative number, then these glyphs must overlap each other.

The location of the overlapping pixelcolumns within the off-screen memory bitmap can be determined by the following exemplary C++ expressions:

int FirstGlyphPairOverlapColumn=GlyphPair.left+
    GlyphPixelWidth[*CP1*]+PixelsBetween[*CP1*]
    [*CP2*];

int LastGlyphPairOverlapColumn=+FirstGlyphPairOverlapColumn+abs(PixelsBetween[*CP1*]
    [*CP2*])−1;

As those skilled in the art will understand, the location of the overlapping GlyphColumns of the individual glyphs can be easily determined from the location of the overlapping pixelcolumns within the off-screen bitmap along with the GlyphPixelWidth[ ] of the individual glyphs and the PixelsBetween[ ] [ ] values for the glyph pair.

The Exemplary C++ class 738 of FIG. 44 is filled in much the same way as described previously in process 230 of FIG. 8. The difference is that we initialize Identifier_Node::NodePoints[0] and Identifier_Node::CodePoints[1], to the respective first and second glyph's values. Also we initialize the Identifier_Node::OverlapCode to as non-zero value as shown below.

Determine Double OverlapCode

Process 350 of FIG. 10. The GlyphPixelWidth[ ] data and the PixelBetween[ ] [ ] values derived in the preceding steps are used to analytically determine which of the double OverlapCodes 1-8 applies to the overlapping pixelcolumns of this glyph pair.

FIG. 12 provides a C++ source-code function for determining the OverlapCode value for each glyph pixelcolumn within every double overlapping glyph pair, or triple overlapping glyph triad.

Collecting Triple Overlapping Glyph Pixelcolumns

Figure 13:
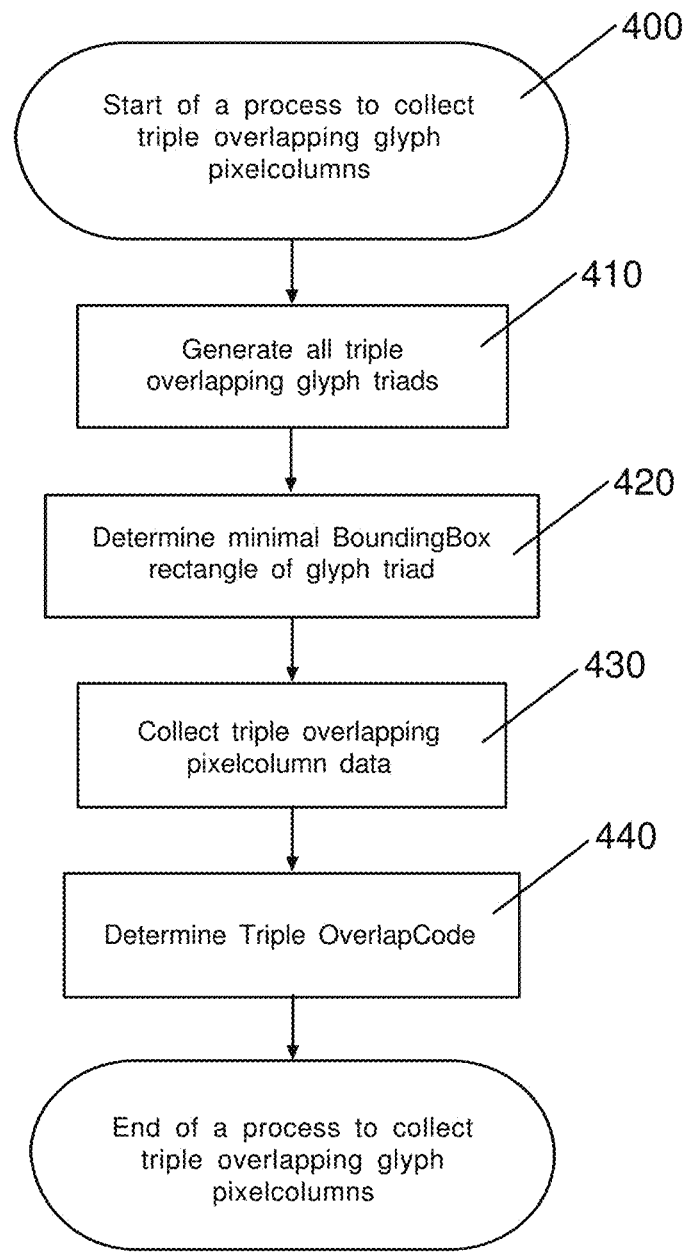
FIG. 13 shows a logic flow diagram of an exemplary process for collecting all triple overlapping glyph pixelcolumns.

FIG. 13 shows an exemplary process 400 for collecting triple overlapping glyph pixelcolumns of font instance. Process 400 includes subprocess 410 for generating triple overlapping glyph triads, subprocess 420 for determining the minimal bounding box rectangle of glyph triads, subprocess 430 for collecting triple overlapping pixelcolumn data, subprocess 440 for determining the triple OverlapCode.

A triple overlapping pixelcolumn is defined as the overlapping pixelcolumns where a first character glyph overlaps a third character glyph with a second character glyph in-between. Most often this also includes pixelcolumns of the second character glyph.

Generate all Triple Overlapping Glyph Triads

Process 410 of FIG. 13. We use the previously determined PixelsBetween[ ] [ ] values to determine whether or not a glyph triad must be generated. The following C++ snippet derives the pixels between a first character glyph and a third character glyph with a second character glyph in-between:

int PixelsBetween*CP1*_*CP3*=+PixelsBetween[*CP1*]
    [*CP2*]+GlyphPixelWidth[*CP2*]+PixelsBetween
    [*CP2*][*CP3*];

A negative value for PixelsBetweenCP1_CP3 indicates that the permutation of three character glyphs derives triple overlapping glyph pixelcolumns.

Determine Minimal BoundingBox Rectangle of Glyph Triad

Process 420 of FIG. 13. This works in the same way as previously explained. We simply derive the {top, left, bottom, right} pixel coordinates of the smallest rectangle within the off-screen memory bitmap that includes of all of the pixels that are a different color than the single solid background color.

Collect Triple Overlapping Pixelcolumn Data

Figure 14:
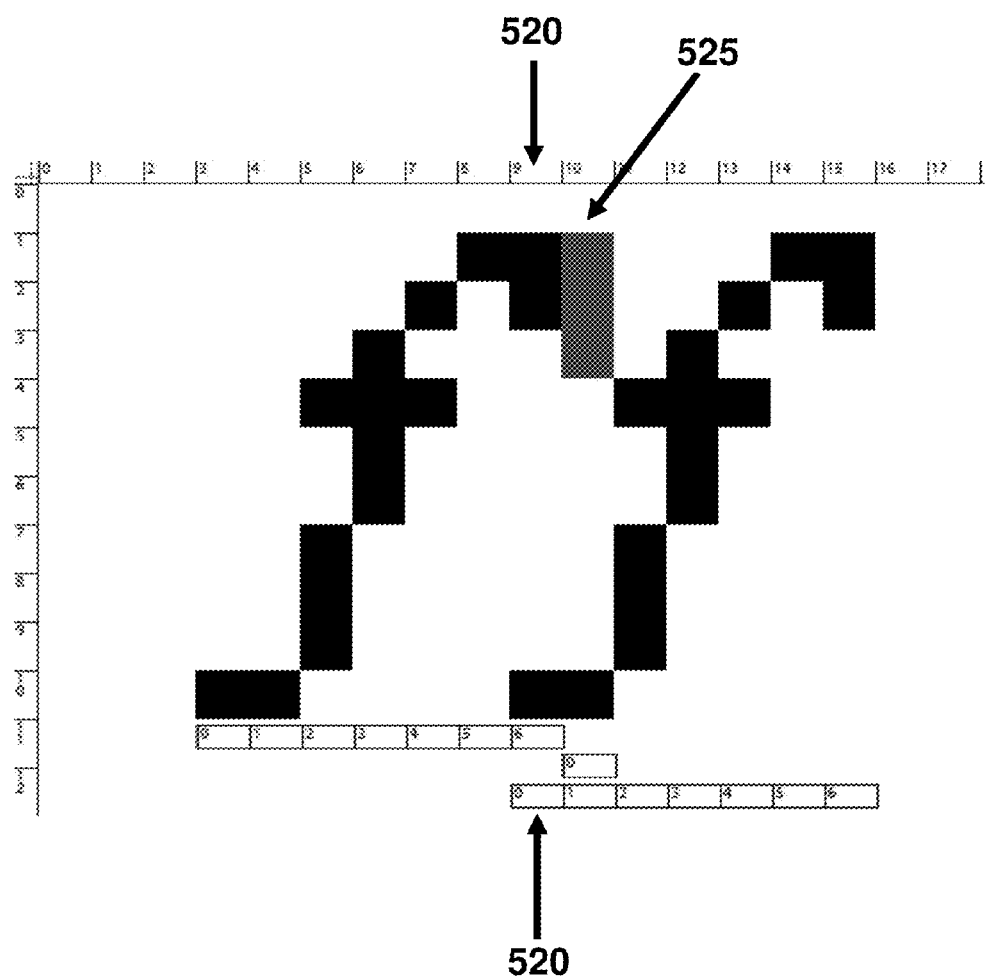
FIG. 14 shows an example of a middle glyph 525 not included in the triple overlap (or overlap triad) of pixelcolumn 520.
Figure 15:
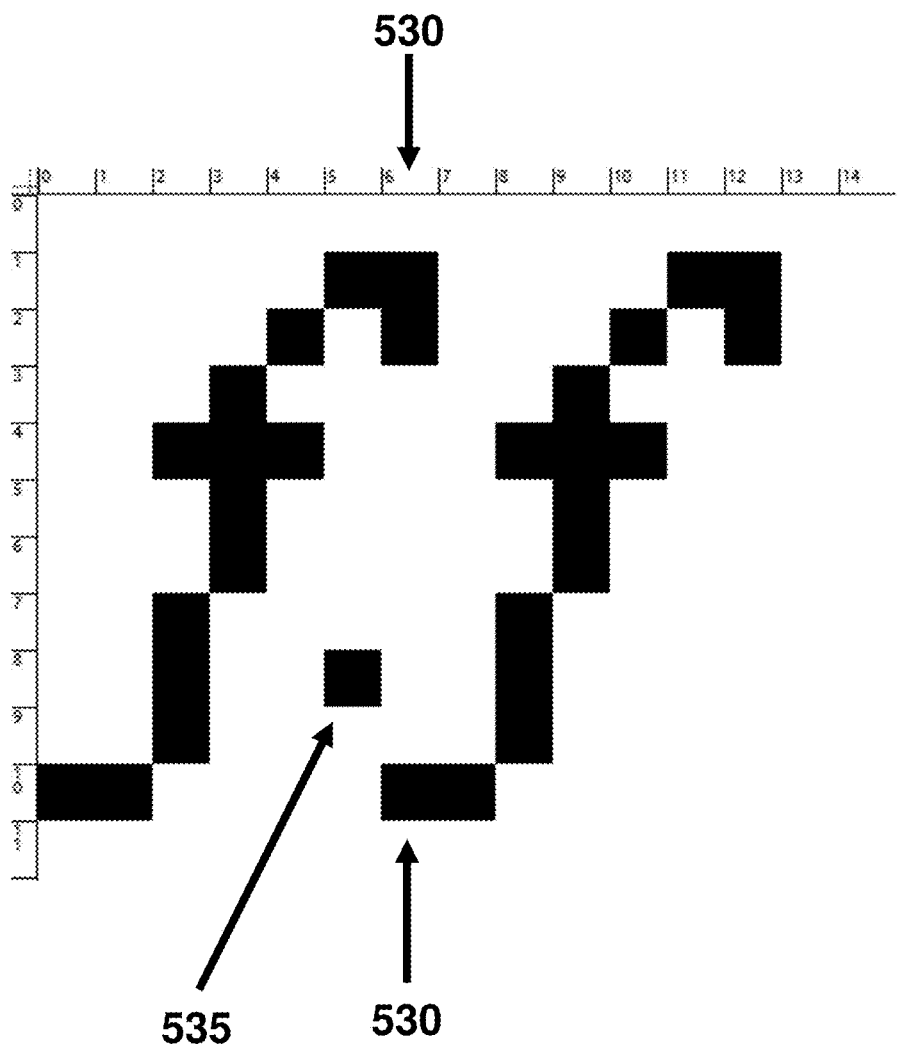
FIG. 15 Provides another example of a triple overlap (overlap triad) that does not include the middle glyph 535 in its triple overlapping glyph pixelcolumn 530.
Figure 18:
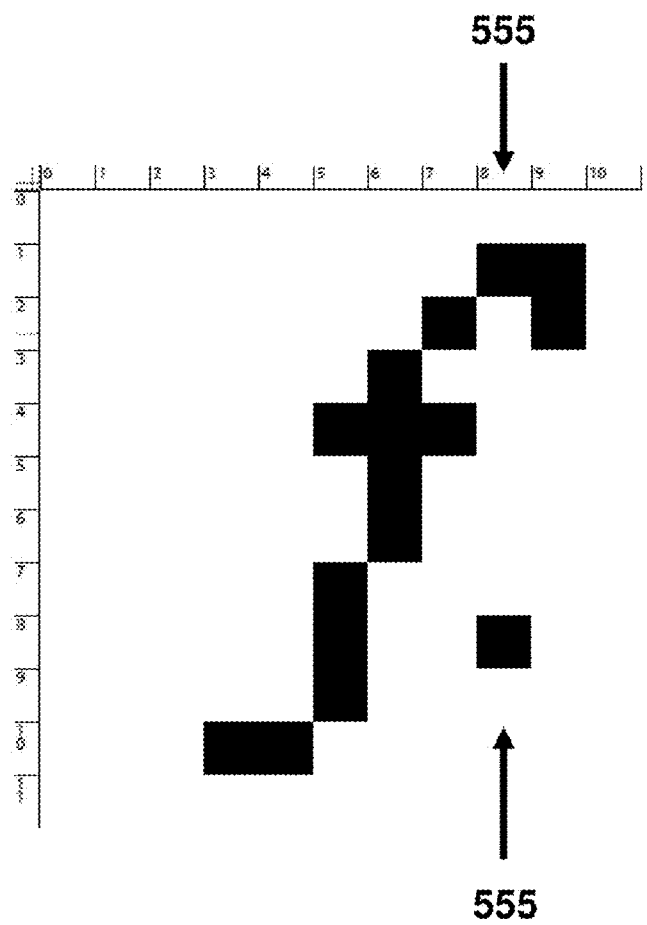
FIG. 18 provides an example of a double overlap (overlap pair) glyph pixelcolumn 555.
Figure 19:
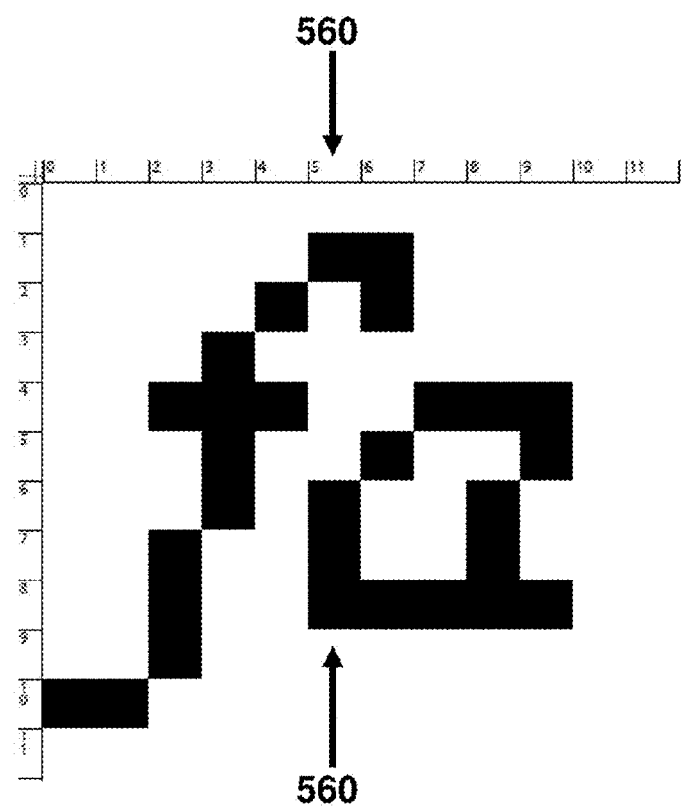
FIG. 19 provides another example of a double overlap (overlap pair) glyph pixelcolumn 560.

Process 430 of FIG. 13. Pixelcolumn 520 on FIG. 14 shows how the BoundingBox column(9) relates to the first glyph's GlyphColumn(6) and the third glyph's GlyphColumn(0). The second glyph 525 has a GlyphColumn(0) that is not included in this overlap. Because this the second glyph is not included in this overlap, its identifying information is not stored in the collected glyph pixelcolumns.

As those skilled in the art will understand, the location of the overlapping GlyphColumns can be easily determined from the location of the BoundingBox columns within the off-screen bitmap along with the GlyphPixelWidth[ ] of the individual glyphs and the PixelsBetween[ ] [ ] values for each of the two pairs of adjacent glyphs.

The location of the overlapping columns within the glyph triad bounding box is provided by the following exemplary C++ expressions:

```
int FirstGlyphTriadOverlapColumn=GlyphTriad.left+
    GlyphPixelWidth[CP1]+PixelsBetweenCP1_
    CP3; (shown above)

int LastGlyphTriadOverlapColumn=FirstGlyphTriad
    OverlapColumn+abs(PixelsBetweenCP1_CP3)−
    1;
```

Determine Triple OverlapCode

Process 440 of FIG. 13. FIG. 12 provides a C++ source-code function for determining the OverlapCode value for each glyph within every double overlapping glyph pair, or triple overlapping glyph triad.

Sort the Collected Pixelcolumns by Pixel RGB Values

Process 50 of FIG. 2. The collected DFA_Nodes are sorted by their DFA_Node::Pixel RGB values. The glyph pixelcolumn pixel RGB values are stored from their topmost pixel to their bottom most pixel such that the topmost pixel has the highest sort priority.

The following examples all relate to the same fontinstance of the Microsoft Windows® operating system:

Typeface Name: Times New Roman
Font Smoothing: ClearType®
Font Style: {Bold, Italic}
Point Size: 8
Foreground Color: 000000 (Black)
Background Color: FFFFFF (white)

Merge Identical Prefixes of Glyph Pixelcolumns Together

Process 60 of FIG. 2. The first ten pixels (columns 00 through 09) of the Pixelcolumns shown in rows 00 to 16 of FIG. 6 form the identical prefixes that are merged together in the DFA states [000001] shown in FIG. 16 and DFA states [058316] to [058324] shown in TABLE-01 of FIG. 17.

By merging these pixels together into the DFA states [000001] of FIG. 16 and DFA states [058316] to [058324] of TABLE-01 of FIG. 16, the DFA recognizer can simultaneously match the identical prefixes of all 17 pixelcolumns. This reduces memory requirements and processing time.

Generate and Store the DFA State Transition Table from the Merged Prefixes Such that the Number of Elements Generated is Substantially Less than the Number of DFA States Multipled by the Number of Possible Pixel RGB Values Process 70 of FIG. 2. The correspondence between the collected and sorted glyph Pixelcolumns shown in Rows 00 through 16 of FIG. 6 and DFA states [000001] of FIG. 16 and DFA states [058316] through 058347] of FIG. 17. provides a concrete example of exactly how the sorted list of Pixelcolumns are translated into DFA states.

The correspondence can be mapped using the pixel RGB values of the collected and sorted glyph Pixelcolumns shown in FIG. 6 and the pixel RGB values in the generated DFA nodes shown in FIG. 16 and FIG. 17.

Rows 0 though 16 of FIG. 6 are translated into DFA states [000001] shown in FIG. 16 and DFA states [058316] to [058347] shown in TABLE-01 and TABLE-02 of FIG. 17.

The set of pixels shown as last pixel of each pixelcolumn shown in column 10 of rows 00 through 16 of FIG. 6 have the same pixel RGB values as the set of pixels shown in DFA states [058325] to [058330] of TABLE-1 of FIG. 17.

The identical RGB values of the column 10 of rows 0 through 16 of FIG. 6 are merged together to become the DFA states [058325] to [058330] of TABLE-1 of FIG. 17.

Because we had to merge together some of the pixel RGB values of the last pixel in the pixelcolumn indicates that some different pixelcolumns have identical bitmaps.

The DFA states [058325] to [058330] of FIG. 17 point to these sets of ambiguous matches in their own Next and Offset fields. Whenever the Offset field is larger than zero and the ActionCode is _RECOGNIZE, the Next field points to the first identifier and the Next+Offset fields point to the last Identifier of multiple pixelcolumns that have identical bitmaps.

Two or more pixelcolumns can have identical bitmaps either by coincidence or because they comprise the pixelcolumns of overlapping glyphs.

The DFA_RECOGNIZE node [058325] shown on TABLE-01 of FIG. 17 points to a pair of DFA Identifier nodes: [058346] and [058347] shown on TABLE-02 of FIG. 17. These Identifier nodes specify a pair of corresponding overlapping pixelcolumns.

The DFA_RECOGNIZE node [058329] shown on TABLE-01 of FIG. 17 points to eight DFA Identifier nodes beginning at [058332] and ending at [058339] shown on TABLE-02 of FIG. 17. These Identifier nodes specify four different pairs of corresponding overlapping pixelcolumns that coincidentally have identical bitmaps to each other.

The DFA states corresponding to row 16 of FIG. 6 (the 4th glyph column of the "$" character) are [000001], [058316] to [058324] and [058330] and the identifier data DFA node of [058331].

Each DFA state beginning with the start state represents the pixel RGB values proceeding from the topmost pixel of the Glyph Pixelcolumn, to the bottommost pixel of the Glyph Pixelcolumn.

Item 540 of FIG. 16 shows the location and length of the DFA start state. Item 545 of FIG. 16 is the DFA start state. Since this state only includes pixel RGB values of "aaaaaa" and "ffffff", this means that the topmost pixel of every glyph pixelcolumn in the fontinstance must be either WHITE(ffffff) or GRAY(aaaaaa) in color.

TABLE-01 of FIG. 17 shows the DFA states corresponding to the subsequent pixels in every pixelcolumn that has already matched the topmost pixel RGB value of "aaaaaa".

The table shown in FIG. 6 shows the first 34 Pixelcolumns after the Pixelcolumn data has been sorted by Pixelcolumn pixel RGB values. The column headings of the table shown in FIG. 16 are provided in TABLE-01 of FIG. 17.

The table of FIG. 16 and TABLE-01 and TABLE-02 of FIG. 17 show the first seventy states, and the last 32 states of a DFA with 58,347 states.

Item 540 of FIG. 16 shows the DFA start state. Item, 545 of FIG. 16 shows the list of topmost pixel RGB values for all pixelcolumns in the font instance. There are only two pixel values in this list "aaaaaa" and "ffffff". This indicates that the topmost pixel of every Pixelcolumn in the fontinstance is either a shade of gray "aaaaaa" or white "ffffff".

Item 550 of FIG. 16 is transitioned to from the start state if the first input pixel is (ffffff) white. The 68 pixel RGB values in this state are searched using binary search using the second input pixel if the first input pixel matches (ffffff) white. The second input pixel would be the pixel immediately below the first input pixel in the graphic image.

When a pixel is successfully matched the DFA transitions to its Next state and then uses binary search to search the length of this state (from Next to Next+Offset) using the next input pixel. It continues to do this until it either fails to match, or reaches its DFA accept state.

Figure 20:
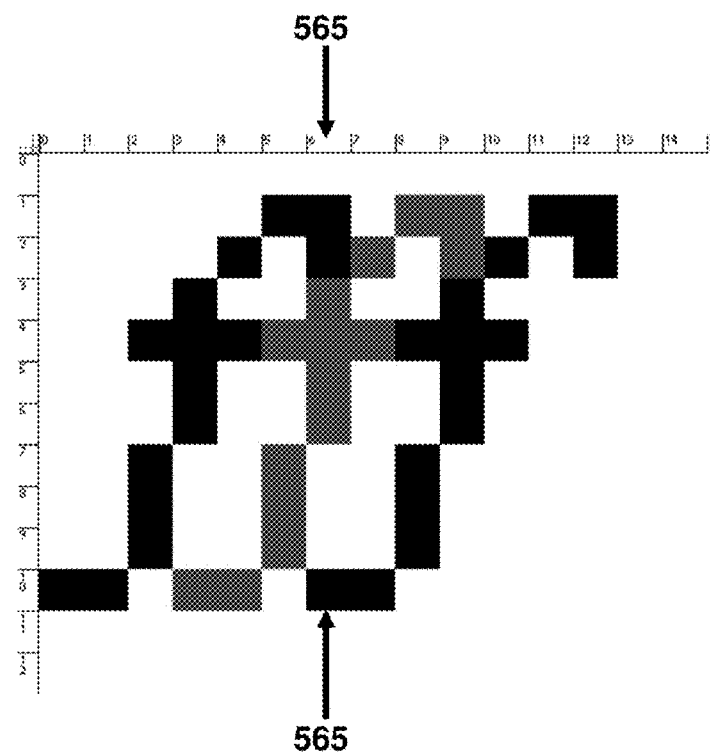
FIG. 20 provides an example of a triple overlap (overlap triad) glyph pixelcolumn 565.

Item 565 of FIG. 20 shows the TripleOverlapping Glyph Pixelcolumn of:
Times New Roman(NBI--8)(000000_FFFFFF)---->fff
Here is what it looks like in the DFA recognize state.

| DFA State | CodePoint[3] | Glyph Index | Glyph Column Number | Overlap Code |
|---|---|---|---|---|
| 006811 | ffj | 0 | 6 | 9 |
| 006812 | ffj | 1 | 3 | 10 |
| 006813 | ffj | 2 | 0 | 11 |

OverlapCode Values Explained

OverlapCodes specify the numerous different ways that glyphs can overlap each other. OverlapCodes are used as part of the process of combining together glyph pixelcolumns into whole glyphs. OverlapCode(0) indicates a Glyph Pixelcolumn that does not overlap any other glyph Pixelcolumns.

OverlapCodes 1 through 8 indicate the ways that the Pixelcolumns of a pair of glyphs can overlap each other. OverlapCodes 9 through 26 indicate the ways that the Pixelcolumns of three glyphs can overlap each other.

Figure 21:
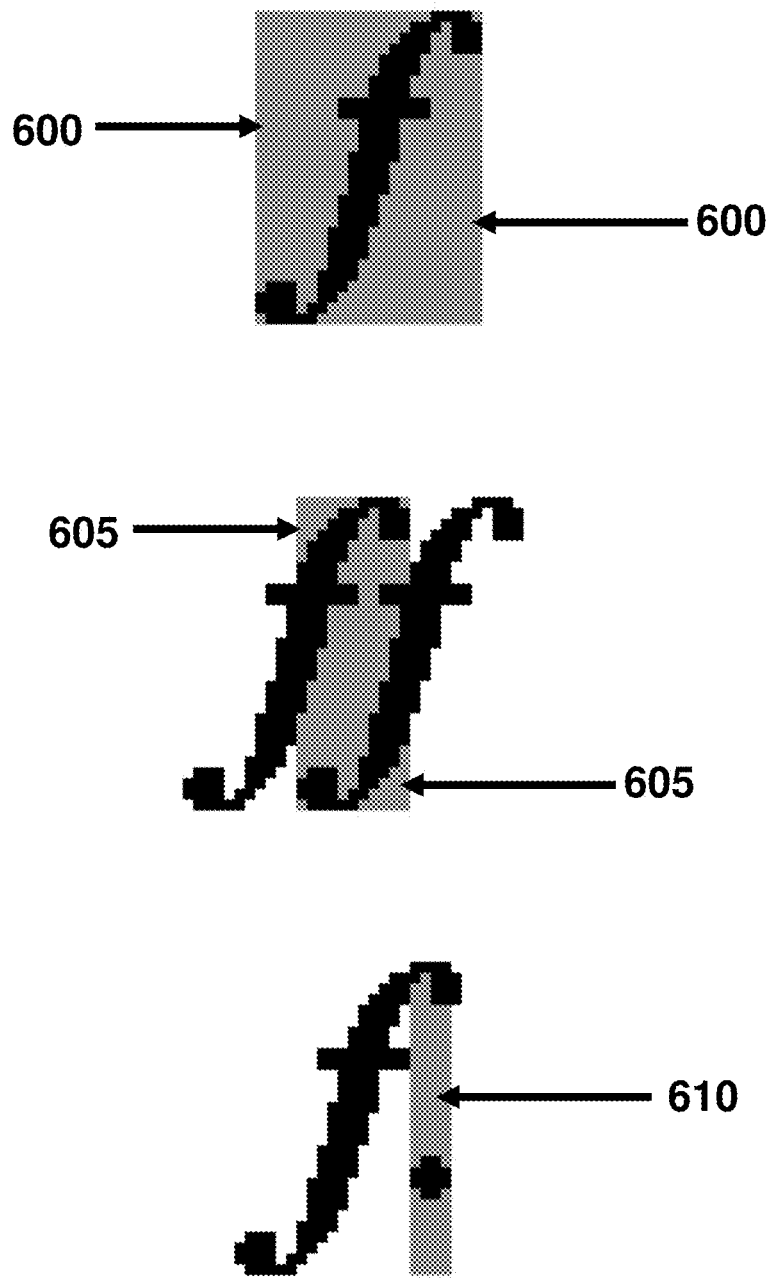
Figure 25:
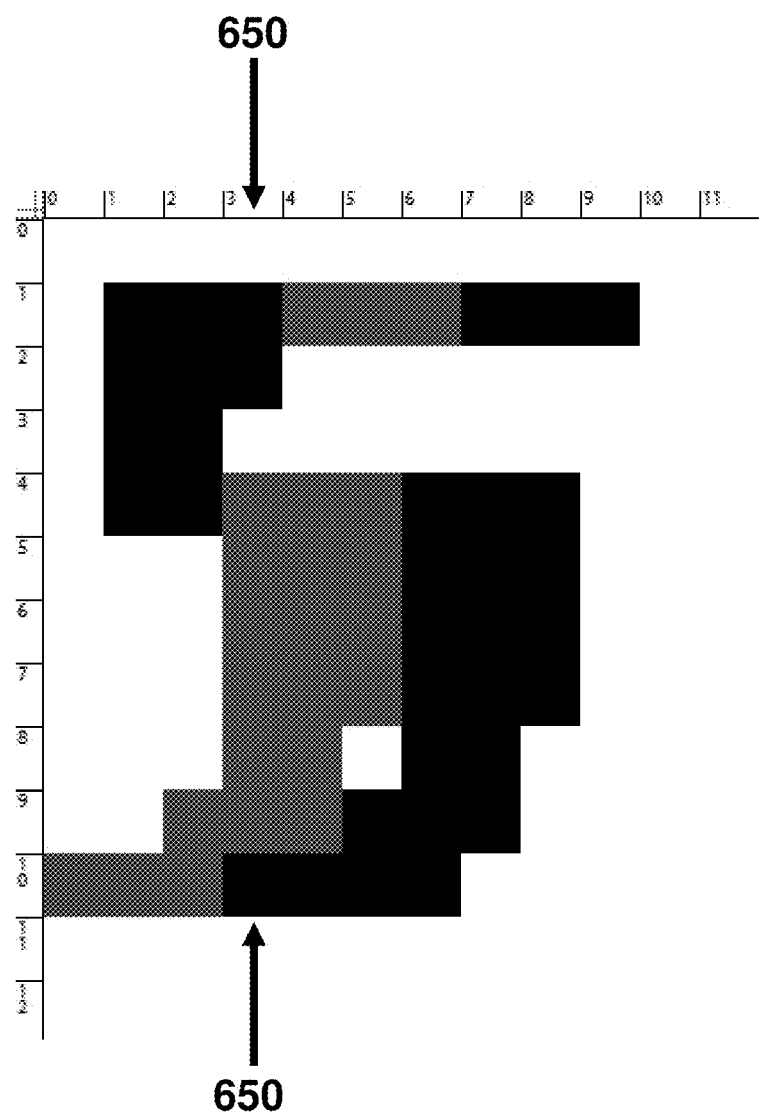

FIG. 21 though FIG. 25 show examples of these different kinds of overlapping glyph Pixelcolumns. The portions of the glyphs pointed to by items 600, 605, 610, 615, 620, 630, 635, 640, 645, 650 indicate the Pixelcolumn pixels corresponding to their respective OverlapCodes.

The table shown on FIG. 26 provides details about how the set of OverlapCodes relate to the glyph images shown on FIG. 21 through FIG. 25. The set of corresponding OverlapCodes is shown on each row of this table. For example the table row indicated by FIG. 22 and FIGURE ITEM(620) show that OverlapCode(7) corresponds to OverlapCode(8).

The TripleOverlap OverlapCodes shown on the table of FIG. 26 as pertaining to FIGURE ITEM(625) through FIGURE ITEM(650) show the corresponding TripleOverlap OverlapCodes on each row of this table. Because the middle glyph of a TripleOverlap is not always involved in this TripleOverlap, its pixelcolumns and corresponding OverlapCode is not always required.

When the glyph pixelcolumns are validated to eliminate erroneous matches, all of the corresponding OverlapCodes must be present.

Figure 24:
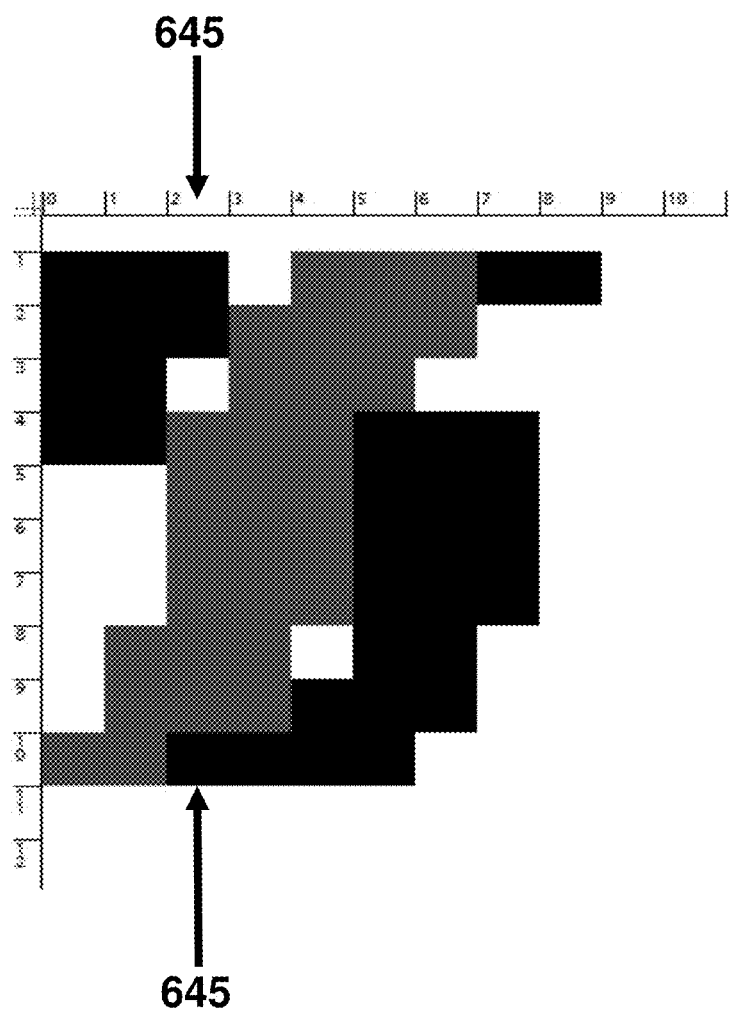
Figure 27:
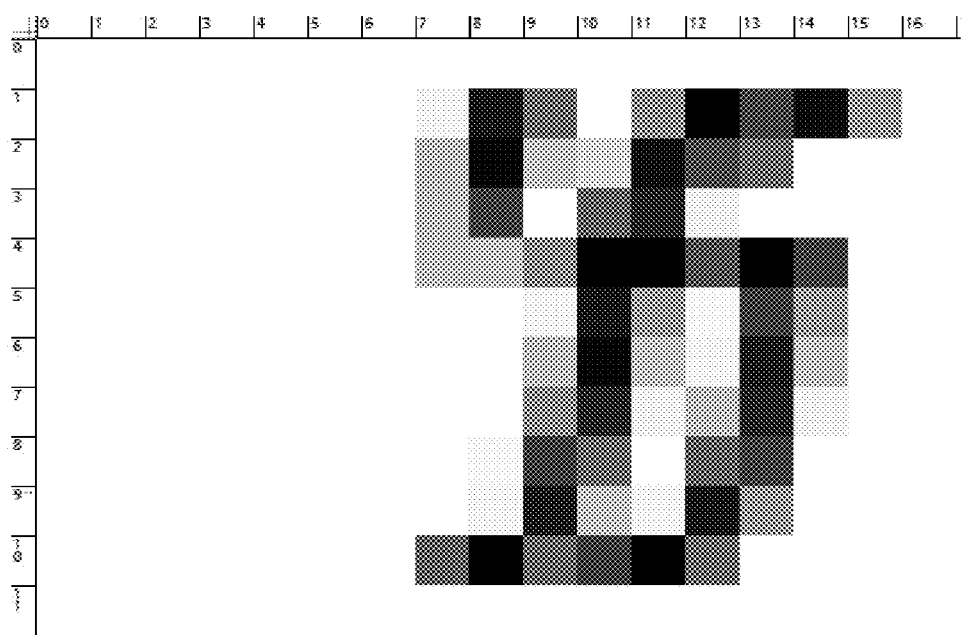
FIG. 27 and FIG. 28 show the glyphs provided in FIG. 24 in their original unmodified form.
Figure 28:
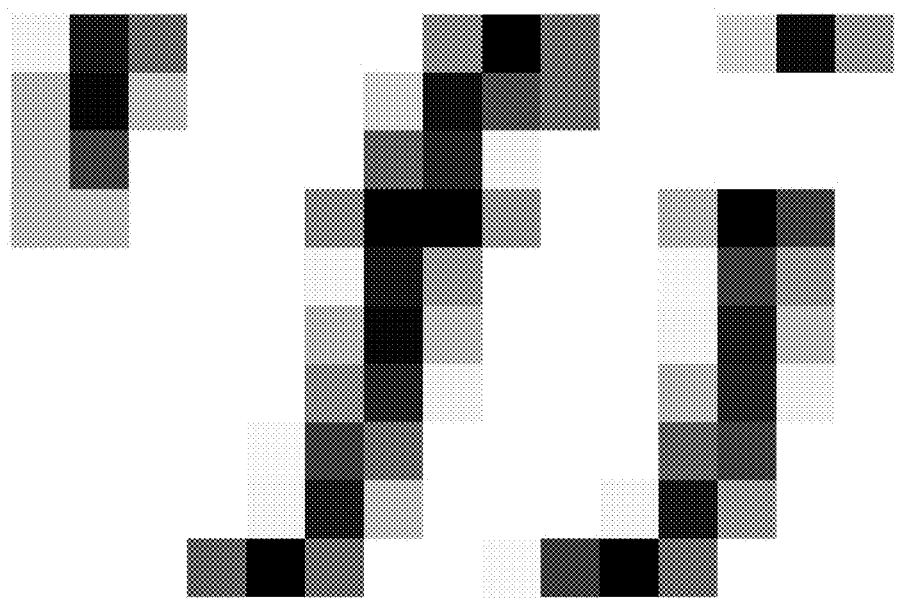
Figure 32:
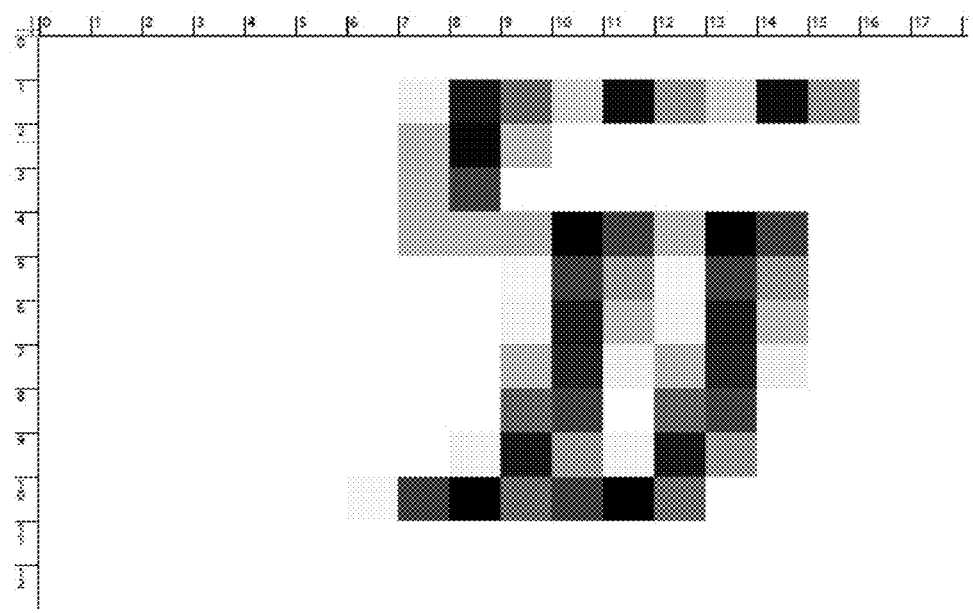
FIG. 32 and FIG. 33 show how the triple overlap (overlap triad) of FIG. 25 looks before it has been modified.
Figure 33:
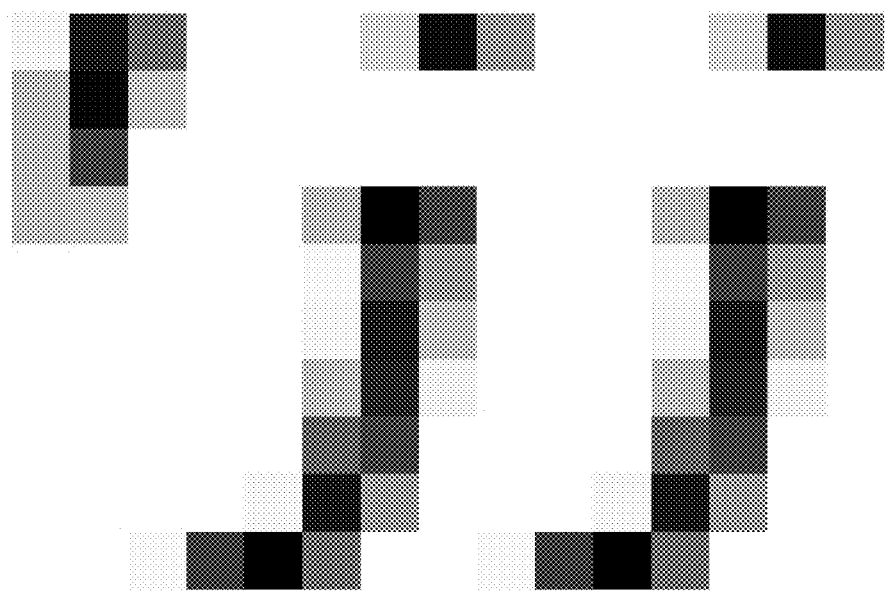

The OverlapCodes for FIG. 24 and FIG. 25 have been derived from the following fontinstance of the Microsoft Windows® operating system:
  Typeface Name: Times New Roman
  Font Smoothing: ClearType®
  Font Style: {Bold, Italic}
  Point Size: 8
  Foreground Color: 000000 (Black)
  Background Color: FFFFFF (white)
  Times New Roman(CBI--8)(000000_FFFFFF)---->'fj
The glyphs shown on FIG. 24 have been modified to show the boundaries of the individual glyphs. The glyphs shown on FIG. 27 are shown in their original unmodified form. FIG. 28 shows these same three glyphs as non-overlapping.
  Times New Roman(CBI--8)(000000_FFFFFF)---->'jj
FIG. 25 is a modified form of FIG. 32 showing the boundaries of the individual glyphs. FIG. 33 shows these same three glyphs as non-overlapping. The OverlapCodes shown above provide all of the ways that Glyph Pixelcolumns can overlap each other that are currently known.

FIG. 4 shows several sets of corresponding pairs of double overlap OverlapCodes: OverlapCode(1) and OverlapCode(2). FIG. 5 shows corresponding sets of triple overlap OverlapCodes. Generally this involves OverlapCode triads. One exception is shown as OverlapCode(18) and OverlapCode(20). The OverlapCode(19) is missing because the second glyph of the triple overlap does not overlap with the portion of the first glyph that overlaps the third glyph. Item 640 of FIG. 23 and pixelcolumn 520 of FIG. 14 shows other examples of this same thing.

PixelColumnList Class Explained

The exemplary C++ class PixelColumnList 739 of FIG. 44 is used for collecting the glyph PixelColumn data in steps 220 of FIG. 8, 340 of FIGS. 10, and 430 of FIG. 13. The glyph PixelColumn pixel RGB values are stored in PixelColumn::Pixels. These pixels are stored beginning with the topmost pixel and proceeding down to the bottom most pixel. The PixelColumn Identifier data is stored in the Identifier_Node 736 of FIG. 44.

The exemplary C++ struct Identifier_Node 736 of FIG. 44 has four members: CodePoints[ ], GlyphIndex, GlyphColumn, and OverlapCode.

Identifier_Node Structure Explained

CodePoints[3], this three element array provides the UTF-32 codepoint value of the specific character that has been matched by the DFA state transition sequence. This array has values for one of the following:
  a) Single non overlapped glyph.
  b) Pair of double overlapping glyphs.
  c) Triad of triple overlapping glyphs.

GlyphIndex, this provides an index into the above array of CodePoints that indicates which character is represented by this DFA Node. We must have three different possible values stored in the CodePoints field to indicate the sequence of up to three glyphs that overlap each other.

GlyphColumn, this provides the relative pixelcolumn number within the matched glyph that the matched DFA sequence of pixels represents. This value ranges from zero to glyph pixel width−1;

OverlapCode, A numerical value that indicates all of the currently known ways that two or three glyph pixelcolumns can overlap each other. Additional details are provided in the section entitled OVERLAPCODE VALUES EXPLAINED.

DFA_Node Structure Explained

FIG. 9 shows an exemplary C++ source code structure 500. This structure is named DFA_Node. An array of these structures defines a state transition table. The two structs within the union define two different types of DFA nodes:
  1) The State Transition Node, is used to define the DFA state transition sequence that matches glyph pixelcolumn pixel RGB values.
  2) The Identifier Node, is used to provide the identifying details regarding exactly which glyph pixelcolumn was matched, and is exactly the same as the Identifier_Node described above in IDENTIFIER_NODE STRUCTURE EXPLAINED.

The State Transition Node has Four Fields:
  1) The DFA_Node::Pixel field indicates one pixel of a list of one or more pixel RGB values that are to be searched using binary search.
  2-3) The DFA_Node::Next and DFA_Node::Offset fields are used to connect one DFA node to a list of one or more other DFA nodes within the state transition table array of DFA_Node structures. The DFA_Node::Next field is an index into the state transition table array. The DFA_Node::Offset field is added to the DFA_Node::Next field to provide the index of the last node in the list of DFA nodes.

4) The ActionCode field defines the specific action to be taken by the DFA if the input pixel RGB value matches the current DFA_Node::Pixel value. There are two ActionCode values:

_BSEARCH indicates that the list DFA_Node::Pixel values defined by the current DFA_Node::Next and DFA_Node::Offset fields is to be binary searched for a match with the current input pixel RGB value.

_RECOGNIZE indicates that the list defined by the current DFA node's DFA_Node::Next and DFA_Node::Offset fields provides the DFA Identifier nodes that were matched in the DFA state transition sequence. When the _RECOGNIZE node has an Offset value greater than zero, this indicates matching multiple glyph pixelcolumns having identical bitmaps.

The DFA_Node::ActionCode determines the action to be taken by the DFA recognizer if the current DFA node matches the current input pixel RGB value. There are two ActionCode values: _BSEARCH and _RECOGNIZE.

The value of _BSEARCH indicates that the list of DFA nodes specified by the DFA_Node::Next and DFA_Node::Offset fields are to have their DFA_Node::Pixel RGB values searched using the current input pixel from the input image.

The DFA_Node::ActionCode value of _RECOGNIZE indicates that the list of DFA nodes specified by the DFA_Node::Next and DFA_Node::Offset fields provides the DFA Identifier Nodes that have been matched by the state transition sequence.

Using the DFA to Recognize Character Glyphs in a Graphic Image

Figure 34:
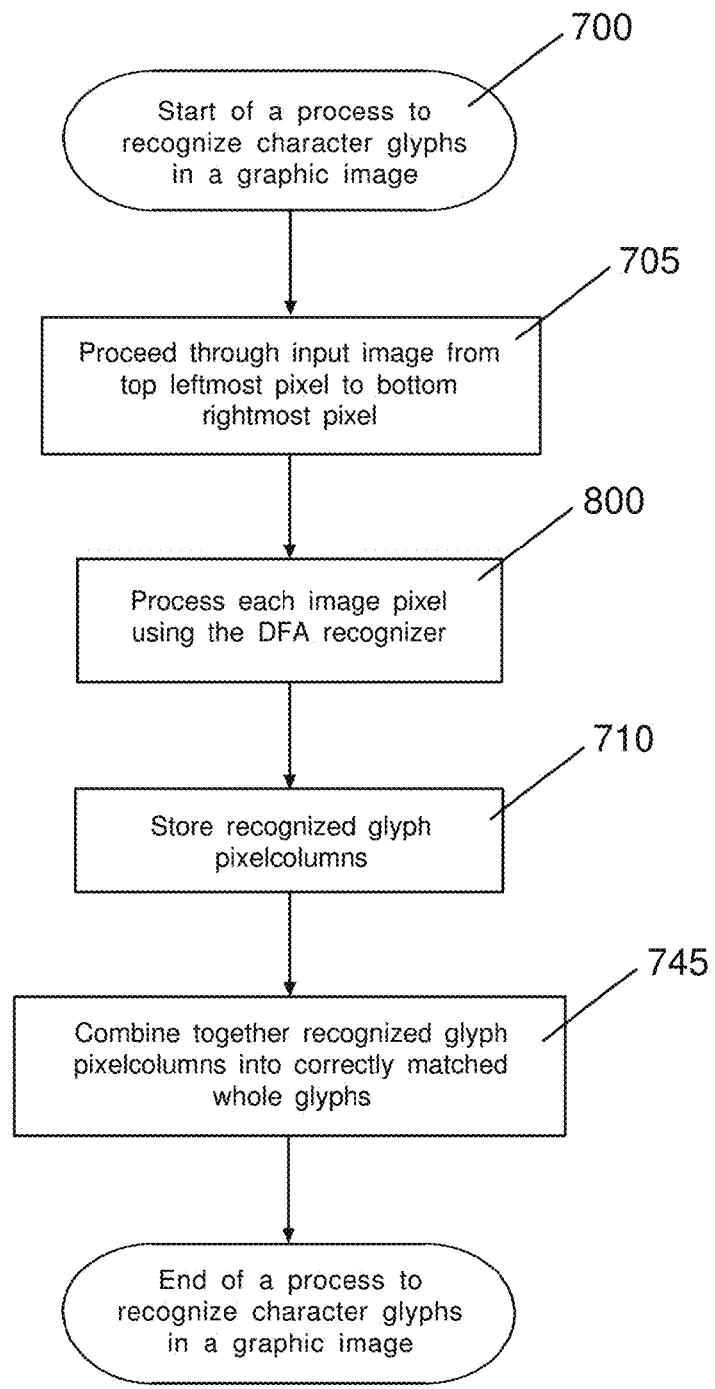
FIG. 34 Shows a logic flow diagram of an exemplary process for recognizing machine generated character glyphs in a graphic image.

Process 700 of FIG. 34. All of the pixels of a graphic image are processed using a DFA recognizer. This DFA recognizer is used to match the RGB pixel patterns of individual glyph pixelcolumns. A glyph pixelcolumn is a single vertical column of pixel RGB values that is as tall as the vertical extent of the fontinstance. These individual glyph pixelcolumns are combined together to form whole glyphs.

Each of the image pixels is tested against the DFA start state, and if it matches, the next image pixel immediately below the current image pixel is processed by the next DFA state. This continues until either the DFA fails to match, or all the pixels in the glyph pixelcolumn match. When all the pixels in a glyph pixelcolumn match, the glyph pixelcolumn identifier data is reported by the DFA recognizer.

The C++ source-code listing 500 of FIG. 9 shows the DFA_Node data structure which provides the details of the implementation of a single DFA node. See the section entitled DFA_NODE STRUCTURE EXPLAINED for the details of how the individual fields within this structure are used.

The DFA itself is implemented as a single dimensional array of these DFA_Node structures. The input image is stored as a two-dimensional array of pixel RGB values.

The list of Identifier nodes pointed to by the DFA_Node::Next and DFA_Node::Offset fields includes every glyph pixelcolumn within the fontinstance that has an identical set of pixel RGB values.

FIG. 34 shows an exemplary process 700 to recognize character glyphs in a graphic image. Process 700 is shown at a high level (abstract or general) view. Process 700 includes subprocess 705 for proceeding through the input image, subprocess 800 for processing each image pixel using a DFA recognizer, subprocess 710 for storing the recognized glyph pixelcolumns and subprocess 745 for combining together recognized glyph pixelcolumns into correctly matched whole glyphs.

Subprocess 705 proceeds through the input image from top leftmost pixel to bottom rightmost pixel. It proceeds through the input image processing a row of pixels from left to right, before moving down to the left most pixel of the next pixel row. Since this is the same order that one would read a page from a book, this is called "book read" order.

Subprocess 800 uses the DFA recognizer to determine if the input image pixel is the topmost pixel of a glyph pixelcolumn. Subprocess 800 reports any matching glyph pixelcolumns.

Subprocess 710 stores the matched glyph pixelcolumns reported in subprocess 800. These matched glyph pixelcolumns are stored in the C++ struct 510, named SelectedNodesList of FIG. 9. The details of this data structure and use are elaborated in its own section entitled: SELECTEDNODESLIST CLASS EXPLAINED.

Subprocess 745 combines these stored glyph pixelcolumns together to form correctly matched whole glyphs. This will be further elaborated in the section entitled COMBINING GLYPH PIXELCOLUMNS INTO WHOLE GLYPHS.

Figure 35:
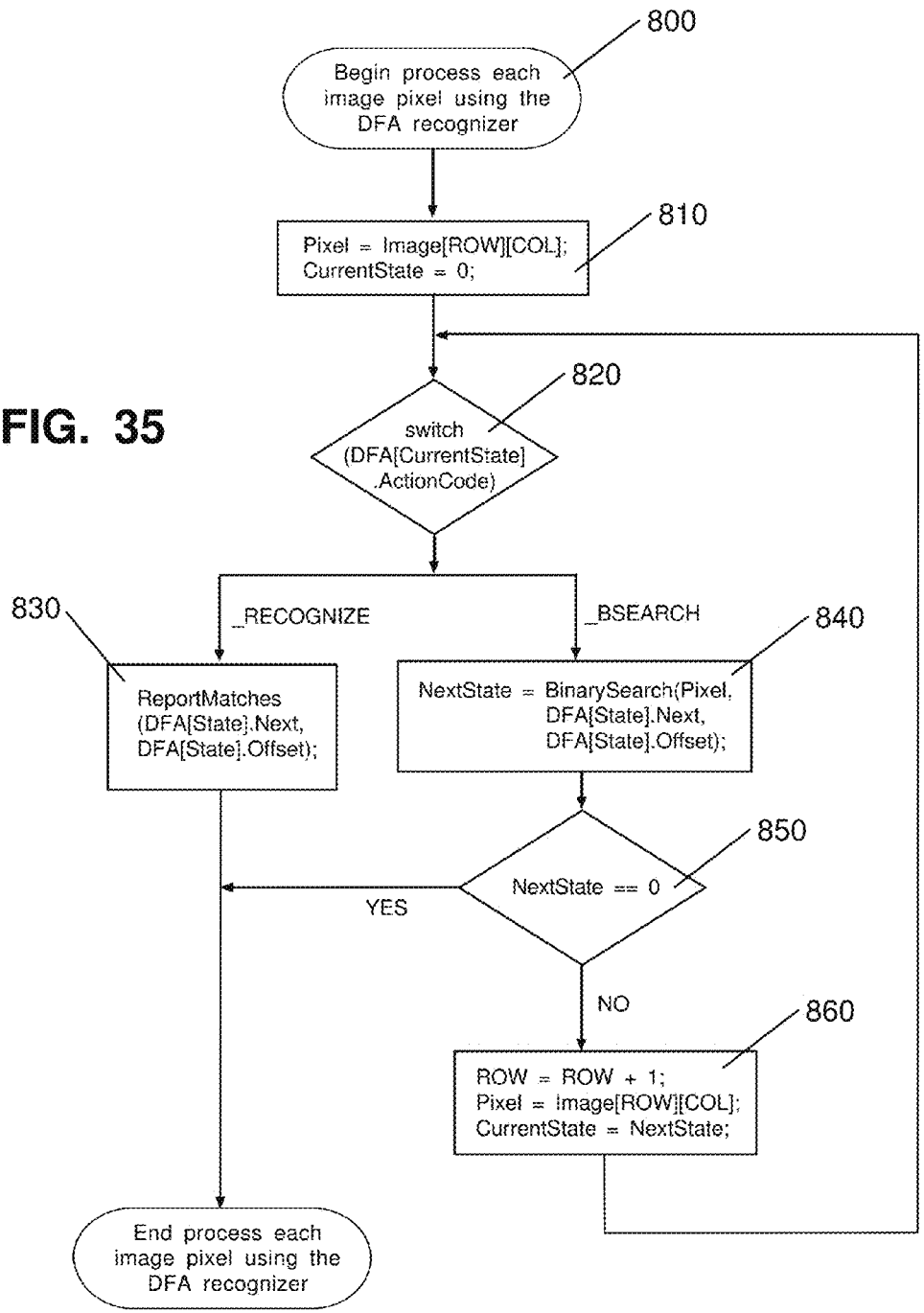
FIG. 35 Shows a logic flow diagram of an exemplary process for processing glyph pixelcolumn pixels with a DFA recognizer.

FIG. 35 shows subprocess 800 expanded into its detailed steps. FIG. 36 shows this same essential process implemented as C++ source-code. Step 810 gets the next image pixel and sets the current DFA state to its start state. Step 820 determines the next DFA action based on the current DFA state. Step 830 reports the matching glyph pixelcolumn.

Step 840 uses binary search to find the current input pixel in the sorted list of DFA_Node::Pixel values pointed to by DFA[CurrentState].Next and DFA[CurrentState].Offset. If the BinarySearch( ) function finds a match, it returns the next DFA state in the DFA state transition sequence. This function returns zero if it fails to find a match.

Step 850 determines whether or not the binary search succeeded, a non-zero value indicates the subscript of the DFA node that matched the input pixel. A value of zero indicates failure to match. When the binary search fails to match, the 800 process exits.

When the binary search of step 840 succeeds Step 860 obtains the next lower pixel RGB value from the input image and transitions to the next DFA state. It then loops back up to step 820.

Next we will provide two complete concrete examples of using the DFA to recognize a glyph pixelcolumn. These examples are provided from a fully operational DFA recognizer.

The first example will show how the DFA recognizes the fourth pixelcolumn of the "$" DollarSign glyph. The second example shows how the DFA is used to recognize an overlapping pixelcolumn of the double overlapping glyph pair $]. These two examples are based on the following fontinstance of the Microsoft Windows® operating system:

Typeface Name: Times New Roman
Font Smoothing: ClearType®
Font Style: {Bold, Italic}
Point Size: 8
Foreground Color: 000000 (Black)
Background Color: FFFFFF (white)

These two examples are derived from the portion of the DFA recognizer shown in FIG. 16 and FIG. 17. FIG. 16 shows the first seventy-one states of the DFA. TABLE-01 and TABLE-02 of FIG. 17 show the last thirty-two states of the DFA.

Example of DFA Recognizing 4th Pixelcolumn of $

Figure 37:
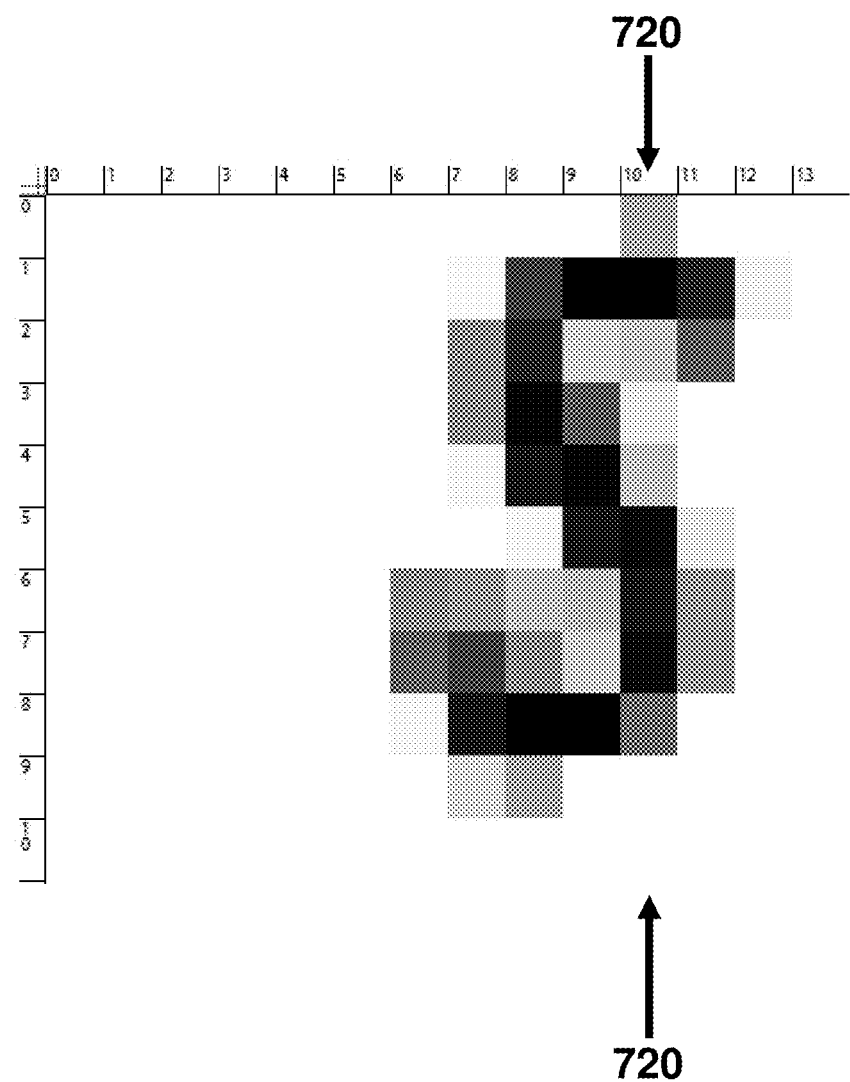
FIG. 37 Shows the fourth glyph pixelcolumn of the DollarSign glyph.

FIG. 37 shows the image of a "$" glyph, item 720 is the (zero based) fourth pixelcolumn of this glyph. This fourth glyph pixelcolumn is shown at image pixelcolumn ten.

FIG. 38 shows a trace of the DFA state transitions for the recognition of the fourth pixelcolumn of the "$" DollarSign character glyph. The glyph pixelcolumn pixel RGB values are shown in the top-to-bottom order that they are recognized. The _RECOGNIZE state shown as state [058330] points to a single DFA identifier node at DFA state [058331].

Because the DFA recognizer proceeds beginning with the top leftmost pixel of the graphic image and moves through a row of pixels before moving to the next lower row it always "sees" the topmost pixel of the first pixelcolumn of the glyph, first. This is the same order described in the prior paragraph. FIG. 39, FIG. 40, FIG. 41 show the DFA execution trace of recognizing the whole "$" DollarSign glyph.

Example of DFA Recognizing an Overlapping Pixelcolumn of $]

As a specific concrete example we will examine recognizing an overlapping pixelcolumn of the double overlapping glyph pair: $]. A double overlapping pixelcolumn, means that it is an overlapping pixelcolumn of a pair of glyphs that overlap each other.

Figure 42:
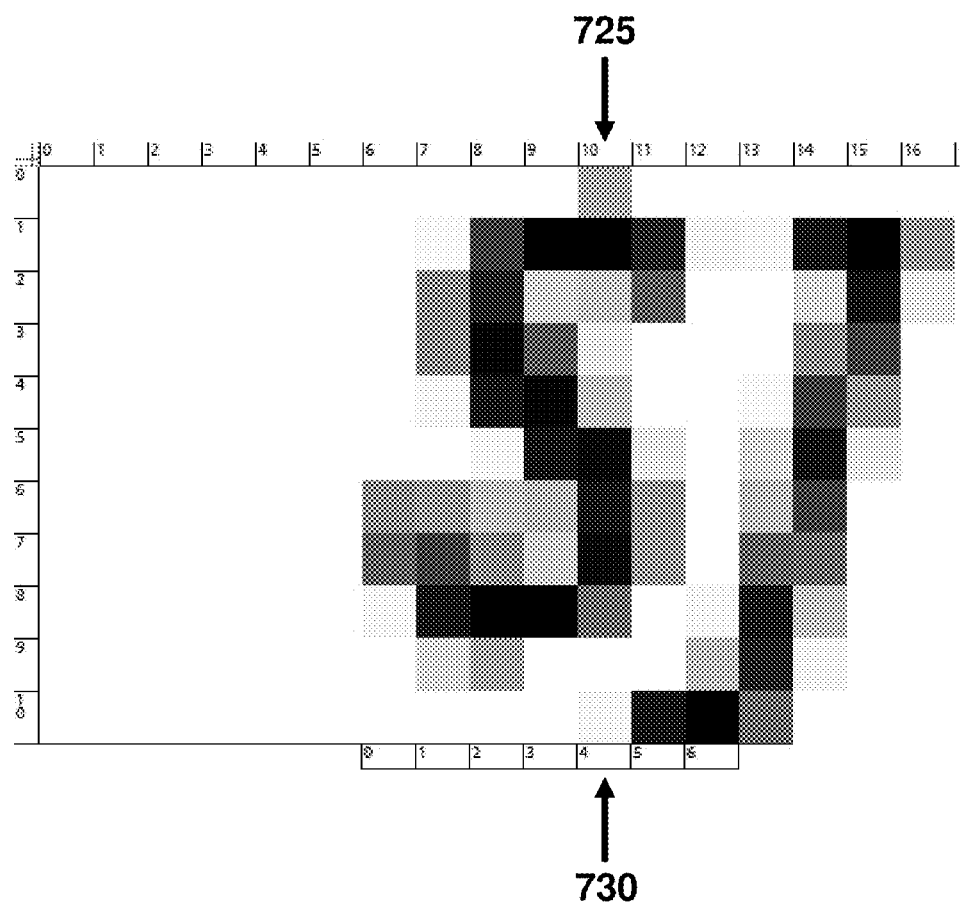
FIG. 42 Show an example of a double overlap (overlap pair) as the tenth image pixelcolumn 725. This overlapping image pixelcolumn is also shown as the fourth pixelcolumn of the DollarSign glyph 730.

This overlapping pixelcolumn is shown as the 10th pixelcolumn of the image indicated by 725 of FIG. 42. This pixelcolumn is comprised of the 4th pixelcolumn of "$" and the 0th pixelcolumn of "]".

The DFA start state indicated by item 540 of FIG. 16 uses its Next and Offset fields to point to the first sorted list of pixel RGB values. When this list is binary searched for the input pixel RGB value of "aaaaaa" a match occurs at DFA state [000001]. This state points to the single DFA node [058316].

The table shown in FIG. 43 provides a dynamic execution trace of the DFA recognition of this pixelcolumn. FIG. 16 and FIG. 17 shows all of the states in the involved in the dynamic execution trace as they appear in the actual static DFA.

The hexadecimal values shown in the Pixel column of FIG. 43 in states [000001] through [058329] show all of the pixel RGB values of this pixelcolumn from the top pixel to the bottom pixel.

The table provided by FIG. 43 shows that the DFA states [058332] to [058339] indicate that this pixelcolumn has an identical bitmap to the pixelcolumns of four different Double-Overlapping glyph pairs:
$) $] $_$y
FontInstance Explained A fontinstance is the specific combination of font properties that are used to render character glyphs to an image:
a) Typeface name
b) Font smoothing: {ClearType, Standard, None}
b) Font style: {Bold, Italic, Underline}
c) Point size
d) Foreground color
e) Background color A monochrome fontinstance is a fontinstance with a Font smoothing value of "None". With monochrome fontinstances colors are limited to the foreground and the background color. When a fontinstance is dithered (anti-aliased) it uses additional colors besides the foreground and background colors to make the edges of the character glyphs seem smoother to the human eye.

SelectedNodesList Class Explained

When the DFA recognizer matches glyph pixelcolumns, it stores the DFA identifier nodes corresponding to these matches in a list. This list includes all of the glyph pixelcolumns that have identical bitmaps to each other. The DFA also stores the vertical and horizontal pixel coordinates where these matches occurred within the processed graphic image. The C++ struct 505 shown on FIG. 9 named SelectedNodes shows how this list of DFA Identifier nodes and image coordinates could be stored.

SelectedNodes 505 of FIG. 9 includes fields:
a) ImageRow, this is vertical coordinate location within the input image of the bottom of the glyph pixelcolumn that was matched. The vertical coordinate location of the top pixel of the glyph pixelcolumn can be derived by the following:

TopRow=Bottom Row−FontPixelHeight+1;

b) ImageColumn is the horizontal coordinate location within the image of the glyph pixelcolumn that was matched.
c) NodeList is a list of all DFA Identifier nodes that the DFA recognizer matched. This includes all glyph pixelcolumns that have identical bitmaps to each other.

The C++ class 510 of FIG. 9 named SelectedNodesList is a list of SelectedNodes. This list will be used in the section entitled: COMBINING GLYPH PIXELCOLUMNS INTO WHOLE GLYPHS MatchedGlyphList Class Explained The exemplary C++ class 740 of FIG. 44 named MatchedGlyphList forms the final output from process 700 of FIG. 34. This is a list of all the glyphs that were matched (in BookRead order) from the input graphic image. Elements of this list are comprised of C++ struct 735 of FIG. 44 named MatchedGlyph. This data structure includes both the UTF-32 codepoint corresponding to the glyph, as well as the BoundingBox coordinates locating exactly where this match occurred within the input graphic image.

Combining Together Recognized Glyph Pixelcolumns into Correctly Matched Whole Glyphs Process 745 of FIG. 34. After the DFA has been executed and it has returned a list of all of the glyph pixelcolumns that were recognized within the input image additional post-processing validation is required. This additional processing eliminates all glyph pixelcolumns that have been erroneously matched and combines the glyph pixelcolumns together to form correctly matched whole glyphs.

Glyph pixelcolumns are erroneously matched because it is often the case that the pixelcolumns of one glyph coincidentally have identical image bitmaps to the pixelcolumns of other glyphs. Another issue arises when a sequence of pixelcolumns that forms a whole glyph can be derived from a portion of a larger glyph. When either of these problems arise there are numerous discrepancies and inconsistencies that can be detected such that all of these erroneously matched glyph pixelcolumns and glyphs can be eliminated.

Figure 45:
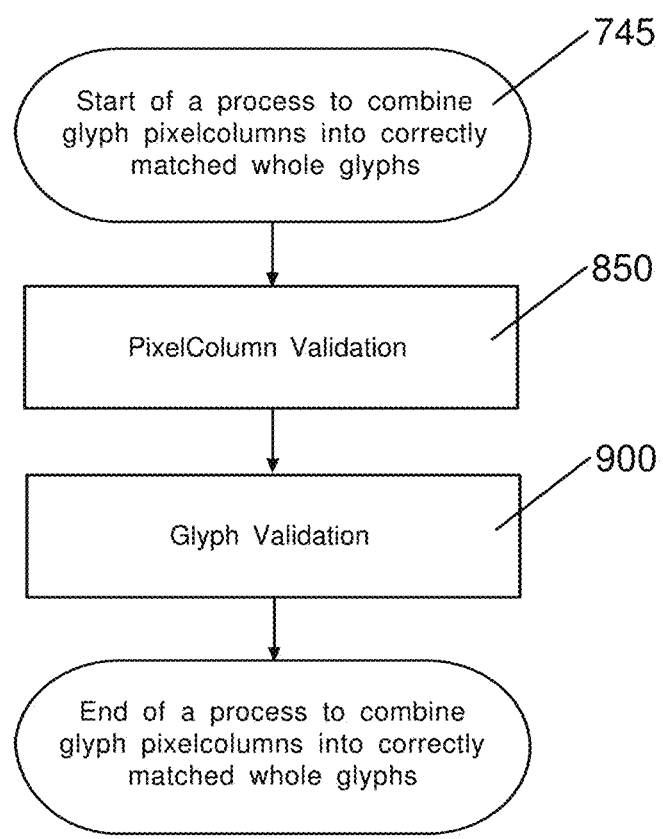
FIG. 45 shows a logic flow diagram of an exemplary process 745 for combining together recognized glyph pixelcolumns into correctly matched whole glyphs.

FIG. 45 shows an exemplary process 745 for combining glyph pixelcolumns into correctly matched whole glyphs. Process 745 includes a subprocess 850 for validating recognized glyph pixelcolumns, and subprocess 900 for validating whole glyphs against each other.

The input to process 745 is exemplary C++ class SelectedNodesList 510 of FIG. 9, and the output from process 745 is exemplary C++ class MatchedGlyphList 740 of FIG. 44. Both SelectedNodesList, and MatchedGlyphList are described in their own sections entitled: SELECTEDNODESLIST CLASS EXPLAINED and MATCHEDGLYPHLIST CLASS EXPLAINED.

Figure 46:
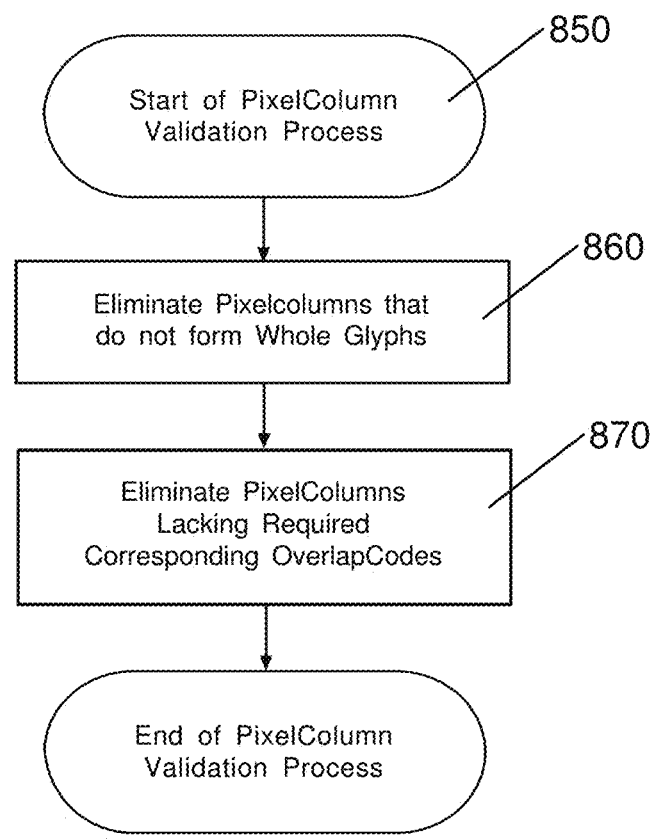
FIG. 46 shows a logic flow diagram of an exemplary process for validating the individual glyph pixelcolumns.

FIG. 46 shows an exemplary process 850 for pixelcolumn validation. Process 850 involves examining the individual DFA_Nodes referenced by values stored within the NodeList member of the SelectedNodes structure 505 of FIG. 9. Process 850 includes a subprocess 860 for eliminating pixelcolumns that do not form whole glyphs, and subprocess 870 for eliminating pixelcolumns lacking required corresponding OverlapCodes.

Figure 47:
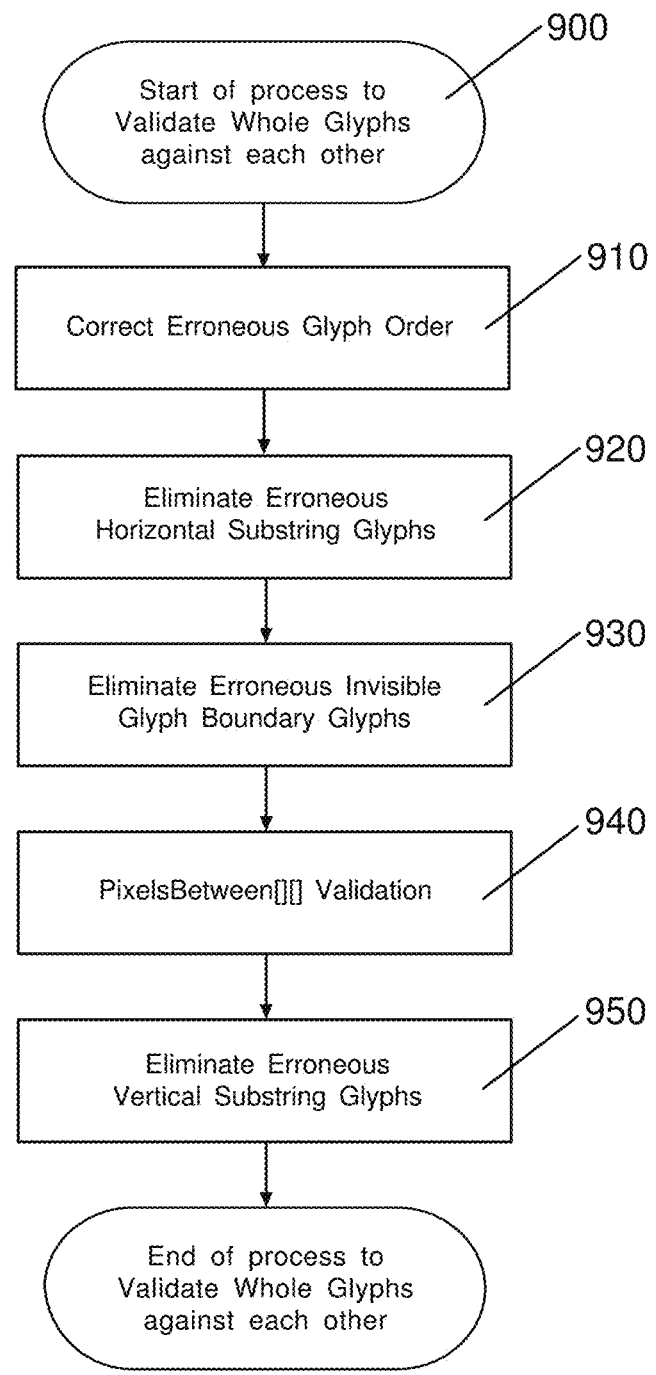
FIG. 47 shows a logic flow diagram of an exemplary process 900 for validating the whole glyphs output of process 850.

FIG. 47 shows an exemplary process 900 for validating whole glyphs against each other. Process 900 involves iterating through the MatchedGlyphList and comparing MatchedGlyph elements to each other. Process 900 includes a subprocess 910 for correcting erroneous glyph order, subprocess 920 for eliminating erroneous horizontal substring glyphs, subprocess 930 for eliminating erroneous invisible glyph boundary glyphs, subprocess 940 for PixelsBetween[ ][ ] glyphs validation, and subprocess 950 for eliminating erroneous vertical substring glyphs, Eliminating Pixelcolumns that do not Form Whole Glyphs Subprocess 860 of process 850 shown on FIG. 46 removes all recognized glyph pixelcolumns that do have their required complete set of sequential glyph column numbers, (from zero to GlyphPixelWidth−1).

The GlyphPixelWidth table of FIG. 48 provides the values needed to determine which CodePoints of the DFA Recognition Trace01 table have all of their required pixelcolumns. DFA Recognition Trace02 table provided on FIG. 50 shows the remaining glyph pixelcolumns after this validation has occurred.

Exemplary C++ function 750 of FIG. 49, named SelectedNodesList::SelectWholeGlyphs( ) shows how subprocess 860 might be implemented. When GlyphColumn(0) for the CodePoint has been seen at line_number(16) MatchNextPixelColumns( ) is invoked at line_number(21) to look for the DFA Identifier nodes corresponding to the remaining GlyphColumn numbers for this CodePoint. The MatchNextPixelColumns( ) function is nearly identical to the SelectWholeGlyphs( ) function, except that it looks for the complete set of subsequent GlyphColumn values beyond GlyphColumn(0).

Figure 56:
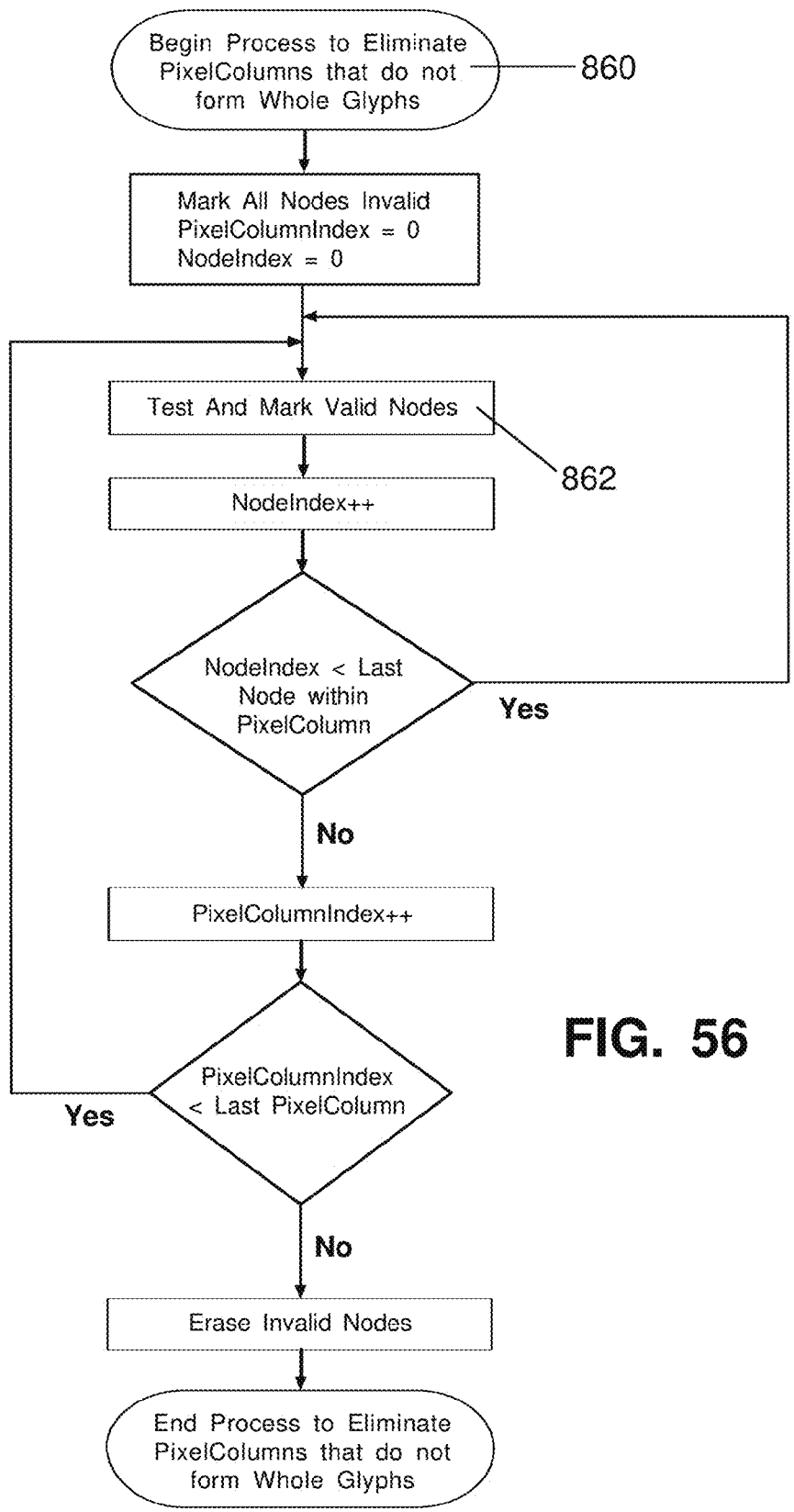
FIG. 56, shows a logic flow diagram of an exemplary process 860 to eliminate pixelcolumns that do not form whole glyphs.
Figure 57:
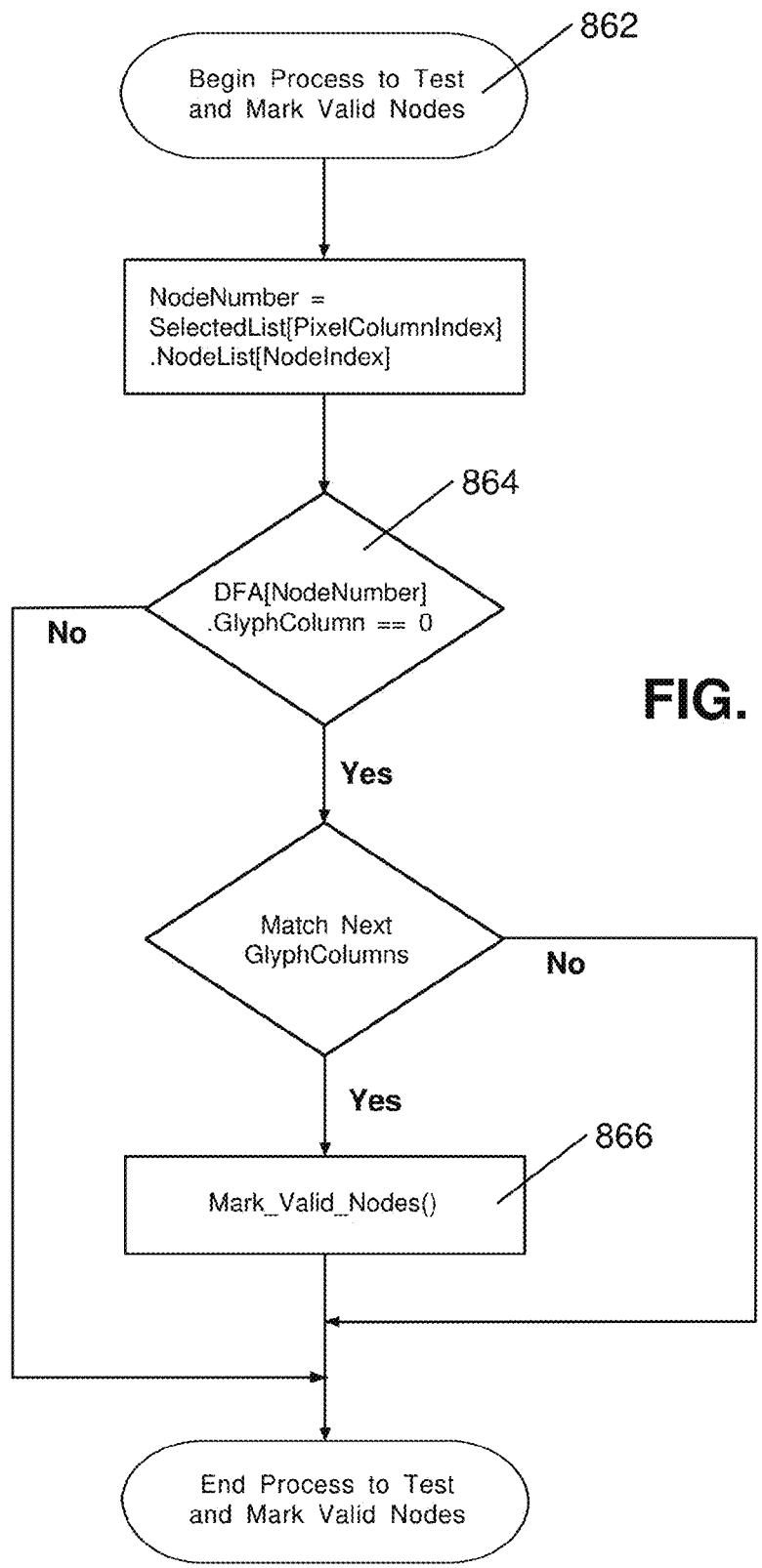
FIG. 57, shows a logic flow diagram of a process 862 to test and mar valid nodes.

The Subprocess 860 also shown on FIG. 56, which includes subprocess 862 of FIG. 57. Subprocess 862 includes step 864 which corresponds to line_number(16) mentioned above, and step 866 which corresponds to line_number(21) also mentioned above.

Eliminate Pixelcolumns Lacking Required Corresponding OverlapCodes

Subprocess 870 of process 850 shown on FIG. 46 removes all glyph pixelcolumn nodes that do not have a corresponding overlap pair for DoubleOverlap OverlapCodes. Subprocess 870 also removes all glyph pixelcolumn nodes that do not have a corresponding overlap triad for TripleOverlap OverlapCodes.

The table shown on FIG. 26 provides the list of corresponding OverlapCodes on each of its rows. For the DoubleOverlap OverlapCodes of FIGURE ITEM(605) through FIGURE ITEM (620) of this table, both OverlapCodes are always required. As an example both OverlapCode(7) and OverlapCode(8) are always required.

The TripleOverlap OverlapCodes shown on the table of FIG. 26 as FIGURE ITEM(625) through FIGURE ITEM (650) of this table also require either all three OverlapCodes, or the GlyphIndex(0) and the GlyphIndex(2) OverlapCodes. The OverlapCode validation process first looks for all three OverlapCodes, and failing this it looks for the GlyphIndex(0) and the GlyphIndex(2) OverlapCodes.

FIG. 50 shows the list of glyph pixelcolumns before the validation of subprocess 870, and FIG. 51 shows this list of glyph pixelcolumns after glyph pixelcolumns lacking their corresponding OverlapCodes have been removed.

Another measure of OverlapCode validation involves the fact that only one set of corresponding OverlapCodes is allowed at each glyph PixelColumn. This is an additional validation criteria that could be used in PixelColumn validation. This criteria is not currently implemented in the working prototype.

OverlapCode Validation proceeds through the NodeList member of SelectedNodesList elements making sure that adjacent DFA_Nodes within the NodeList have corresponding OverlapCodes. The Corresponding OverlapCodes are adjacent because the PixelColumn sort criteria includes OverlapCode as secondary sort criteria after the primary sort criteria of PixelColumn pixel RGB values. The simplest way to verify that OverlapCodes have their corresponding OverlapCode, is to make a table that is indexed by the first OverlapCode that looks up the expected OverlapCode. We require an extra table for the case of TripleOverlap OverlapCodes that validate without their second glyph OverlapCode.

Correct Erroneous Glyph Order

Subprocess 910 of process 900 shown on FIG. 47 detects when glyphs within MatchedGlyphList 740 of FIG. 44 are out-of-order relative to the order that they were generated, and swaps these glyphs thus placing them in the correct order.

Whenever a second glyph more than totally overlaps a first glyph, some of the pixelcolumns of this second glyph precede the pixelcolumns of the first glyph, when the image is processed in BookRead order. When these glyph pixelcolumns are pieced back together, they are still in the reverse order relative the order that they were generated. The DFA recognizer is constructed to keep track of the cases when this can occur. The DFA indicates this using special OverlapCodes.

One example of this is shown as pixelcolumns 620 of FIG. 22. In this case the DoubleOverlapping glyph pixelcolumns include an Apostrophe that is more than totally overlapped by a lowercase "f". The Double Overlap OverlapCodes{7,8} indicate that that these pairs of glyphs are recognized out-of-order.

Figure 23:
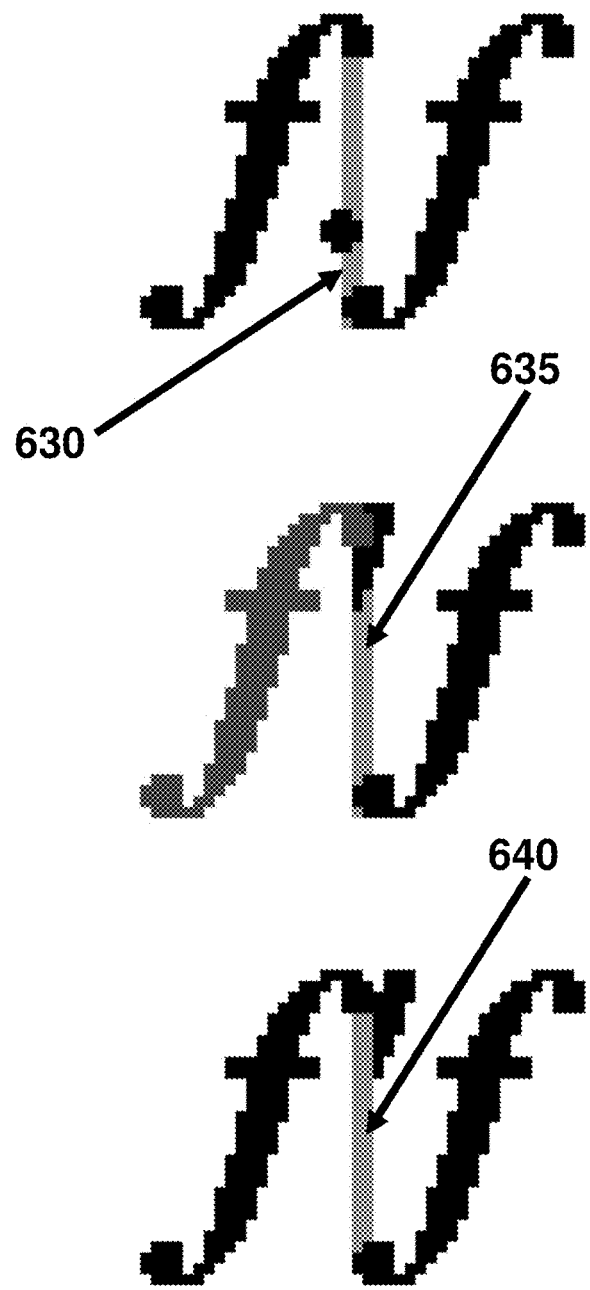

The other known example of glyph pixelcolumns being recognized out-of-order is shown as pixelcolumns 640 in FIG. 23. In this case the corresponding triad of TripleOverlap OverlapCodes {18, 19, 20}. In this case the third glyph's pixelcolumns are recognized before the second glyph's pixelcolumns.

We process adjacent pairs within the MatchedGlyphList using three factors that indicate out-of-order glyphs:

1) The first glyph more than totally overlaps the second glyph, as determined their respective BoundingBox coordinates. When glyphs are out-of-order, this is actually the case of the second glyph more than totally overlapping the first glyph.

2) The first glyph and second glyph have OverlapCodes that indicate the glyphs are out-of-order.

3) The glyph pair fails PixelsBetween[ ][ ] Validation with the current order, and passes PixelsBetween[ ][ ] Validation when the order is swapped.

Eliminate Erroneous Horizontal Substring Glyphs

Subprocess 920 of process 900 shown on FIG. 47 eliminates glyphs in the MatchedGlyphList that were erroneously matched because the graphic image of these erroneously matched glyphs is embedded within the image of a larger glyph. This occurs when the middle pixelcolumns of a wider glyph are identical to, and in the same order as all of the pixelcolumns of a narrower glyph. In this case the narrower glyph is said to form a substring of the wider glyph.

TABLE 222 of FIG. 52 shows several erroneously matched substring glyphs that occur within IMAGE 111 of FIG. 52. Only the first, third, and sixth glyphs are correctly matched: {!, *, A}. The second, fourth, fifth, and seventh glyphs are erroneously matched apostrophe and period characters. The table shown on FIG. 53 provides the individual pixelcolumns associated with table 222 of FIG. 52.

There are three factors that are used to determine whether or not a glyph is an erroneous horizontal substring glyph:

1) The glyph is totally (or more than totally) overlapped by another glyph.

2) The glyph does not have OverlapCodes consistent with this total overlap, often there are two OverlapCode(0) Overlap- Codes (indicating non-overlapping pixelcolumns) in the same glyph pixelcolumn as shown FIG. 53.

3) The actual pixels between the glyphs determined by their BoundingBox coordinates is not consistent with their expected values that are stored in the PixelsBetween[ ] [ ] array.

The process proceeds through the MatchedGlyphList and examines all of the glyphs that are totally (or more than totally) overlapped by another glyph. This process removes the minimum number of glyphs required until PixelsBetween[ ] [ ] validation passes for all of the glyphs involved in the total (or more than total) overlap.

There is one exception to the above processing. Some FontInstances have glyphs that are identical to each other. In this case both glyphs may be valid. Sometimes the distinction can be made between identical glyphs because their respective PixelsBetween[ ] [ ] values are different. The currently preferred embodiment would simply report one of these ambiguous glyphs. This preferred embodiment would report all of the glyph ambiguity for the FontInstance to the user during the DFA build process 40 shown on FIG. 2.

Eliminate Erroneous Invisible Glyph Boundary Glyphs

Subprocess 930 of process 900 shown on FIG. 47 eliminates erroneous invisible glyph boundary glyphs.

The DFA may sometimes not be able to detect the boundary between pairs of glyphs because the pixels of the adjacent pixelcolumns between this glyph pair may be identical. This only occurs when one of these two glyphs has all of its pixelcolumns identical to each other. An instance of this case is shown on FIG. 54.

Figure 54:
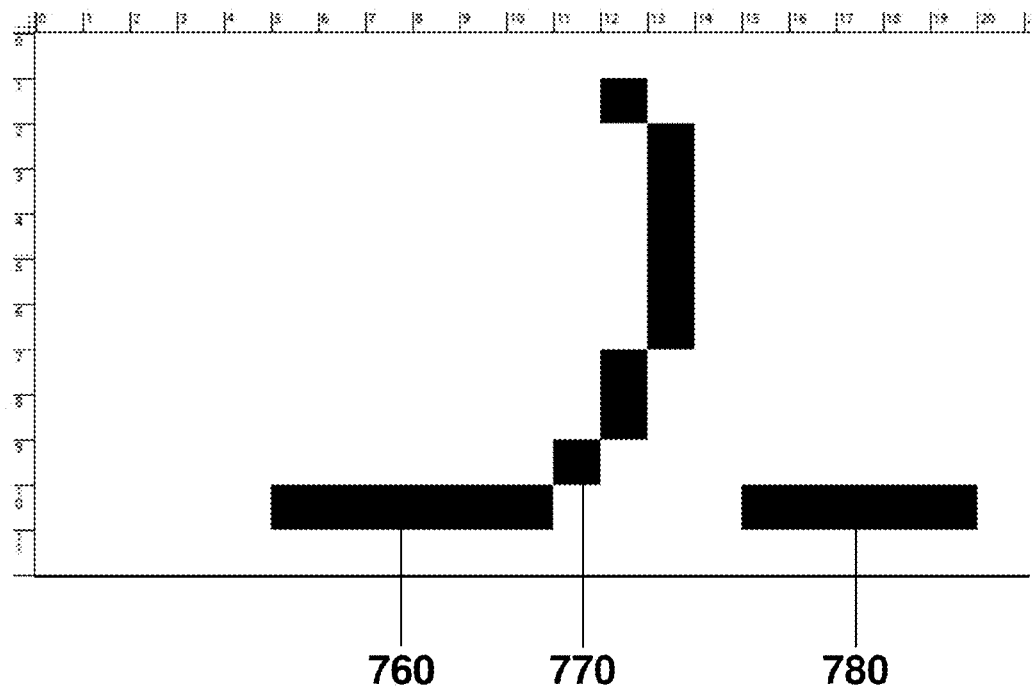
FIG. 54 provides an example of erroneous invisible glyph boundaries.

FIG. 54 shows the Underscore glyph "_" 760, the Right-Parenthesis ")" 770 and the Underscore glyph "_" 780. Because the PixelsBetween['_'][')']==0, and the GlyphPixelWidth['_']==5, we can see that glyph 760 ends at image column(9), and therefore glyph 770 must begin at image column(10). When we look at the MatchedGlyphList table 333, we see that the DFA has erroneously matched another Underscore "_" glyph beginning at image column(6). This is because image columns 5 through 10 include two instances of the image corresponding to the Underscore "_" glyph.

The way that this problem is corrected is only the first "every pixelcolumn is identical" glyph is considered to be valid of a sequence of "invisible glyph boundary" glyphs, until one of these "every pixelcolumn is identical" glyphs passes PixelsBetween[ ] [ ] validation. This correction is called StringOfPearls so that we can specifically refer to it.

In preparation for the validation of subprocess 930 we must collect and store the CodePoint values of every glyph pair that is known to have this problem. It is only when this subprocess 930 encounters an instance of this glyph pair as adjacent glyphs within the MatchedGlyphList, that the StringOfPearls correction is made.

This preparation involves determining the set of glyphs within a FontInstance that have all of their pixelcolumns identical to each other, and determining every permutation of these "every pixelcolumn is identical" glyphs with every other glyph that results in the invisible glyph boundary. These "invisible glyph boundary" glyph pairs must be stored. This preparation would form an additional detail that could be added to step 340 of process 300 of FIG. 10.

Determining the set of "every pixelcolumn is identical" glyphs involves generating the set of individual character glyphs and comparing their GlyphColumn(0) pixelcolumn pixel RGB values to all of the remaining GlyphColumn pixelcolumn pixel RGB values within this same glyph.

Determining the set of invisible glyph boundary glyph pairs involves generating every permutation of pairs of "every pixelcolumn is identical" glyphs with every other glyph. For each of these generated glyph pairs we compare the next pixelcolumn after the "every pixelcolumn is identical" glyph, and the prior pixelcolumn before this "every pixelcolumn is identical" glyph, to the GlyphColumn(0) of the "every pixelcolumn is identical" glyphs. If either of these two comparisons are identical, we store this glyph pair.

PixelsBetween[ ] [ ] Validation

Subprocess 940 of process 900 shown on FIG. 47 is used as the final test to make sure that all glyphs within an SelectedNodes:: ImageRow have been correctly recognized. Glyphs recognized from an input image retain their ImageCol positions. From these ImageCol positions we can determine the relative position of recognized glyphs to each other.

Since we collect the number of pixels between every glyph pair in the PixelsBetween[CP1] [CP2] array, we can validate that two adjacent glyphs recognized from the input image have this correct relative position to each other.

The way that this validation works is the actual pixels between the glyph pair derived from the image horizontal coordinates stored in an adjacent pair of MatchedGlyph elements is compared to the expected pixels between stored in PixelsBetween[CP1] [CP2]. The C++ snippet provided below shows how actual pixels between and expected pixels between are derived:

int $CP1\_Right$=MatchedGlyphList[$N$].right;

int $CP2\_Left$=MatchedGlyphList[$N$+1].left;

int ActualPixelsBetween=$CP2\_Left-CP1\_Right-1$;

int $CP1$=MatchedGlyphList[$N$].CodePoint;

int $CP2$=MatchedGlyphList[$N$+1].CodePoint;

int ExpectedPixelsBetween=PixelsBetween[$CP1$][$CP2$];

Whenever the actual pixels between an adjacent pair of glyphs within the MatchedGlyphList is not the same as the expected pixels between, PixelsBetween validation fails.

Eliminate Erroneous Vertical Substring Glyphs

Subprocess 950 of process 900 shown on FIG. 47 is used to eliminate erroneously matched vertical substring glyphs from the MatchedGlyphList.

All of the post-processing validation is applied to each set of glyph pixelcolumns that are on the same SelectedNodes:: ImageRow. Since ImageRow specifies the image pixel vertical coordinate of the bottom of the glyph pixelcolumn, its top vertical coordinate is determined by the following expression: TopRow=ImageRow−FontPixelHeight+1; This defines the vertical extent of this glyph pixelcolumn.

Sometimes the vertical extent of one glyph overlaps the vertical extent of another glyph. This occurs because a tiny piece of one glyph has the same image bitmap as a portion of a large glyph. This often occurs with the tiny punctuation character glyphs of monochrome FontInstances.

The way to detect this error is the glyph with the larger number of foreground pixels is the correct glyph. This requires keeping track of the number of foreground pixels for each individual (non-overlapped) character glyph. Determining and storing this data is an additional step of process 230 of FIG. 8.

Process 950 would iterate through elements of the MatchedGlyphList looking for elements that overlap vertically. If it finds overlapping elements it would eliminate the overlapping element with the fewest foreground pixels of the overlapping glyph pair.

Summation of Post Processing Validation

Process 745 of FIG. 45. The above sequence is the currently recommended order of processing within the preferred embodiment. As persons skilled in the art will appreciate, the order of the above validation steps can be changed, steps combined, and steps eliminated as long as the end result combines together individual glyph pixelcolumns into correctly recognized whole glyphs.

To maintain the 100% accuracy of the above specified validation process, care must be taken to not eliminate any glyph pixelcolumns or whole glyphs that can not be determined to be incorrect. The use of stochastic (or probabilistic) based heuristics must be avoided, the entire process must remain entirely deterministic.

Unlike other software systems, this system can be verified with exhaustive testing. Generating every permutation of three glyphs at the vertical middle of an off-screen memory bitmap that is three FontPixelHeight units tall, and processing this entire off-screen bitmap is currently considered to be sufficiently exhaustive testing. Adjustments are made to the any of the above steps when this testing reveals errors.

It is important to note that the above-described preferred embodiments of the DFA recognizer and its many uses are illustrative only. Although the invention has been described in conjunction with specific embodiments thereof, those skilled in the art will appreciate that numerous modifications are possible without materially departing from the novel teachings and advantages of the subject matter described herein. Accordingly, such modifications are intended to be included within the scope of the present invention. Other substitutions, modifications, changes and omissions may be made in the design, operating conditions and arrangement of the preferred and other exemplary embodiments without departing from the spirit of the present invention.

What is claimed is:

1. A method for creating a system for recognizing machine generated character glyphs in a graphic image, comprising:
   creating a deterministic finite automaton (DFA) for recognizing individual pixel columns of machine generated character glyphs;
   providing a means for combining the recognized individual pixel columns together such that whole character glyphs are correctly recognized wherein the DFA is created by the following steps:
   collecting a set of pixel columns for each character glyph within a FontInstance;
   sorting the collected pixel columns by their pixel RGB values;
   merging identical prefixes of these character glyph pixel columns together;
   generating and storing the DFA from the merged prefixes.

2. The method of claim 1, wherein the DFA is augmented such that the pixel columns recognized by the DFA are combined together to form correctly matched whole character glyphs by eliminating the recognized pixel columns that do not correctly form whole character glyphs.

3. The method of claim 2, wherein the DFA is augmented such that the whole character glyphs are validated against each other to eliminate erroneously matched glyphs.

4. The method of claim 1, wherein the DFA is used for the purpose of exchanging data between application programs.

5. A Method for recognizing machine generated character glyphs in a graphic image comprising:
   creating a deterministic finite automaton (DFA) for recognizing individual pixel columns of machine generated character glyphs;
   using the DFA to recognize the individual pixel columns of machine generated character glyphs;
   combining the recognized individual pixel columns of machine generated character glyphs together into correctly matched whole glyphs.

6. The method of claim 5 wherein the DFA is created by collecting a set of pixel columns for each character glyph within a FontInstance and sorting the collected pixel columns by their pixel RGB values.

7. The method of claim 6 wherein identical prefixes of these character glyph pixel columns are merged together.

8. The method of claim 7 wherein the DFA is generated from these merged prefixes and stored.

9. The method of claim 6 wherein every overlapping glyph pixel column is collected.

10. The method of claim 8 wherein the DFA is represented as a Sparse Matrix.

11. The method of claim 9 wherein OverlapCodes are determined for overlapping glyphs.

12. The method of claim 5 wherein the recognized individual pixel columns of machine generated character glyphs are combined together into correctly matched whole glyphs by eliminating the recognized pixel columns that do not form whole glyphs.

13. The method of claim 5 wherein the recognized individual pixel columns of machine generated character glyphs are combined together into correctly matched whole glyphs by eliminating the recognized pixel columns that lack required corresponding OverlapCodes.

14. The method of claim 5 wherein the recognized individual pixel columns of machine generated character glyphs are combined together into correctly matched whole glyphs by correcting erroneous glyph order.

15. The method of claim 5 wherein the recognized individual pixel columns of machine generated character glyphs are combined together into correctly matched whole glyphs by eliminating erroneous horizontal substring glyphs.

16. The method of claim 5 wherein the recognized individual pixel columns of machine generated character glyphs are combined together into correctly matched whole glyphs by eliminating erroneous invisible glyph boundary glyphs.

17. The method of claim 5 wherein the recognized individual pixel columns of machine generated character glyphs are combined together into correctly matched whole glyphs by eliminating glyphs that do not pass pixelsbetween validation.

18. The method of claim 5 wherein the recognized individual pixel columns of machine generated character glyphs are combined together into correctly matched whole glyphs by eliminating erroneous vertical substring glyphs.

19. A Method for recognizing machine generated character glyphs in a graphic image comprising:
   creating a deterministic finite automaton (DFA) for recognizing individual pixel columns of machine generated character glyphs;
   using the DFA to recognize the individual pixel columns of machine generated character glyphs;
   combining the recognized individual pixel columns of machine generated character glyphs together into correctly matched whole glyphs wherein the DFA is created by the following steps:
   collecting a set of pixel columns for each character glyph within a FontInstance;
   sorting the collected pixel columns by their pixel RGB values;

merging identical prefixes of these character glyph pixel columns together;

generating and storing the DFA from the merged prefixes.

20. A Method for recognizing machine generated character glyphs in a graphic image comprising:

creating a deterministic finite automaton (DFA) for recognizing individual pixel columns of machine generated character glyphs;

using the DFA to recognize the individual pixel columns of machine generated character glyphs;

combining the recognized individual pixel columns of machine generated character glyphs together into correctly matched whole glyphs;

wherein the recognized individual pixel columns of machine generated character glyphs are combined together into correctly matched whole glyphs by the following steps:

eliminating recognized pixel columns that do not form whole glyphs;

eliminating erroneous horizontal substring glyphs;

eliminating glyphs that do not pass pixelsbetween validation.

* * * * *